(12) United States Patent
Kirchhoff et al.

(10) Patent No.: US 10,796,608 B2
(45) Date of Patent: Oct. 6, 2020

(54) INTERACTIVE EDUCATION SYSTEM

(71) Applicant: GAUMARD SCIENTIFIC COMPANY, INC., Miami, FL (US)

(72) Inventors: Allan R. Kirchhoff, Miami, FL (US); Roberto R. Robaina, Miami, FL (US)

(73) Assignee: Gaumard Scientific Comapny, Inc., Miami, FL (US)

( * ) Notice: Subject to any disclaimer, the term of this patent is extended or adjusted under 35 U.S.C. 154(b) by 378 days.

(21) Appl. No.: 15/816,747

(22) Filed: Nov. 17, 2017

(65) Prior Publication Data

US 2018/0144663 A1  May 24, 2018

Related U.S. Application Data

(60) Provisional application No. 62/423,897, filed on Nov. 18, 2016.

(51) Int. Cl.
*G09B 23/32* (2006.01)
*G09B 9/00* (2006.01)

(52) U.S. Cl.
CPC .............. *G09B 23/32* (2013.01); *G09B 9/00* (2013.01)

(58) Field of Classification Search
CPC .. A61F 2/141; A63H 3/38; A63H 3/40; A63H 3/42
See application file for complete search history.

(56) References Cited

U.S. PATENT DOCUMENTS

| | | | |
|---|---|---|---|
| 2,817,845 A | 12/1957 | Clarke | |
| 5,900,923 A * | 5/1999 | Prendergast | G09B 23/28 351/211 |
| 7,113,848 B2 | 9/2006 | Hanson | |
| 7,575,330 B2 | 8/2009 | Allen et al. | |
| 10,363,192 B2 * | 7/2019 | Casey | A61B 3/113 |
| 2011/0071675 A1 * | 3/2011 | Wells | G06K 9/3216 700/250 |
| 2012/0086018 A1 | 4/2012 | Yao et al. | |
| 2015/0286340 A1 | 10/2015 | Send et al. | |
| 2017/0039894 A1 | 2/2017 | Kirchhoff et al. | |

OTHER PUBLICATIONS

Non-Final Office Action dated Sep. 10, 2018 regarding U.S. Appl. No. 15/223,795, 9 pgs.
Final Office Action dated Mar. 22, 2019 regarding U.S. Appl. No. 15/223,795, 11 pgs.
Non-Final Office Action dated Aug. 27, 2019 regarding U.S. Appl. No. 15/223,795, 15 pgs.

* cited by examiner

*Primary Examiner* — Robert J Utama
(74) *Attorney, Agent, or Firm* — Haynes and Boone, LLP

(57) ABSTRACT

A patient simulator having a right eye assembly including a right pupil, a right eyelid assembly including a right eyelid, a left eye assembly including a left pupil, a left eyelid assembly including a left eyelid, a transmitter configured to transmit a signal toward an object placed in front of the patient simulator, a sensor configured to sense a signal reflected off the object, and a microprocessor configured to determine a location of the object based on the sensed signal, and to effect movement of one or more of the right pupil, the right eyelid, the left eye, or the left eyelid based on the determined location of the object.

17 Claims, 29 Drawing Sheets

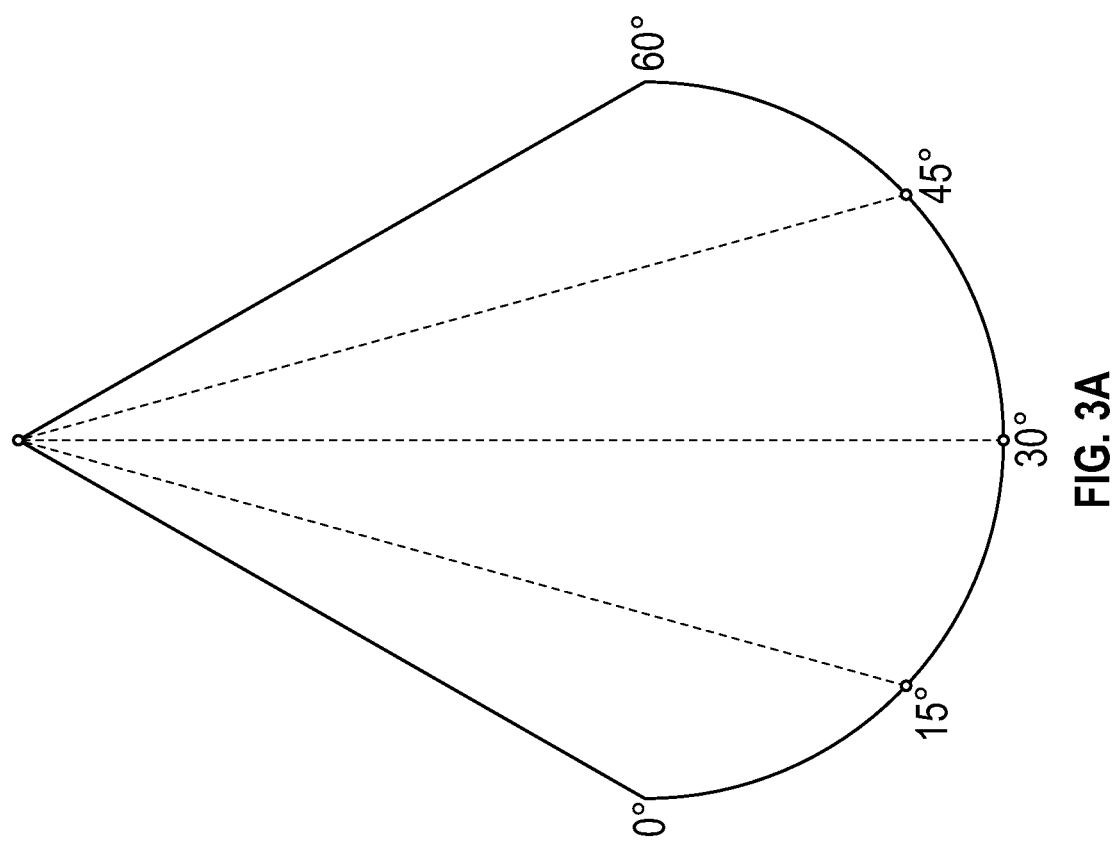

INTERACTIVE EDUCATION SYSTEM

CROSS-REFERENCE TO RELATED APPLICATIONS

The present application claims priority to and the benefit of U.S. Provisional Patent Application No. 62/423,897, filed Nov. 18, 2016, which is hereby incorporated by reference in its entirety.

TECHNICAL FIELD

The present disclosure relates generally to interactive education systems for teaching patient care. In particular, the present disclosure relates to an interactive educational eye assembly including a set of animatronic eyes that resemble real-life human eyes, both in appearance and dynamics, to allow execution of medical tests for educational and diagnostic purposes. The disclosed interactive educational eye assembly may be referred to as a simulator or a multipurpose eye motion trainer.

BACKGROUND

It is desirable to train medical personnel and students in patient care protocols before allowing physical contact with real patients. Such training may involve training material such as textbooks and flashcards. However, textbooks and flash cards lack failed to provide the important benefits of hands-on practice to the students. On the other hand, allowing inexperienced students to perform medical procedures on actual patients that would allow for the hands-on practice cannot be considered a viable alternative because of the inherent risk to the patient. Because of these factors, patient care education has often been taught using medical instruments to perform patient care activity on a simulator, such as a manikin. A manikin is, for example, a life-sized anatomical human model used for educational and instructional purposes.

Existing simulators fail to exhibit accurate symptoms and to respond appropriately to student stimuli, thereby failing to provide realistic medical training to the students. Existing simulators also fail to look and feel lifelike, which fails to improve the training process. Furthermore, existing simulators fail to adequately represent some diseases for training purposes, such as nystagmus, blepharospasm, and ptosis. As such, there is a need to provide a simulator that overcomes the above deficiencies of existing stimulators. To that end, the present disclosure discloses an interactive education system for use in conducting patient care training sessions that is realistic and/or includes additional simulated features.

SUMMARY

The present disclosure provides interactive education systems, apparatus, components, and methods for teaching patient care. In various embodiments, a patient simulator may include a right eye including a right eyelid and a right pupil, and a left eye including a left eyelid and a left pupil, wherein the right pupil is configured to move within an area of the right eye and the left pupil is configured to move within an area of the left eye. The right pupil and the left pupil may move in a horizontal direction or a vertical direction or a combination of the horizontal direction and the vertical direction. The patient simulator may include at least one infrared (IR) transmitter to transmit IR radiation towards an object placed in front of the eye assembly, at least one IR sensor to receive an IR response signal reflected off the object, and a microprocessor to determine a location of the object based on the sensing of the IR response signal by the at least one IR sensor, and to effect movement of the right pupil and/or the left pupil based on the determined location of the object. The IR transmitter may transmit the IR radiation in a burst of frequency modulated pulses In various embodiments, to effect movement of the right pupil and/or the left pupil, the microprocessor may compare a current position of the right pupil and/or the left pupil with the determined location of the object. The microprocessor may effect movement of the right pupil jointly with respect to the movement of the left pupil or may effect movement of the right pupil independently with respect to the movement of the left pupil. In various embodiments, the microprocessor may effect movement of the right pupil by a first displacement amount and to effect movement of the left pupil by a second displacement amount, the first displacement amount being different from the second displacement amount.

A method used in the patient simulator may include transmitting, via a first infrared (IR) transmitter, first IR radiation and transmitting, via a second infrared (IR) transmitter, second IR radiation towards an object placed in front of the simulator. The method may also include sensing, via a first IR sensor, a predetermined number of readings of first sensed data based on the first IR radiation being reflected off the object and sensing, via a second IR sensor, a predetermined number of readings of second sensed data based on the second IR radiation being reflected off the object. Further, the method may include averaging, via a microprocessor, the predetermined number of readings of the first sensed data to calculate average first sensed data and the predetermined number of readings of the second sensed data to calculate average second sensed data, and comparing the average first sensed data with the average second sensed data. Finally, the method may include determining a location of the object based on the comparing of the average first sensed data with the average second sensed data, and effecting movement of the right pupil and/or the left pupil based on a result of the comparing of the average first sensed data with the average second sensed data.

In various embodiments, the transmitting the first IR radiation and/or the transmitting the second IR radiation includes transmitting IR radiation in a burst of frequency modulated pulses. Also, the sensing may include recording a value corresponding to an intensity of the first and/or second IR radiation being reflected off the object. In various embodiments, the effecting movement of the right pupil and/or the left pupil includes effecting movement of the right and/or left pupil in a horizontal or a vertical direction, or a combination of horizontal and the vertical direction. The determining the location of the object may include determining that the location of the object is in front of the first IR sensor when the first average sensed data is greater than the second average sensed data, and the effecting movement of the right pupil and/or the left pupil may include orienting a position of the right pupil and/or the left pupil towards the determined location of the object in front of the first IR sensor. In various embodiments, the effecting movement of the right pupil and/or the left pupil may include effecting movement of the right pupil jointly or independently with respect to the movement of the left pupil.

A patient simulator may include a right eye assembly including a right pupil having a right iris and a left eye assembly including a left pupil having a left iris. A right optical sensor may sense a light condition associated with the right eye, and provide a right electrical signal based on the same, and a left optical sensor may sense a light condition associated with the left eye, and provide a left electrical signal based on the same. In various embodiments, a microprocessor may change a size of the tight iris based on the right electrical signal, and change a size of the left iris based on the left electrical signal. The microprocessor may be electrically connected to the right optical sensor and to the left optical sensor, and may receive the right electrical signal and the left electrical signal. In various embodiments, the right optical sensor is placed within the right eye and the left optical sensor is placed within the left eye.

The microprocessor may change the size of the right iris by increasing or decreasing a circular size of the right iris, and may change the size of the left iris by increasing or decreasing a circular size of the left iris. In various embodiments, the microprocessor may increase or decrease the circular size of the right iris and/or the left iris within a diametric range of 1 mm to 8 mm. Also, the microprocessor may change the circular size of the right iris and/or the left iris to a default size, a totally constricted size, or a totally dilated size. The microprocessor may decrease the circular size of the right iris and/or the left iris to simulate constriction and may increase the circular size of the right iris and/or the left iris to simulate dilation. In various embodiments, the microprocessor may simulate constriction under bright light conditions and may simulate dilation under dark light conditions. The microprocessor may change a circular size of the right iris by electrically actuating a right size motor that is mechanically coupled to the right iris, and may change a circular size of the left iris by electrically actuating the left size motor that is mechanically coupled to the left iris. In various embodiments, a single motor may be used to implement the right size motor and the left size motor.

A method used in the patient simulator may include sensing, via a right optical sensor, a light condition associated with the right eye including a right pupil having a right iris, and sensing, via a left optical sensor, a light condition associated with the left eye including a left pupil having a left iris. The method may further include changing, via a microprocessor, a size of the right iris based on the right electrical signal and of the left iris based on the left electrical signal. The sensing the light condition associated with the right eye may include sensing the light condition associated with the right eye by the right optical sensor from within the right eye, and the sensing the light condition associated with the left eye may include sensing the light condition associated with the left eye by the left optical sensor from within the left eye.

The changing the size may include receiving, at the microprocessor, the right electrical signal from the right optical sensor and the left electrical signal from the left optical sensor. In various embodiments, the changing the size includes changing the size of the right iris by increasing or decreasing a circular size of the right iris, and changing the size of the left iris by increasing or decreasing a circular size of the left iris. The changing the size may further include increasing or decreasing the circular size of the right iris and/or the left iris within a diametric range of 1 mm to 8 mm. In various embodiments, the changing the size may include changing the circular size of the right iris and/or the left iris to a default size, a totally constricted size, or a totally dilated size. The changing the size includes simulating constriction under bright light conditions and to simulate dilation under dark light conditions. Further, the changing may include changing a circular size of the right iris by electrically actuating the right size motor that is mechanically coupled to the right iris, and changing a circular size of the left iris by electrically actuating the left size motor that is mechanically coupled to the left iris.

A patient simulator may include a right eye assembly including a right eyelid and a right pupil and a left eye assembly including a left eyelid and a left pupil. At least one blink motor may be coupled to the right eyelid and to the left eyelid, and a microprocessor may electrically actuate the at least one blink motor to rotate, wherein rotation of the at least one blink motor results in motion of the right eyelid and/or the left eyelid to simulate blinking. The patient simulator may further include a right eyelid position sensor that electrically reports a current position of the right eyelid, and a left eyelid position sensor that electrically reports a current position of the left eyelid.

The right eyelid and/or the left eyelid and may move between a closed position and an open position. The closed position may be the default position. In various embodiments, the motion of the right eyelid is independent from the motion of the left eyelid. The microprocessor may continuously monitor positions of the right eyelid using the right eyelid position sensor and of the left eyelid using the left eyelid position sensor. In various embodiments, the microprocessor may actuate rotation of the at least one blink motor in a first direction to effect closing of the right eyelid and the left eyelid, and may actuate rotation of the at least one blink motor in a second direction to effect opening of the right eyelid and the left eyelid. The microprocessor may actuate rotation of the motor in the second direction when right eyelid or the left eyelid is in the closed position. The microprocessor may control a speed of motion of the right eyelid and/or the left eyelid, and may control a speed of rotation of the at least one blink motor to control a rate of blinking of the right eyelid and/or the left eyelid.

A method for using the patent simulator may include mechanically coupling at least one blink motor to a right eyelid of a right eye and to a left eyelid of the left eye, and electrically actuating, via a microprocessor, the at least one blink motor to rotate, wherein rotation of the at least one blink motor results in motion of the right eyelid and/or the left eyelid to simulate blinking. The electrically actuating may include receiving electrical signals associated with a current position of the right eyelid from a right eyelid position sensor, and receiving electrical signals associated with a current position of the left eyelid from a left eyelid position sensor. The motion of the right eyelid and/or the left eyelid may include motion between a closed position and an open position. The electrically actuating may also include continuously monitoring positions of the right eyelid using the right eyelid position sensor and of the left eyelid using the left eyelid position sensor.

In various embodiments, the electrically actuating may include actuating rotation of the at least one blink motor in a first direction to effect closing of the right eyelid and the left eyelid, and actuating rotation of the at least one blink motor in a second direction to effect opening of the right eyelid and the left eyelid. The electrically actuating may include actuating rotation of the motor in the second direction when the right eyelid or the left eyelid is in the closed position. Finally, the electrically actuating may include controlling a speed of rotation of the at least one blink motor to control a speed of motion of the right eyelid and/or the left eyelid, and controlling a speed of rotation of the at least one blink motor to control a rate of blinking of the right eyelid and/or the left eyelid.

In various embodiments, a patient simulator may include a right eye assembly including a right pupil, a left eye assembly including a left pupil, and a microprocessor configured to determine a tight-position for the right pupil within the right eye assembly and/or a left-position for the left pupil within the left eye assembly, monitor movement of the right pupil within the tight eye assembly and/or movement of the left pupil within the left eye assembly, and effect oscillation of the right pupil when the microprocessor determines that the right pupil is placed at the right-position within the right eye assembly, and/or of the left pupil when the microprocessor determines that the left pupil is placed at the left-position within the left eye assembly.

In various embodiments, a patient simulator may include a right eye assembly including a right pupil, a left eye assembly including a left pupil, and a microprocessor configured to determine a right-range for the right pupil within the right eye assembly and/or a left-range for the left pupil within the left eye assembly, monitor movement of the right pupil within the right eye assembly and/or movement of the left pupil within the left eye assembly, and effect oscillation of the right pupil when the microprocessor determines that the right pupil is placed within the right-range, and/or of the left pupil when the microprocessor determines that the left pupil is placed within the left-range.

In various embodiments, a patient simulator may include a right eye assembly including a right eyelid, a left eye assembly including a left eyelid, and a microprocessor configured to determine a right-position for the right eyelid within the right eye assembly and/or a left-position for the left eyelid within the left eye assembly, monitor movement of the right eyelid within the right eye assembly and/or movement of the left eyelid within the left eye assembly, and effect oscillation of the right eyelid when the microprocessor determines that the right eyelid is placed at the right-position within the right eye assembly, and/or of the left eyelid when the microprocessor determines that the left eyelid is placed at the left-position within the left eye assembly.

In various embodiments, a patient simulator may include a right eye assembly including a right eyelid, a left eye assembly including a left eyelid, and a microprocessor configured to determine a right-range for the right eyelid within the right eye assembly and/or a left-range for the left eyelid within the left eye assembly, monitor movement of the right eyelid within the right eye assembly and/or movement of the left eyelid within the left eye assembly, and effect oscillation of the right eyelid when the microprocessor determines that the right eyelid is placed within the right-range, and/or of the left eyelid when the microprocessor determines that the left eyelid is placed within the left-range.

In various embodiments, a patient simulator may include a right eye assembly including a right eyelid, a left eye assembly including a left eyelid, and a microprocessor configured to determine a right-position for the right eyelid within the right eye assembly, and/or a left-position for the left eyelid within the left eye assembly, and effect movement of the right eyelid from a current position of the right eyelid to the right-position, and/or of the left eyelid from a current position of the left eyelid to the left-position.

In various embodiments, a patient simulator may include a right eye assembly including a right pupil, a left eye assembly including a left pupil, and a microprocessor configured to determine a right-range for the right pupil within the right eye assembly and/or a left-range for the left pupil within the left eye assembly, determine a right random position for the right pupil within the right-range, and a left random position for the left pupil within the left-range, determine a right random time interval for the right pupil, and a left random time interval for the left pupil, effect movement of the right pupil from its current position to the right random position, and of the left pupil from its current position to the left random position, and effect movement of the right pupil from the right random position to another random position upon expiration of the right random time interval, and of the left pupil from the left random position to another random position upon expiration of the left random time interval.

BRIEF DESCRIPTION OF THE DRAWINGS

Other features and advantages of the present disclosure will become apparent in the following detailed description of illustrative embodiments with reference to the accompanying of drawings, of which:

FIG. 3A illustrates a plan view of an exemplary range of horizontal movement for the right and left pupils according to various embodiments of the present disclosure.

DETAILED DESCRIPTION

Figure 1:
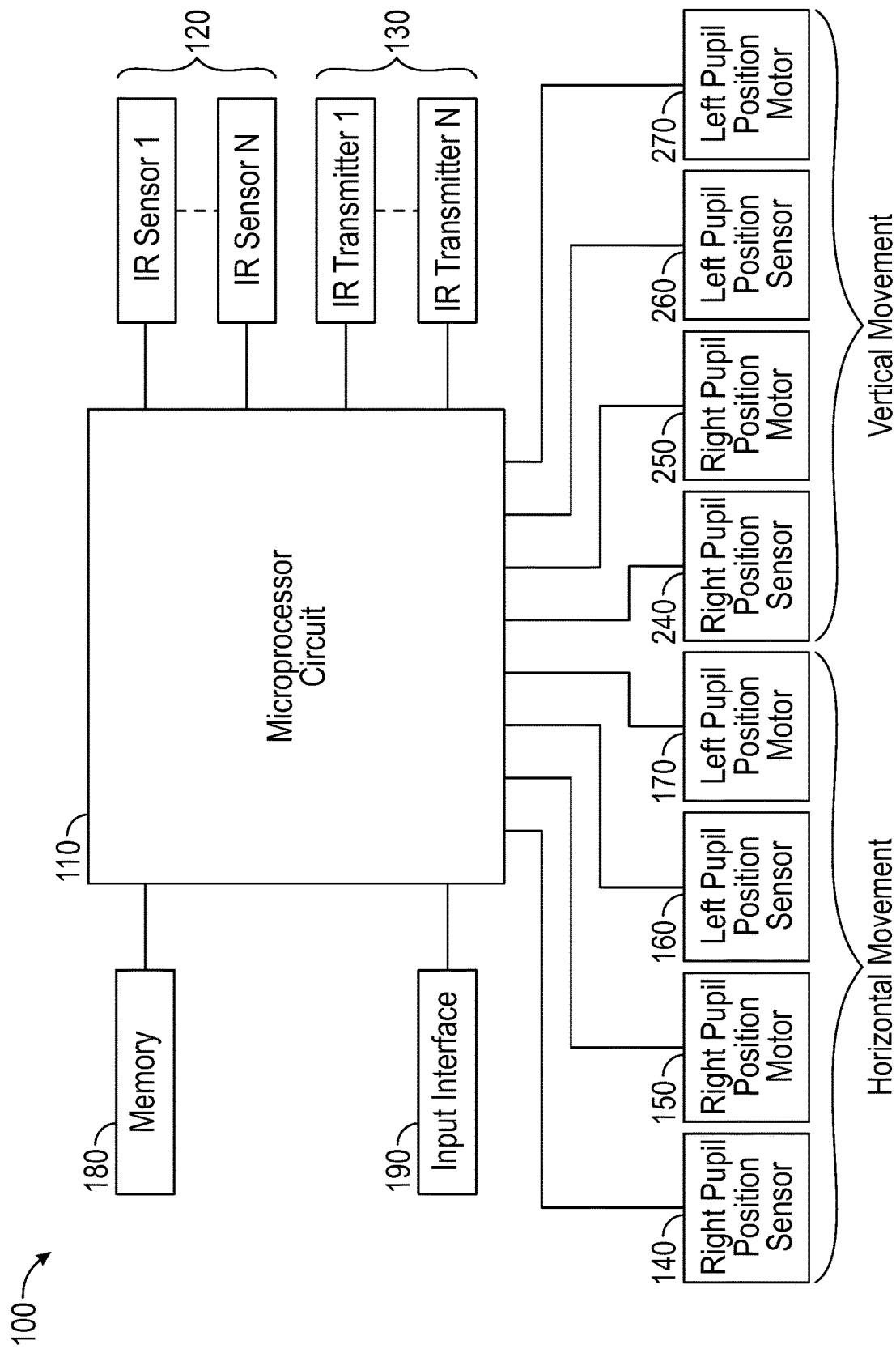
FIG. 1 illustrates an exemplary schematic block diagram 100 of the simulator according to various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications in the described devices, instruments, methods, and any further application of the principles of the disclosure as described herein are contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure.

As discussed above, the present disclosure discloses an interactive educational system for use in conducting patient care training sessions that is realistic and/or includes additional simulated features. In various embodiments, the presently disclosed simulator or multipurpose eye motion trainer realistically replicates the motion of a human eye. In particular, the simulator may be configured to simulate ocular conditions or diseases such as nystagmus, blepharospasm, and ptosis. Further, the simulator may be configured to respond to user stimuli in a way that is useful for medical educational and diagnostic purposes. The multipurpose eye motion trainer includes novel eye movement, disease simulation, and eye tracking features. These features are critical because eye movement conveys important health information regarding the patient.

In various embodiments, the presently disclosed simulator or multipurpose eye motion trainer may simulate eye position and movements relating to a number of diseases. In this way, the presently disclosed multipurpose eye motion trainer serves as an educational and diagnostic simulator by simulating various patient conditions and allowing a user to interface and diagnose the diseases on a life-like model. However, existing simulators do not include the novel simulation features. As such, the existing simulators fail to provide realistic educational or diagnostic training to the students. In some instances, embodiments of the present application may include features described in U.S. Provisional Patent Application No. 62/202,564, filed Aug. 7, 2015, and U.S. patent application Ser. No. 15/223,795, filed Jul. 29, 2016, each of which is hereby incorporated by reference in its entirety.

Simulation of Movement: FIG. 1 illustrates an exemplary schematic block diagram 100 of the simulator according to various embodiments of the present disclosure. The simulator (see FIG. 2) may be a manikin in the form of a human face, and may include an eye assembly. The eye assembly may include a right eye assembly 101 of the simulator, a left eye assembly 105 of the simulator, and associated circuitry to control functions to be performed by the right and left eyes 101, 105. The right eye assembly 101 may include a right pupil 102 and a right eyelid 103. The left eye assembly 105 may include a left pupil 106 and a left eyelid 107. The simulator may include a microcontroller 110, one or more IR sensors 120, one or more IR transmitters 130, an electronic memory 180, and an input/output interface 190. As discussed in further detail below, the simulator may allow various types of movement (i.e. horizontal, vertical, and rotational movement of various features of the eyes and eyelids) which may be used alone or in combination to simulate medical conditions. For example, for simulating horizontal movement, the simulator may include a right pupil position sensor 140, a right pupil motor 150, a left pupil position sensor 160, and a left pupil motor 170. Similarly, for simulating vertical movement, the simulator may include a right pupil position sensor 240, a right pupil motor 250, a left pupil position sensor 260, and a left pupil motor 270. The separate right and left motors 150, 170 allow independent control of horizontal movement of the right and left pupils 102, 106, respectively. Similarly, the separate right and left motors 250, 270 allow independent control of vertical movement of the right and left pupils 102, 106, respectively. The independent control of the pupils is relevant because it allows medical tests to be performed individually on each eye, as well as providing more realistic simulations of some conditions, such as nystagmus affecting the right and left eyes differently. The right and left pupil position sensors 140, 160, 240, 260 may be rotary position sensors that sense rotational positions of the right and left pupils 102, 106 respectively.

The microcontroller 110 may include an integrated circuit (e.g., ASIC) and may be programmed with appropriate software to allow ocular disease simulation, simulated eye tracking, and eye movements of the right and left pupils 102, 106. The input/output interface 190 may include peripheral input devices like a keyboard, mouse and joystick, and output devices such as a display, speakers, and a printer. The microcontroller 110 may exchange information with connected components (internal and external) by using a Universal Serial Bus (USB), a one-wire RS-232 communication interface, or an I2C communication interface.

The microcontroller 110 may be electrically connected with the right pupil motor 150 and the left pupil motor 170 and may control these motors 150, 170. In some embodiments, the microcontroller 110 controls the operation of the motors 150, 170 based on simulation instructions for one or more ocular diseases. For example, the microcontroller 110 may receive a set of instructions to drive the tight motor 150 forwards and backwards rapidly to impart a horizontal oscillation to the right pupil 102, providing for a simulation of horizontal nystagmus in the right eye 101.

The microcontroller 110 may be electrically connected to one or more IR transmitters 130, and controls operations of the one or more IR transmitters 130. For example, the microcontroller 110 controls radiation of the IR radiation from each of the IR transmitters 130. Also, the microcontroller 110 is electrically connected to the one or more IR sensors 120, and controls operation of the one or more IR sensors 120. For example, the microcontroller 110 controls sensing of reflected IR response signals by the one or more IR sensors 120. That is, to simulate eye tracking and eye movement, the microcontroller 110 may instruct at least one IR transmitter 130 to transmit IR radiation and instructs at least one IR sensor 120 to sense IR response signals reflected off the object. The microcontroller 110 may store the sensed IR response signals by the at least one IR sensor 120 in the electronic memory 180. Based on the IR response of the sensed IR response signals, the microcontroller 110 decodes the presence and location of the object. In various embodiments, the sensing of the IR response signals may include sensing an intensity of the reflected IR response signals, and recording a (digital) value corresponding to the sensed intensity of the IR response signals. The microcontroller 110 may compare the recorded values, and may determine that the object is placed closest to the sensor that records the greatest value. That is, the microcontroller 110 may determine that the object is placed closest to the sensor that senses IR response signals having the highest intensity. When two IR sensors measure substantially equal IR responses, the microcontroller 110 may determine that the object is placed in between the two IR sensors. For example, the microcontroller 110 may calculate a difference between two different values recorded by two different IR sensors, and may determine that the object is placed between the two different IR sensors when the calculated difference is less than a predetermined threshold value. In various embodiments, the IR response may have to be equal to or greater than a predetermined threshold IR response value for the at least one IR sensor to sense the IR response signal.

Once the microcontroller 110 has decoded the location of the object with respect to the known locations of the IR sensors 120, the microcontroller 110 may instruct the right pupil position sensor 140 to report a current position of a right pupil 102 within the right eye 101. Similarly, the microcontroller 110 may instruct the left pupil position sensor 160 to report a current position of the left pupil 106 within the left eye 105. The microcontroller 110 may then independently compare the current positions of the right and left pupils 102, 106 with respect to the decoded location of the object, and determine whether the current positions of the right and left pupils 102, 106 correspond to the decoded location of the object. For example, to determine whether the current positions of the right and left pupils 102, 106 correspond to the decoded location of the object, the microcontroller 110 may determine whether the current positions of the right and left pupils 102, 106 are oriented towards the decoded location of the object.

The microcontroller 110 may determine to effect no change in the current positions of the right and left pupils 102, 106 when it is determined that the current positions of both the right and left pupils 102, 106 correspond to the decoded location of the object. However, the microcontroller 110 may instruct the right pupil motor 150 to change the current position of the right pupil 102 when it is determined that the current position of the right pupil 102 does not correspond to the decoded location of the object. For example, the microcontroller 110 may instruct the right pupil motor 150 to position the right pupil 102 such that the right pupil 102 is oriented (i.e., looking) towards the decoded location of the object. Similarly, the microcontroller 110 may instruct the left pupil motor 170 to change the current position of the left pupil 106 when it is determined that the current position of the left pupil 106 does not correspond to the decoded location of the object. For example, the microcontroller 110 may instruct the left pupil motor 170 to position the left pupil 106 such that the left pupil 106 is oriented (i.e., looking) towards the decoded location of the object.

In various embodiments, the microcontroller 110 may change the positions of the right and left pupils 102, 106 in the horizontal direction, the vertical direction, and in a combination of horizontal and vertical directions. The ability of the simulator to effect changes in the positions of the right and left pupils 102, 106 in all of the above directions allows the simulator to realistically simulate various medical tests performed by doctors on human eyes, as well as the simulation of various diseases such as nystagmus, blepharospasm, and ptosis. Further, the microcontroller 110 may change the current position of the right pupil 102 independently from the current position of the left pupil 106. Further, the microcontroller 110 may change the current position of the right pupil 102 by an amount of displacement that is lower than, equal to, or greater than a displacement of the left pupil 106, and vice versa.

Horizontal Movement: Simulation of horizontal movement may include driving the right and left motors 150, 170 with the microcontroller 110 according to simulation instructions involving horizontal movement. Furthermore, simulation of horizontal movement of the right and left pupils 102, 106 in accordance with placement and movement of an object (e.g., pencil, finger, etc.) is also contemplated by the present disclosure. Simulating horizontal movement as feedback may include placing an object at an eye-level in front of the simulator and moving the object in a horizontal plane that is parallel to the horizontal plane that includes the right and left eyes 101, 105. The right and left eyes 101, 105 are sized, shaped, and colored to simulate natural human eyes. The simulator senses the presence and the movement of the object using the three IR sensors 120, 121, 122 and the four IR transmitters 130, 131, 132, 133, and allows for corresponding horizontal movements of the right and left pupils 102, 106. In various embodiments, the horizontal movement of the right and left pupils 102, 106 may be controlled such that the right and left pupils 102, 106 move together. Alternatively, in various embodiments, the horizontal movement of the right pupil 102 is controlled independently from the horizontal movement of the left pupil 106. Further, the amount of horizontal displacement of the right pupil 102 may be same or different with respect to the amount of horizontal displacement of the left pupil 106.

The right and left pupils 102, 106 may also be controlled to simulate various aspects of diseases, such as nystagmus, blepharospasm, and ptosis. In this case, the right and left pupils 102, 106 are moved by the microcontroller in ways that simulate one or more diseases. For example, the right and left pupils 102, 106 may be controlled to oscillate rapidly around a central position to simulate a patient with horizontal nystagmus. The amplitude, frequency, and speed of the movement of the right and left pupils 102, 106 may be controlled but inputting a pre-programmed set of simulation instructions or by a user directly controlling the simulator. In some embodiments, the simulator may simulate a disease while simultaneously providing feedback to a user. For example, the simulator may simulate a patient with low amplitude blepharospasm which may include rapid oscillation of the right and left eyelids 103, 107. A user may be able to interact with the simulator during the blepharospasm simulation, i.e., the right and left pupils 102, 106 may follow the movement of an object moved in front by the user while the right and left eyelids 103, 107 oscillate. Even beyond simulating how a disease appears, the present disclosure may provide a simulation that includes feedback from a model representing a patient with a disease.

Figure 2:
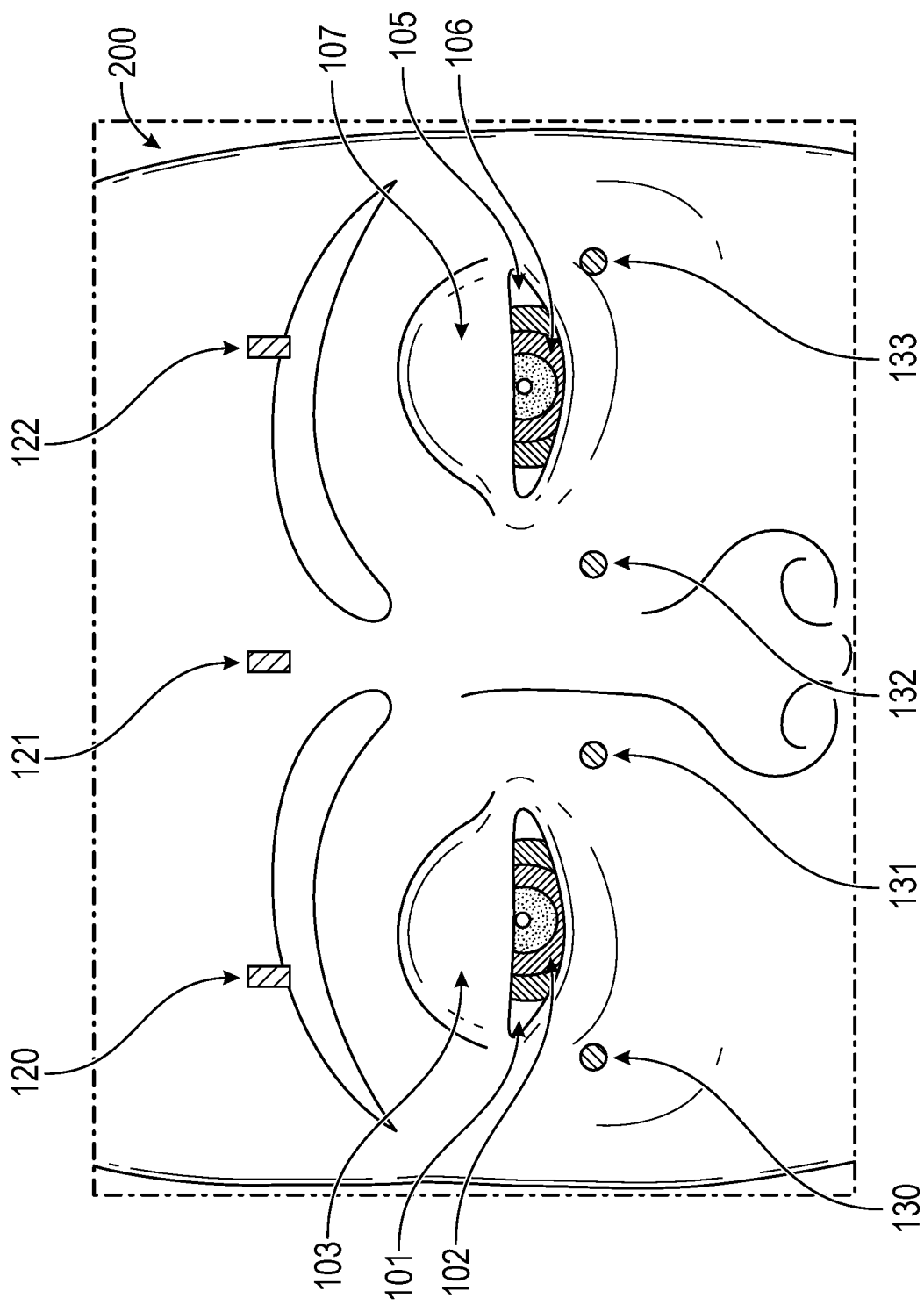
FIG. 2 illustrates a simulator 200 including the exemplary multipurpose eye motion trainer according to various embodiments of the present disclosure.

FIG. 2 illustrates a simulator 200 including the exemplary multipurpose eye motion trainer according to various embodiments of the present disclosure. The simulator 200 may be a manikin in the form of a human face, and may include an eye assembly. The eye assembly may include the above discussed right and left eyes 101, 105, and associated circuitry to control functions to be performed by the right and left pupils 102, 106. The right eye 101 may include a right eyelid 103, and the left eye 105 may include a left eyelid 107. The associated circuitry for simulation of horizontal movement may include three infrared (IR) sensors 120, 121, 122 and four infrared (IR) transmitters 130, 131, 132, 133 that are electrically controlled by the microcontroller 110. The IR sensors and the IR transmitters may be placed under silicone skin (with special openings) of the simulator 200. This allows the simulator 200 to appear more lifelike.

In various embodiments, the IR sensors 120, 121, 122 may be placed in a forehead section of the simulator 200 in close proximity to the eyes 101, 105. For example, as shown in FIG. 2, the IR sensors 120, 121, 122 may be placed in a horizontal plane above the horizontal plane that includes the right and left eyes 101, 105. However, in various embodiments, the IR sensors 120, 121, 122 may be placed in different horizontal planes as long as they allow the functions to be performed by the eye assembly discussed in the present disclosure. Also, the IR transmitters 130, 131, 132, 133 may be placed in a horizontal plane in close proximity to the right and left eyes 101, 105. For example, as shown in FIG. 2, the IR transmitters 130, 131, 132, 133 may be placed in a horizontal plane near the horizontal plane that includes the right and left eyes 101, 105. However, in various embodiments, the IR transmitters 130, 131, 132, 133 may be placed in different horizontal planes as long as they allow the functions to be performed by the eye assembly discussed in the present disclosure. In various embodiments, the eye movement and/or eye tracking is simulated using the IR sensors 120, 121, 122 and the IR transmitters 130, 131, 132, 133.

One or more of the three IR sensors 120, 121, 122 may be coupled to sensing IR response signals originating from one or more of the four IR transmitters 130, 131, 132, 133 to form respective sensor-transmitter pairs. For example, in the present embodiment for horizontal movement, the IR sensor 120 may be configured to sense IR response signals resulting from IR transmissions from the IR transmitter 130, the IR sensor 121 may be configured to sense IR response signals resulting from IR transmission from two IR transmitters 131, 132, and the IR sensor 122 may be configured to sense IR response signals resulting from IR transmissions from the IR transmitter 133. In various embodiments, the two IR transmitters 131, 132 may be connected in series and may operate together such that the two IR transmitters 131, 132 are turned on and off at the same time. An IR sensor may be coupled to an IR transmitter by tuning the sensing frequency of the IR sensor to the transmitting modulated frequency of the IR transmitter and/or by positioning the IR sensor in close proximity to the IR transmitter. The tuning of the sensing frequency to the transmitting modulated frequency results in the IR sensor being isolated from environmental conditions so as to allow accurate sensing of the IR response signal.

FIG. 3A illustrates a plan view of an exemplary range of horizontal movement for the right and left pupils 102, 106 according to various embodiments of the present disclosure. The right and the left pupils 102, 106 may be identical, but may be controlled independently from each other with respect to movement (e.g., horizontal, vertical, etc.). The exemplary range of horizontal motion may be 60 degrees with the center being at 30 degrees, as shown FIG. 3A. That is, each pupil 102, 106 may be centered at the default position of 30 degrees, and may be rotated to the left of the default position by 30 degrees (to the 60 degree position) and to the right of the default position by 30 degrees (to the 0 degree position). FIG. 3A shows the 30 degree position as the default position of the right and left pupils 102, 106. In the default position, the right and left pupils 102, 106 may be placed in the center of the right and left eyes 101, 105, respectively, to simulate a person looking substantially straight ahead. FIG. 3A also shows a position of the right and left pupils 102, 106 rotated to the right of the default position by 15 degrees (the 15 degree position). This position simulates a person slightly looking to the right. Further, FIG. 3A shows a position of the right and left pupils 102, 106 rotated to the right of the default position by 30 degrees (the 0 degree position). This position simulates a person looking further to the right. FIG. 3A shows a position of the right and left pupils 102, 106 rotated to the left of the default position by 15 degrees (the 45 degree position). This position simulates a person slightly looking to the left. Finally, FIG. 3A shows a position of the right and left pupils 102, 106 rotated to the left of the default position by 30 degrees (the 60 degree position). This position simulates a person looking further to the left.

Similar to the exemplary range of horizontal movement for the right and left pupils 102, 106, an exemplary range of vertical movement for the right and left pupils 102, 106 may be between 0 degrees and 60 degrees measured from the bottom of the eyes to the top of the eyes. In some embodiments, the exemplary range of the eyelid movement may be measured in distance and may span the range between the eyelids 103, 107 being completely open and the eyelids 103, 107 being completely closed. An exemplary range of eyelid motion may be about 10 mm. That is, the eyelids 103, 107 may be completely open at the 0 mm position and be completely closed at the 10 mm position.

Figure 3B:
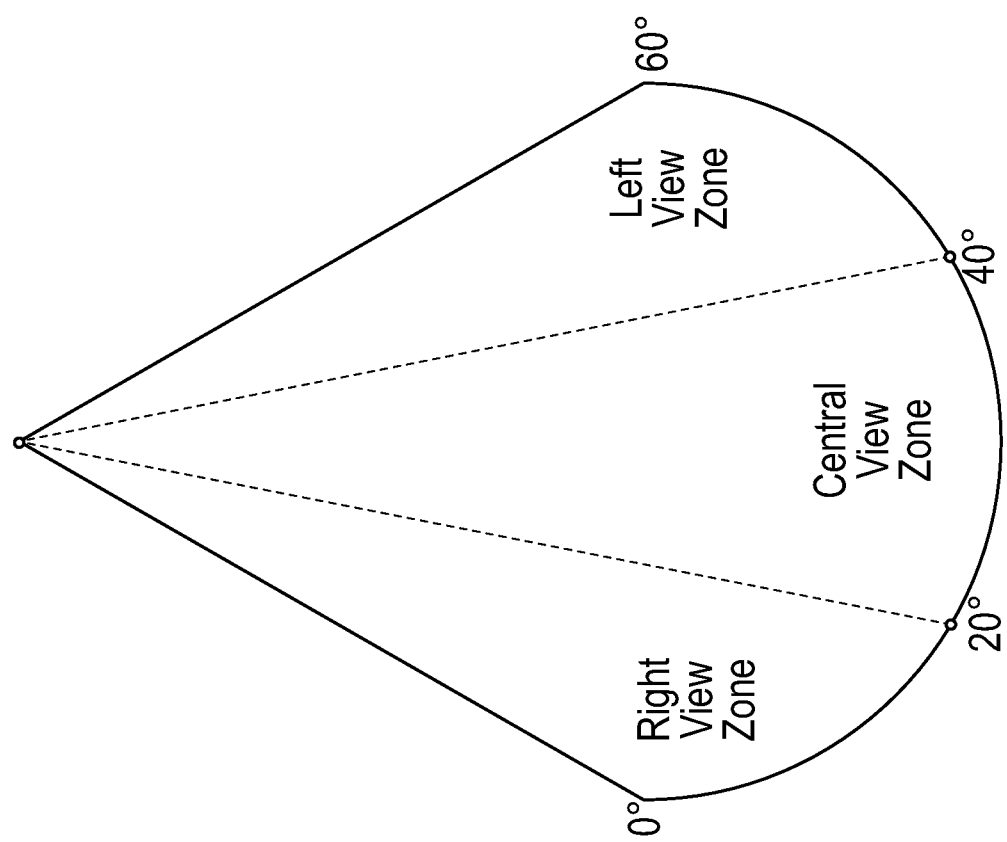
FIG. 3B illustrates a plan view of another exemplary range of horizontal movement for the right and left pupils according to various embodiments of the present disclosure.

FIG. 3B illustrates a plan view of another exemplary range of horizontal movement for the right and left pupils 102, 106 according to various embodiments of the present disclosure. In various embodiments, the total range of horizontal movement may be divided into zones. For example, as shown in FIG. 3B, the range of horizontal movement may be divided into three equal zones. The three equal zones may be, for example, a tight view zone, a central view zone, and a left view zone. In the default position, the right and left pupils 102, 106 may be placed in the central view zone of the right and left eyes 101, 105, respectively, to simulate a person looking substantially straight ahead. The right and left pupils 102, 106 may be placed in the right view zone of the right and left eyes 101, 105, respectively, to simulate a person looking substantially to the right. Finally, the right and left pupils 102, 106 may be placed in the left view zone of the right and left eyes 101, 105, respectively, to simulate a person looking substantially to the left.

The simulation of horizontal movement of the right and left pupils 102, 106 may be conducted in two modes—the joint tracking mode or the independent tracking mode. In the joint tracking mode, both the right and the left pupils 102, 106 may be controlled together such that the right and left pupils 102, 106 are displaced jointly in the same direction. Alternatively, in the independent tracking mode, the right pupil 102 may be controlled independently with respect to the left pupil 106 such that the right pupil 102 may move with a different amount of displacement with respect to the left pupil 106. For example, when an object is placed to the left of the simulator 200, the left pupil 106 may be rotated to the left of its default position by 15° (to the 45° position) and the right pupil 102 may be rotated to the left of its default position by 30° (to the 60° position). In addition, in the independent tracking mode, the right pupil 102 may move in a different direction with respect to the left pupil 106. For example, two objects may be placed in front of the simulator 200, such that a first object is in front of the IR sensor 120 and a second object is in front of the IR sensor 122. In this case, the right pupil 102 may be rotated to the right of its default position by 15° (to the 15° position) or by 30° (to the 0° position) to be oriented (i.e., looking) towards the object in front of the IR sensor 120, and the left pupil 106 may be rotated to the left of its default position by 15 (to the 45° position) or 30° (to the 60° position) to be oriented (i.e., looking) towards the object in front of the IR sensor 122.

Figure 4:
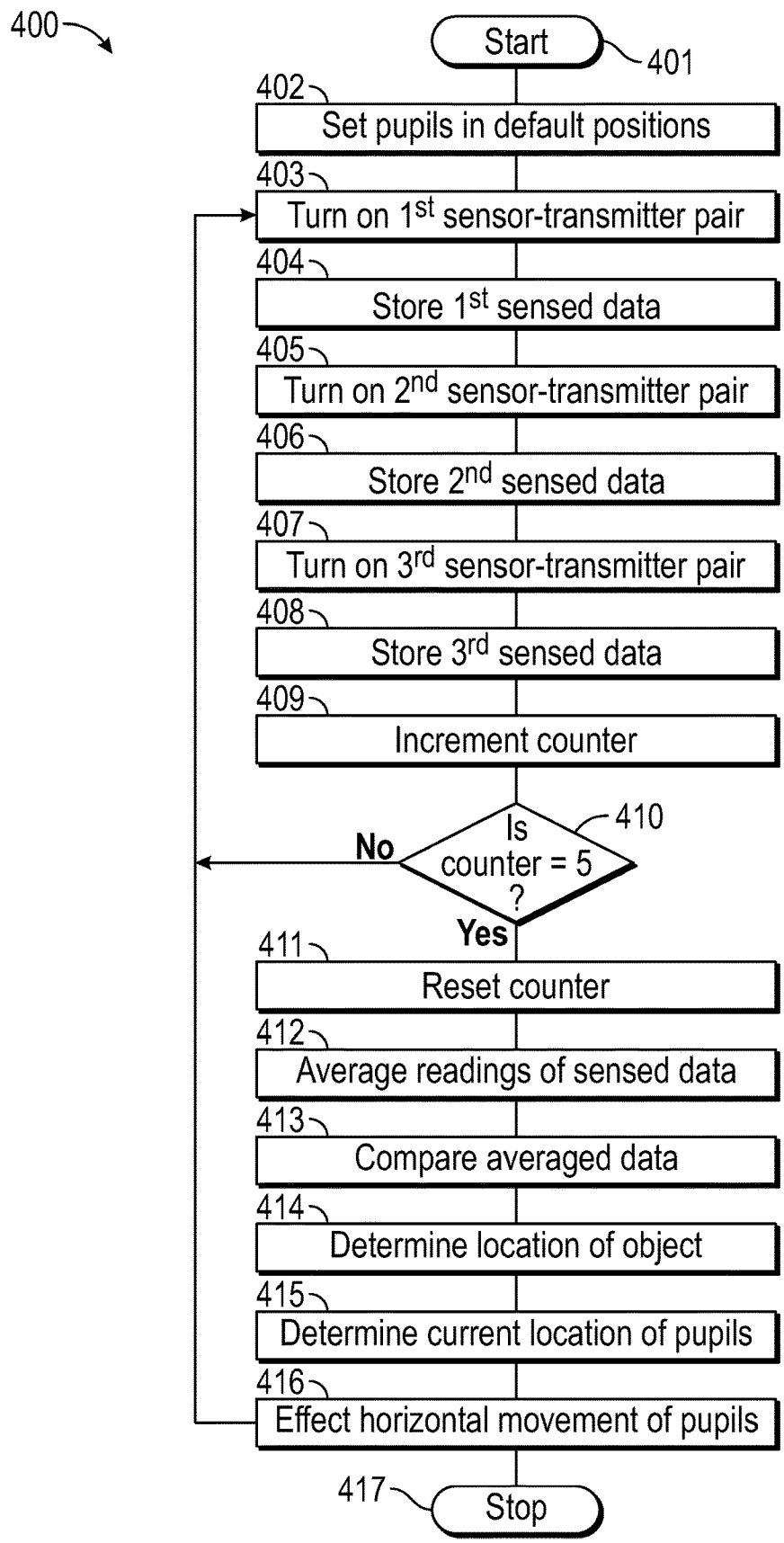
FIG. 4 illustrates an exemplary method 400 for performing simulation of horizontal movements in a joint tracking mode according to various embodiments of the present disclosure.

FIG. 4 illustrates an exemplary method 400 for performing simulation of horizontal movements in the joint tracking mode according to various embodiments of the present disclosure. The method starts at step 401. At step 402, the microcontroller 110 places both the right and left pupils 102, 106 in the default positions such that both eyes appear to be looking substantially straight ahead. For example, the microcontroller 110 may instruct the right pupil motor 150 to place the right pupil 102 in its default position at 30° and may instruct the left pupil motor 170 to place the left pupil 106 in its default position at 30°. At this time, an object (e.g., finger, pencil, etc.) may be placed at eye-level in front of the simulator.

At step 403, the microcontroller 110 turns on the first coupled sensor-transmitter pair of the IR sensor 120 and the IR transmitter 130. In various embodiments, when the first coupled sensor-transmitter pair is turned on, the IR transmitter 130 may transmit a burst of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are sensed by the IR sensor 120. As previously discussed, the IR sensor 120 may sense the IR response signals and record a value corresponding to the sensed intensity of the reflected IR response signals. At this time, the first coupled sensor-transmitter pair of the IR sensor 120 and the IR transmitter 130 may be turned off.

At step 404, the microcontroller 110 stores the IR response data sensed by the IR sensor 120 in the electronic memory 180 as a reading of first sensed data.

At step 405, the microcontroller 110 turns on the second coupled sensor-transmitter pair of the IR sensor 121 and IR transmitters 131, 132 connected in series. In various embodiments, when the second coupled sensor-transmitter pair is turned on, the IR transmitters 131, 132 may transmit bursts of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are sensed by the IR sensor 121. As previously discussed, the IR sensor 121 may sense the IR response signals and record a value corresponding to the sensed intensity of the reflected IR response signals. At this time, the second coupled sensor-transmitter pair of the IR sensor 121 and the IR transmitters 131, 132 may be turned off.

At step 406, the microcontroller 110 stores the IR response data sensed by the IR sensor 121 in the electronic memory 180 as a reading of second sensed data.

At step 407, the microcontroller 110 turns on the third coupled sensor-transmitter pair of the IR sensor 122 and the IR transmitter 133. In various embodiments, when the third coupled sensor-transmitter pair is turned on, the IR transmitter 133 may transmit a burst of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are sensed by the IR sensor 122. As previously discussed, the IR sensor 122 may sense the IR response signals and record a value corresponding to the sensed intensity of the reflected IR response signals. At this time, the third coupled sensor-transmitter pair of the IR sensor 122 and the IR transmitter 133 may be turned off.

At step 408, the microcontroller 110 stores the IR response data sensed by the IR sensor 122 in the electronic memory 180 as a reading of third sensed data.

At step 409, once all the sensor-transmitter pairs have been cycled through and sensed data from all the IR sensors has been recorded, the microprocessor 110 increments a counter having an initial value of zero. That is, at step 409, the microprocessor 110 increments the counter to have a value of 1. This signifies that one cycle of collecting and recording data from all the IR sensors has been completed.

At step 410, the microprocessor 110 determines whether the counter value is equal to a predetermined value. This predetermined value may be a predetermined number of cycles for collecting and recording data from all the IR sensors after which the microprocessor 110 processes the recorded data to determine the location of the object and to effect movement of the right and left pupils 102, 106 to correspond to the determine location of the object. In the present embodiment, the predetermined value is set to 5. That is, the data is collected and recorded from all the IR sensors for five cycles after which the microprocessor 110 processes the recorded data to determine the location of the object and to effect corresponding movement of the right and left pupils 102, 106. However, any integer value greater than zero may be used as the predetermined value.

If the microprocessor 110 determines that the counter value is not equal to the predetermined value, then the method moves to step 403. Alternatively, if the microprocessor 110 determines that the counter value is equal to the predetermined value, the method moves to step 411. At this point, the microprocessor 110 has determined that five cycles of collecting and recording data from all the IR sensors has been completed.

At step 411, the microprocessor 110 resets the counter such that the counter value is equal to zero.

At step 412, the microprocessor 110 averages the five readings of the first sensed data and records the results as average first sensed data, averages the three readings of the second sensed data and records the result as average second sensed data, and averages the three readings of the third sensed data and records the result as average third sense data.

At step 413, the microprocessor 110 compares the values of the average first sensed data, the average second sensed data, and the average third sensed data. Based on the comparison, the microprocessor 110 determines which average sensed data has the highest value.

At step 414, the microprocessor 110 determines the location of the object to be in front of the IR sensor associated with the average sensed data having the highest value. For example, if at step 413, the microprocessor 110 determines that the first average sensed data has the highest value, then the microprocessor 110 determines that the location of the object is in front of the IR sensor 120. Similarly, if at step 413, the microprocessor 110 determines that the second average sensed data has the highest value, then the microprocessor 110 determines that the location of the object is in front of the IR sensor 121. Finally, if at step 413, the microprocessor 110 determines that the third average sensed data has the highest value, then the microprocessor 110 determines that the location of the object is in front of the IR sensor 122. Also, as discussed previously, the microcontroller 110 may calculate a difference between two different values recorded by two different IR sensors, and may determine that the object is placed between the two different IR sensors when the calculated difference is less than a predetermined threshold value.

Once the microprocessor 110 has determined the location of the object, at step 415, the microprocessor 110 may determine the current positions of the right and left pupils 102, 106. In various embodiments, the microprocessor 110 may instruct the right and left pupil sensors 140, 160 to respectively report the current positions of the right and left pupils 102, 106.

At step 416, the microprocessor 110 may effect horizontal movement of the right and left pupils 102, 106. In order to do so, the microprocessor 110 may first compare the reported current positions of the right and left pupils 102, 106 with the location of the object, as determined in step 414. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the fight and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined the location of the object, then the microprocessor determines that the positions of the right and left pupils 102, 106 should be changed to correspond to the determined location of the object. At this time, the microprocessor 110 may instruct the right pupil motor 150 to position the right pupil 102 such that the right pupil 102 is oriented (i.e., looking) towards the determined location of the object. Similarly, the microprocessor 110 may instruct the left pupil motor 170 to position the left pupil 106 such that the left pupil 106 is oriented (i.e., looking) towards the determined the location of the object.

The method then proceeds to step 403 and steps 403-416 are repeated. The method stops at 417. In this way, the location of the object is determined and the horizontal movement of the pupils 102, 106 is effected after every occurrence of a predetermined number of cycles, the predetermined number being equal to the predetermined value of the counter (e.g., five cycles). That is, the simulator allows for determination of the location of the object and for tracking of the object by the right and left pupils 102, 106 after every occurrence of a predetermined number of cycles. The method 400 stops when the tracking functionality is stopped. At this time, the microcontroller 110 places both the right and left pupils 102, 106 in their default positions.

Figure 5:
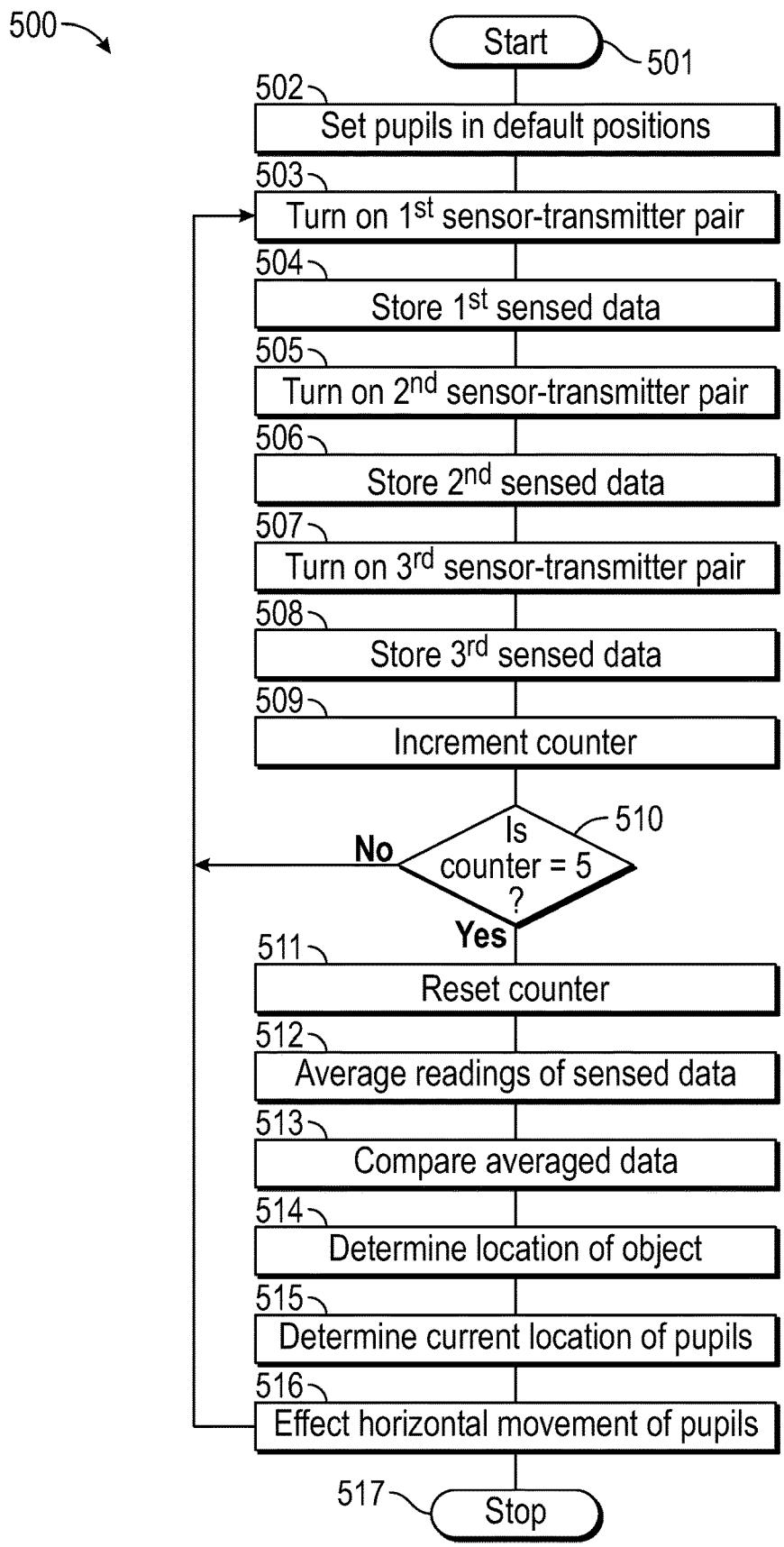
FIG. 5 illustrates an exemplary method 500 for performing simulation of horizontal movements in an independent tracking mode according to various embodiments of the present disclosure.

FIG. 5 illustrates an exemplary method 500 for performing simulation of horizontal movements in the independent tracking mode according to various embodiments of the present disclosure. In the independent tracking mode, the microprocessor 110 determines and effects the position of the right pupil 102 independently from the position of the left pupil 106. In various embodiments, the microprocessor 110 effects the position of the right pupil 102 based on the readings from the first and second sensor-transmitter pairs. That is, the microprocessor 110 determines the position of the right pupil 102 based on the readings from the sensor-transmitter pair including IR sensor 120 and IR transmitter 130 and the readings from the sensor-transmitter pair including IR sensor 121 and IR transmitters 131-132. Similarly, the microprocessor 110 effects the position of the left pupil 106 based on the readings from the second and third sensor-transmitter pairs. That is, the microprocessor 110 determines the position of the left pupil 106 based on the readings from the sensor-transmitter pair including IR sensor 121 and IR transmitters 131-132 and the readings from the sensor-transmitter pair including IR sensor 122 and IR transmitter 133.

Steps 501-512 of method 500 are identical to the steps 401-412 of method 400 discussed above with respect to FIG. 4. As such, description of the steps will be omitted in the description of the method 500.

At step 513, the microprocessor 110 first compares the values of the average first sensed data with the average second sensed data to determine which average sensed data has the highest value. As discussed below, the microprocessor 110 effects the position of the right pupil 102 based on the determined highest value from the first comparison. Second, the microprocessor 110 compares the values of the average second sensed data with the average third sensed data to determine which average sensed data has the highest value. As discussed below, the microprocessor 110 effects the position of the left pupil 106 based on the determined highest value from the second comparison.

For positioning the right pupil 102, at step 514, the microprocessor 110 determines the location of the object to be in front of the IR sensor associated with the average sensed data having the highest value. For example, if at step 513, the microprocessor 110 determines that the first average sensed data has the highest value, then the microprocessor 110 determines that the location of the object is in front of the IR sensor 120. Similarly, if at step 513, the microprocessor 110 determines that the second average sensed data has the highest value, then the microprocessor 110 determines that the location of the object is in front of the IR sensor 121. Also, as discussed previously, the microcontroller 110 may calculate a difference between two different values recorded by different IR sensors 120, 121, and may determine that the object is placed between the two different IR sensors 120, 121 when the calculated difference is less than a predetermined threshold value. Similarly, for positioning the left pupil 106, at step 514, the microprocessor 110 determines the location of the object to be in front of the IR sensor associated with the average sensed data having the highest value. For example, if at step 513, the microprocessor 110 determines that the second average sensed data has the highest value, then the microprocessor 110 determines that the location of the object is in front of the IR sensor 121. Similarly, if at step 513, the microprocessor 110 determines that the third average sensed data has the highest value, then the microprocessor 110 determines that the location of the object is in front of the IR sensor 122. Also, as discussed previously, the microcontroller 110 may calculate a difference between two different values recorded by different IR sensors 121, 122, and may determine that the object is placed between the two different IR sensors 121, 122 when the calculated difference is less than a predetermined threshold value.

Once the microprocessor 110 has determined the location of the object, at step 515, the microprocessor 110 may determine the current positions of the right and left pupils 102, 106. In various embodiments, the microprocessor 110 may instruct the right and left pupil sensors 140, 160 to respectively report the current positions of the right and left pupils 102, 106.

At step 516, the microprocessor 110 may effect horizontal movement of the right and left pupils 102, 106. In order to do so, the microprocessor 110 may first compare the reported current positions of the right and left pupils 102, 106 with the location of the object, as determined in step 514. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined the location of the object, then the microprocessor determines that the positions of the right and left pupils 102, 106 should be changed to correspond to the determined location of the object. At this time, the microprocessor 110 may instruct the right pupil motor 150 to position the right pupil 102 such that the right pupil 102 is oriented (i.e., looking) towards the determined location of the object, as determined based on the first comparison of step 513. Similarly, the microprocessor 110 may instruct the left pupil motor 170 to position the left pupil 106 such that the left pupil 106 is oriented (i.e., looking) towards the determined the location of the object, as determined based on the second comparison of step 513.

The method then proceeds to step 503 and steps 503-516 are repeated. The method stops at step 517. In this way, the location of the object is determined and the horizontal movement of the pupils 102, 106 is effected after every occurrence of a predetermined number of cycles, the predetermined number being equal to the predetermined value of the counter (e.g., five cycles). That is, the simulator allows for determination of the location of the object and for tracking of the object by the right and left pupils 102, 106 after every occurrence of a predetermined number of cycles. The method 500 stops when the tracking functionality is stopped. At this time, the microcontroller 110 places both the right and left pupils 102, 106 in their default positions.

In various embodiments, the simulator may be controlled to track objects using only one pupil. For example, the simulator may be controlled to track objects using only the right pupil 102, while the left pupil 106 may be placed in any of the exemplary positions discussed herein. Further, the left pupil 106 may be moved among the exemplary positions discussed below independently with respect to the tracking of the object by the right pupil 102.

Vertical Movement: As discussed above, the microcontroller 110 may effect movement of the right and left pupils 102, 106 for tracking objects in the horizontal direction as well as for simulating diseases. Similarly, the microcontroller 110 may also effect movement of the right and left pupils 102, 106 for tracking objects in the vertical direction as well as for simulating diseases. Simulation of vertical movement of the right and left pupils 102, 106 in accordance with placement and movement of an object (e.g., pencil, finger, etc.) or disease, such as nystagmus, blepharospasm, and ptosis, will now be described. Simulating vertical movement includes placing the object in front of the simulator and moving the object in a vertical plane. The simulator senses the presence and the movement of the object using the five IR sensors 120, 121, 122, 123, 124 and the four IR transmitters 130, 131, 132, 133, and allows for corresponding vertical movements of the tight and left pupils 102, 106. In various embodiments, the vertical movement of the right and left pupils 102, 106 may be controlled such that the right and left pupils 102, 106 move together. Alternatively, in various embodiments, the vertical movement of the right pupil 102 is controlled independently from the vertical movement of the left pupil 106.

Figure 6:
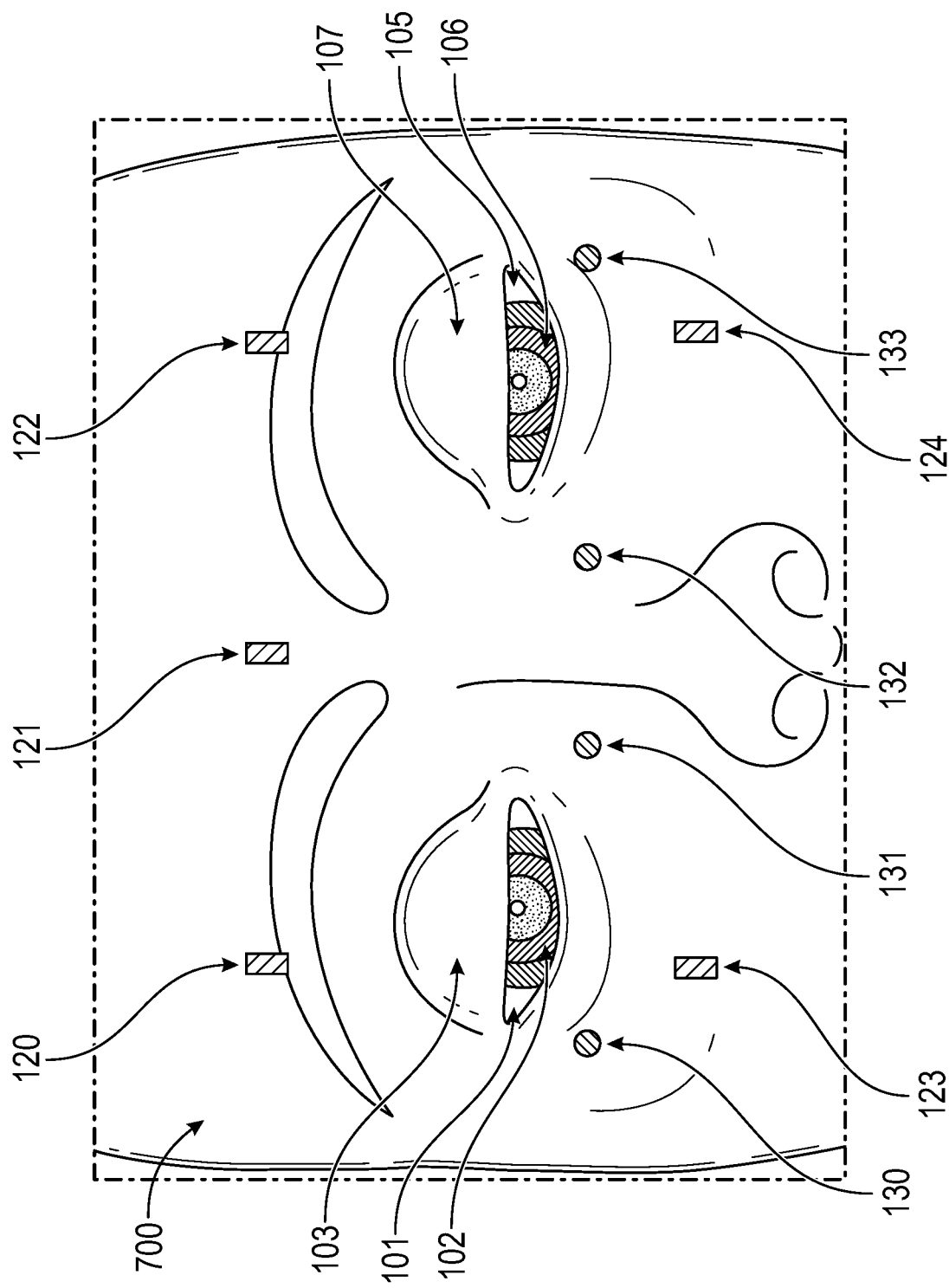
FIG. 6 illustrates a simulator 700 including the exemplary multipurpose eye motion trainer according to various embodiments of the present disclosure.

FIG. 6 illustrates a simulator 700 including the exemplary multipurpose eye motion trainer according to various embodiments of the present disclosure. The simulator 700 may be a manikin in the form of a human face, and may include an eye assembly. The eye assembly may include the above discussed right and left eyes 101, 105, and associated circuitry to control functions to be performed by the right and left pupils 102, 106. The associated circuitry for simulation of vertical movement may include five IR sensors 120, 121, 122, 123, 124, and four infrared (IR) transmitters 130, 131, 132, 133 that are electrically controlled by the microcontroller 110. Similar to the previously discussed simulator 200, the IR sensors and the IR transmitters of the simulator 700 may be placed under silicone skin (with special openings) of the simulator 700. This allows the simulator 700 to appear more lifelike.

In various embodiments, the IR sensors 120, 121, 122, may be placed above the eyes 101, 105 and the IR sensors 123, 124 may be placed below the 101, 105. For example, as shown in FIG. 6, the IR sensors 120, 121, 122 may be placed in a horizontal plane above the horizontal plane that includes the tight and left eyes 101, 105, and the IR sensors 123, 124 may be placed in a horizontal plane below the horizontal plane that includes the right and left eyes 101, 105. Also, the IR sensors may be arranged such that IR sensors 120 and 123 share a first vertical plane and IR sensors 122 and 124 share a second vertical plane. The IR transmitters 130, 131, 132, 133 may be placed in a horizontal plane in close proximity to the right and left eyes 101, 105. For example, as shown in FIG. 6, the IR transmitters 130, 131, 132, 133 may be placed in a horizontal plane near the horizontal plane that includes the right and left eyes 101, 105. In various embodiments, the eye movement and/or eye tracking is simulated using the IR sensors 120, 121, 122, 123, 124 and the IR transmitters 130, 131, 132, 133.

One or more of the five IR sensors 120, 121, 122, 123, 124 may be coupled to the sense IR response signals originating from one or more of the four IR transmitters 130, 131, 132, 133 to form respective sensor-transmitter pairs. For example, in the present embodiment for vertical movement, the IR sensors 120, 123 may be coupled to sense IR response signals resulting from IR transmissions from the IR transmitter 130. Additionally or alternatively, the IR sensors 120, 123 may be coupled to sense IR response signals resulting from IR transmissions from the IR transmitter 131. Also, the IR sensors 122, 124 may be coupled to sense IR response signals resulting from IR transmissions from the IR transmitter 133. Additionally or alternatively, the IR sensors 122, 124 may be coupled to sense IR response signals resulting from IR transmissions from the IR transmitter 132. An IR sensor may be coupled to an IR transmitter by tuning the sensing frequency of the IR sensor to the transmitting modulated frequency of the IR transmitter and/or by positioning the IR sensor in close proximity to the IR transmitter. The tuning of the sensing frequency to the transmitting modulated frequency results in the IR sensor being isolated from environmental conditions so as to allow accurate sensing of the IR response signal by the IR sensor. Of course, any of the one or more IR sensors may be coupled with any of the one or more IR transmitters to effect the vertical movement of the right and left pupils 102, 106.

Figure 7:
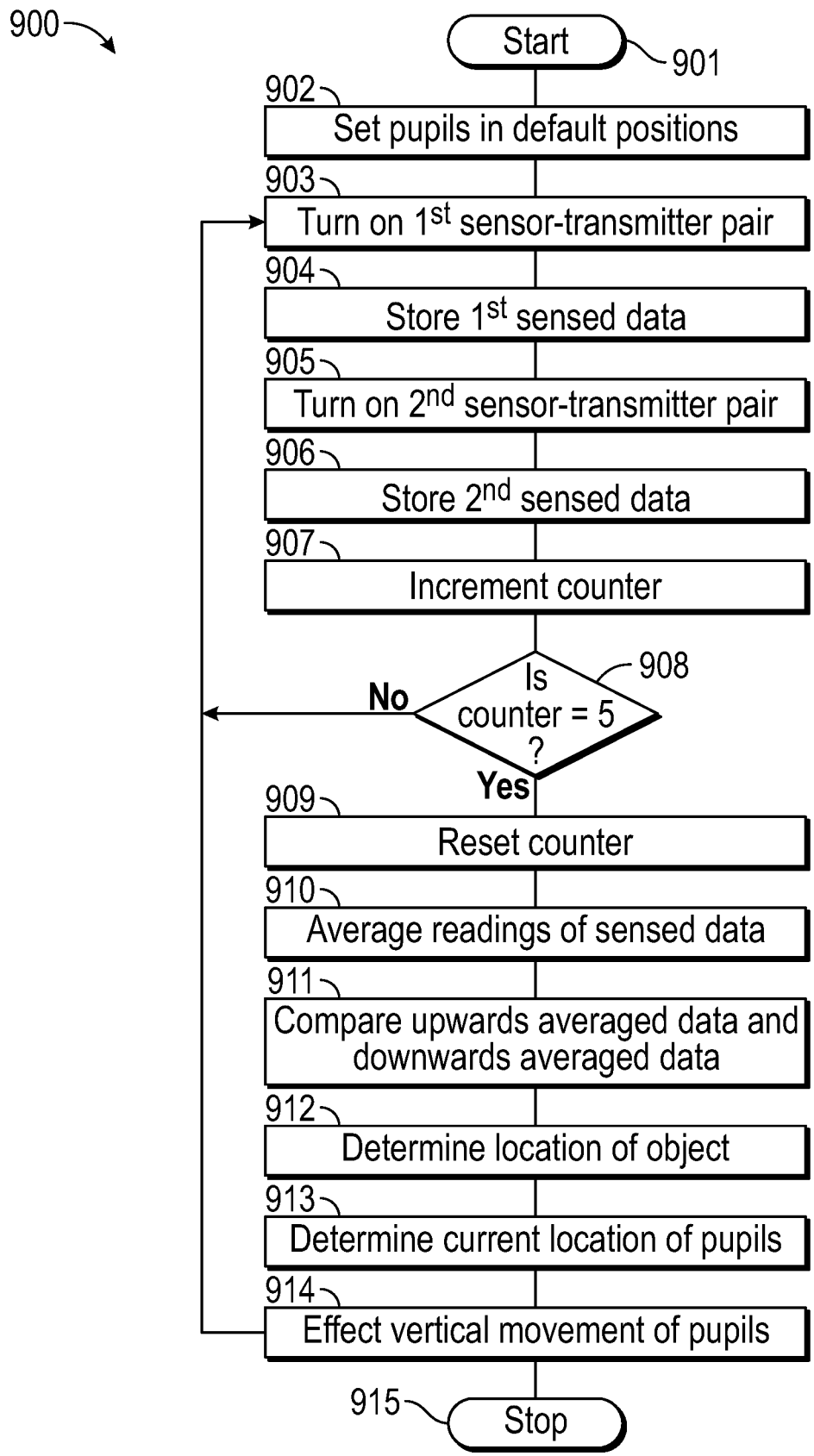
FIG. 7 illustrates an exemplary method 900 for performing simulation of vertical movements in a joint tracking mode according to various embodiments of the present disclosure.

FIG. 7 illustrates an exemplary method 900 for performing simulation of vertical movements in the joint tracking mode according to various embodiments of the present disclosure. The method starts at step 901. At step 902, the microcontroller 110 places both the right and left pupils 102, 106 in the default positions such that both eyes appear to be looking straight ahead. For example, the microcontroller 110 may instruct the right pupil motor 250 to place the right pupil 102 in its default position and may instruct the left pupil motor 270 to place the left pupil 106 in its default position. At this time, an object (e.g., finger, pencil, etc.) may be placed in front of the simulator.

At step 903, the microcontroller 110 turns on the first coupled sensor-transmitter pair of the IR sensors 120, 123 and the IR transmitter 130. In various embodiments, when the first coupled sensor-transmitter pair is turned on, the IR transmitter 130 may transmit a burst of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are separately sensed by the IR sensors 120, 123. As previously discussed, the IR sensors 120, 123 may sense the IR response signals and record respective values corresponding to the respectively sensed intensities of the reflected IR response signals. At this time, the first coupled sensor-transmitter pair of the IR sensors 120, 123 and the IR transmitter 130 may be turned off.

At step 904, the microprocessor 110 may store the IR response data sensed by the IR sensors 120, 123 in the electronic memory 180 as a reading of first-upwards and first-downwards sensed data. For example, the microprocessor 110 may store the IR response data sensed by the IR sensor 120 as first-upwards sensed data and may store the IR response data sensed by the IR sensor 123 as first-downwards sensed data.

At step 905, the microcontroller 110 may turn on the second coupled sensor-transmitter pair of the IR sensors 122, 124 and the IR transmitter 133. In various embodiments, when the second coupled sensor-transmitter pair is turned on, the IR transmitter 133 may transmit a burst of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are separately sensed by the IR sensors 122, 124. As previously discussed, the IR sensors 122, 124 may sense the IR response signals and record respective values corresponding to the respectively sensed intensities of the reflected IR response signals. At this time, the second coupled sensor-transmitter pair of the IR sensors 122, 124 and the IR transmitter 133 may be turned off.

At step 906, the microprocessor 110 may store the IR response data sensed by the IR sensors 122, 124 in the electronic memory 180 as a reading of second-upwards and second-downwards sensed data. For example, the microprocessor 110 may store the IR response data sensed by the IR sensor 122 as second-upwards sensed data and may store the IR response data sensed by the IR sensor 124 as second-downwards sensed data.

If the one or more IR sensors are additionally paired with one or more IR transmitters, than those sensor-transmitter pairs may be turned on and their data be recorded similarly as discussed in steps 903-906. For example, if one or more of the IR sensors 120, 123 are paired with IR transmitter 131 to form a third sensor-transmitter pair or of one or more of the IR sensors 122, 124 are paired with IR transmitter 132, then these sensor transmitter pairs may be turned on and the corresponding data be recorded.

At step 907, once all the sensor-transmitter pairs have been cycled through and sensed data from all the IR sensors has been recorded, the microprocessor 110 increments a counter having an initial value of zero. That is, at step 907, the microprocessor 110 increments the counter to have a value of 1. This signifies that one cycle of collecting and recording data from all the IR sensors-transmitter pairs has been completed.

At step 908, the microprocessor 110 determines whether the counter value is equal to a predetermined value. This predetermined value may be a predetermined number of cycles for collecting and recording data from all the IR sensors after which the microprocessor 110 processes the recorded data to determine the location of the object and to effect corresponding movement of the right and left pupils 102, 106. In the present embodiment, the predetermined value is set to 5. That is, the data is collected and recorded from all the IR sensors for five cycles after which the microprocessor 110 processes the recorded data to determine the location of the object and to effect corresponding movement of the right and left pupils 102, 106. However, any integer value greater than zero may be used as the predetermined value.

If the microprocessor 110 determines that the counter value is not equal to the predetermined value, then the method moves to step 903. Alternatively, if the microprocessor 110 determines that the counter value is equal to the predetermined value, the method moves to step 909. At this point, the microprocessor 110 has determined that five cycles of collecting and recording data from all the IR sensors has been completed.

At step 909, the microprocessor 110 resets the counter such that the counter value is equal to zero.

At step 910, the microprocessor 110 averages the five readings of the first-upwards sensed data and records the results as average first-upwards sensed data, averages the five readings of the first-downwards sensed data and records the results as average first-downwards sensed data, averages the five readings of the second-upwards sensed data and records the results as average second-upwards sensed data, and averages the five readings of the second-downwards sensed data and records the results as average second-downwards sensed data. In other words, the microprocessor 110 calculates the average first-upwards sensed data, the average first-downwards sensed data, the average second-upwards sensed data, and the average second-downwards sensed data.

At step 911, the microprocessor 110 compares the values of the average first-upwards sensed data, the average second-upwards sensed data, the average first-downwards sensed data, and the average second-downwards sensed data. Based on the comparison, the microprocessor 110 determines which average sensed data has the highest value.

At step 912, the microprocessor 110 determines the location of the object to be in front of the IR sensor associated with the average sensed data having the highest value. For example, if at step 911, the microprocessor 110 determines that the average first-upwards sensed data or the average second-upwards has the highest value, then the microprocessor 110 determines that the location of the object is in front of either IR sensor 120 or IR sensor 122. That is, the microprocessor 110 determines that the location of the object is in the upwards direction with respect to the default positions of the right and left pupils 102, 106. Alternatively, if at step 911, the microprocessor 110 determines that the average first-downwards sensed data or the average second-downwards sensed data has the highest value, then the microprocessor 110 determines that the location of the object is in front of the IR sensor 123 or IR sensor 124. That is, the microprocessor 110 determines that the location of the object is in the downwards direction with respect to the default positions of the right and left pupils 102, 106.

Also, the microcontroller 110 may calculate a difference between the two greatest average values, and may determine that the object is placed between the two different IR sensors associated with the two greatest average values when the calculated difference is less than a predetermined threshold value. For example, if at step 911, the microprocessor 110 determines that the average first-upwards (or second-upwards) sensed data and the average first-downwards (or second-downwards) sensed data are the two greatest average values, then the microprocessor 110 may calculate a difference between the average first-upwards (or second-upwards) sensed data and the average first-downwards (or second-downwards) sensed data. The microprocessor 110 may then determine that the vertical location of the object is in between IR sensors 120 and 123 (or between IR sensors 122 and 124) when the calculated difference is less than a predetermined threshold value.

Once the microprocessor 110 has determined the location of the object, at step 913, the microprocessor 110 may determine the current positions of the right and left pupils 102, 106. In various embodiments, the microprocessor 110 may instruct the right and left pupil sensors 240, 260 to respectively report the current positions of the right and left pupils 102, 106.

At step 914, the microprocessor 110 may effect vertical movement of the right and left pupils 102, 106. In order to do so, the microprocessor 110 may first compare the reported current positions of the right and left pupils 102, 106 with the location of the object, as determined in step 912. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined location of the object, then the microprocessor determines that the positions of the right and left pupils 102, 106 should be changed to correspond to the determined location of the object. At this time, the microprocessor 110 may instruct the right and left pupil motors 250, 270 to position the right and left pupils 102, 106 such that the right and left pupils 102, 106 are oriented (i.e., looking) towards the determined location of the object.

The method then proceeds to step 903 and steps 903-914 are repeated. The method stops at 915. In this way, the location of the object is determined and the vertical movement of the pupils 102, 106 is effected after every occurrence of a predetermined number of cycles, the predetermined number being equal to the predetermined value of the counter (e.g., five cycles). That is, the simulator 700 allows for determination of the location of the object and for tracking of the object by the right and left pupils 102, 106 after every occurrence of a predetermined number of cycles. The method 900 stops when the tracking functionality is stopped. At this time, the microcontroller 110 places both the right and left pupils 102, 106 in their default positions.

Figure 8:
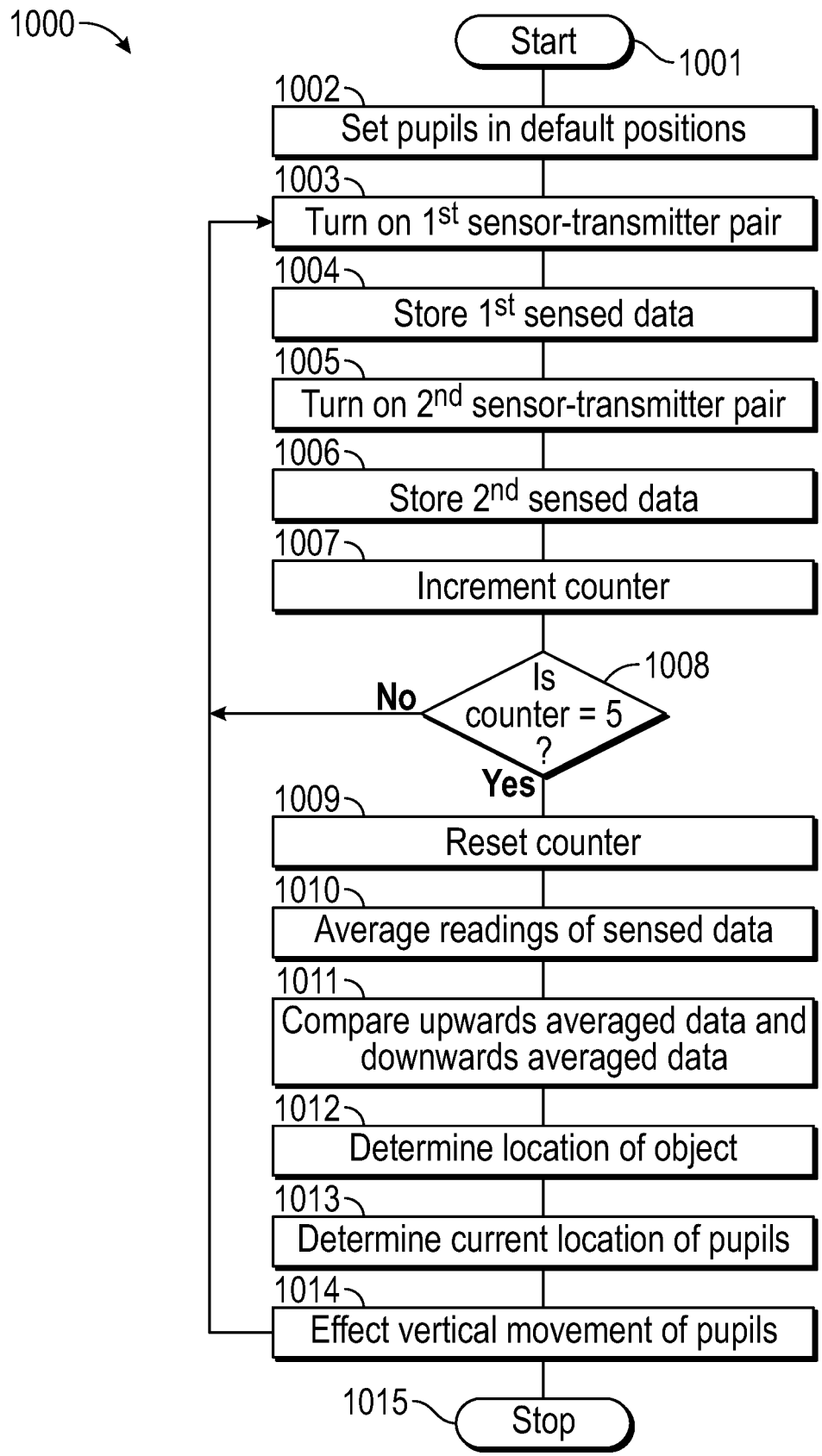
FIG. 8 illustrates an exemplary method 1000 for performing simulation of vertical movements in an independent tracking mode according to various embodiments of the present disclosure.

FIG. 8 illustrates an exemplary method 1000 for performing simulation of vertical movements in the independent tracking mode according to various embodiments of the present disclosure. In the independent tracking mode, the microprocessor 110 determines and effects the position of the right pupil 102 independently from the position of the left pupil 106. In various embodiments, the microprocessor 110 effects the position of the right pupil 102 based on the readings from the first sensor-transmitter pair. That is, the microprocessor 110 determines the position of the right pupil 102 based on the readings from the sensor-transmitter pair including IR sensors 120, 123 and IR transmitter 130 (and the readings from the sensor-transmitter pair including IR sensors 120, 123 and IR transmitter 131, if paired). Similarly, the microprocessor 110 effects the position of the left pupil 106 based on the readings from the second sensor-transmitter pair. That is, the microprocessor 110 determines the position of the left pupil 106 based on the readings from the sensor-transmitter pair including IR sensors 122, 124 and IR transmitter 133 (and the readings from the sensor-transmitter pair including IR sensors 122, 124 and IR transmitter 132, if paired).

Steps 1001-1010 of method 1000 are identical to the steps 901-910 of method 900 discussed above with respect to FIG. 8. As such, description of the steps will be omitted in the description of the method 1000.

At step 1011, the microprocessor 110 first compares the values of the average first-upwards sensed data with the average first-downwards sensed data to determine which average sensed data has the highest value. As discussed below, the microprocessor 110 effects the position of the right pupil 102 based on the determined highest value from the first comparison. Second, the microprocessor 110 compares the values of the average second-upwards sensed data with the average second-downwards sensed data to determine which average sensed data has the highest value. As discussed below, the microprocessor 110 effects the position of the left pupil 106 based on the determined highest value from the second comparison.

For positioning the right pupil 102, at step 1012, the microprocessor 110 determines the location of the object to be in front of the IR sensor associated with the average sensed data having the highest value. For example, if at step 1011, the microprocessor 110 determines that the average first-upwards sensed data has the highest value, then the microprocessor 110 determines that the location of the object is in front of the IR sensor 120. Similarly, if at step 1011, the microprocessor 110 determines that the average first-downwards sensed data has the highest value, then the microprocessor 110 determines that the location of the object is in front of the IR sensor 123. Similarly, for positioning the left pupil 106, at step 1012, the microprocessor 110 determines the location of the object to be in front of the IR sensor associated with the average sensed data having the highest value. For example, if at step 1011, the microprocessor 110 determines that the average second-upwards sensed data has the highest value, then the microprocessor 110 determines that the location of the object is in front of the IR sensor 122. Similarly, if at step 1011, the microprocessor 110 determines that the average second-downwards sensed data has the highest value, then the microprocessor 110 determines that the location of the object is in front of the IR sensor 124. Also, as discussed previously, the microcontroller 110 may calculate a difference between two different values recorded by two different IR sensors, and may determine that the object is placed between the two different IR sensors when the calculated difference is less than a predetermined threshold value.

Once the microprocessor 110 has determined the location of the object, at step 1013, the microprocessor 110 may determine the current positions of the right and left pupils 102, 106. In various embodiments, the microprocessor 110 may instruct the right and left pupil sensors 240, 260 to respectively report the current positions of the right and left pupils 102, 106.

At step 1014, the microprocessor 110 may effect vertical movement of the right and left pupils 102, 106. In order to do so, the microprocessor 110 may first compare the reported current positions of the right and left pupils 102, 106 with the location of the object, as determined in step 1012. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined location of the object, then the microprocessor determines that the positions of the right and left pupils 102, 106 should be changed to correspond to the determined location of the object. At this time, the microprocessor 110 may instruct the right pupil motor 250 to position the right pupil 102 such that the right pupil 102 is oriented (i.e., looking) towards the determined location of the object, as determined based on the first comparison of step 1011. Similarly, the microprocessor 110 may instruct the left pupil motor 270 to position the left pupil 106 such that the left pupil 106 is oriented (i.e., looking) towards the determined the location of the object, as determined based on the second comparison of step 1011.

The method then proceeds to step 1003, and steps 1003-1014 are repeated. In this way, the location of the object is determined and the vertical movement of the pupils 102, 106 is effected after every occurrence of a predetermined number of cycles, the predetermined number being equal to the predetermined value of the counter (e.g., five cycles). That is, the simulator allows for determination of the location of the object and for tracking of the object by the right and left pupils 102, 106 after every occurrence of a predetermined number of cycles. The method 1000 stops at step 1015 when the tracking functionality is stopped. At this time, the microcontroller 110 places both the right and left pupils 102, 106 in their default positions.

In various embodiments of the methods 900, 1000, the microcontroller 110 may, in addition to comparing the calculated average sensed data values, calculate a difference between the average sensed data values to determine the location of the object. For example, with respect to method 1000, the microcontroller 110 may calculate a difference between the average first-upwards (and/or second-upwards) sensed data and the average first-downwards (and/or second-downwards) sensed data. The microcontroller 110 may then compare the calculated difference with a predetermined threshold value. Based on this comparison, if the microcontroller 110 determines that the calculated difference is greater than the predetermined threshold value, then the method proceeds to step 1012, as discussed above with respect to FIG. 8. However, if the microcontroller 110 determines that the calculated difference is equal to or lower than the predetermined threshold value, then the microcontroller 110 may determine that the object is located substantially in between the IR sensor 120 (or IR sensor 122) and IR sensor 123 (or IR sensor 124). Based on this determination of the location of the object, the microcontroller 110 may place the right and left pupils 102, 106 in the default positions to be oriented (i.e., looking) towards that determine location of the object.

In various embodiments, the simulator may be controlled to track objects using only one pupil. For example, the simulator may be controlled to track objects using only the right pupil 102, while the left pupil 106 may be placed in any of the exemplary positions discussed herein. Further, the left pupil 106 may be moved among the exemplary positions discussed below independently with respect to the tracking of the object by the right pupil 102.

In various embodiments, the simulated positions of the right and left pupils 102, 106 may be effected by running pre-programmed routines to simulate conditions of normal or impaired eyes. For example, vertical positions of the right and left pupils 102, 106 may be effected by running pre-programmed routines to simulate conditions of normal or impaired eyes. In addition, a combination of horizontal and vertical positions of the right and left pupils 102, 106 may be effected by running pre-programmed routines to simulate rolling of the right and left pupils 102, 106 in a circular motion.

In various embodiments, the pre-programmed routines may be stored on memory 180 or on an external memory (not shown). An operator of the simulator 200 may use the input interface 190 to select a pre-programmed routine to be run by the microprocessor 110. Based on the inputs received at the input interface 190, the microprocessor 110 may retrieve and execute the selected pre-programmed routine from the memory 180 or the external memory. The input interface 190 may be directly connected to the microprocessor 110 or may be connected to the microprocessor 110 via another central processing unit.

Figure 9:
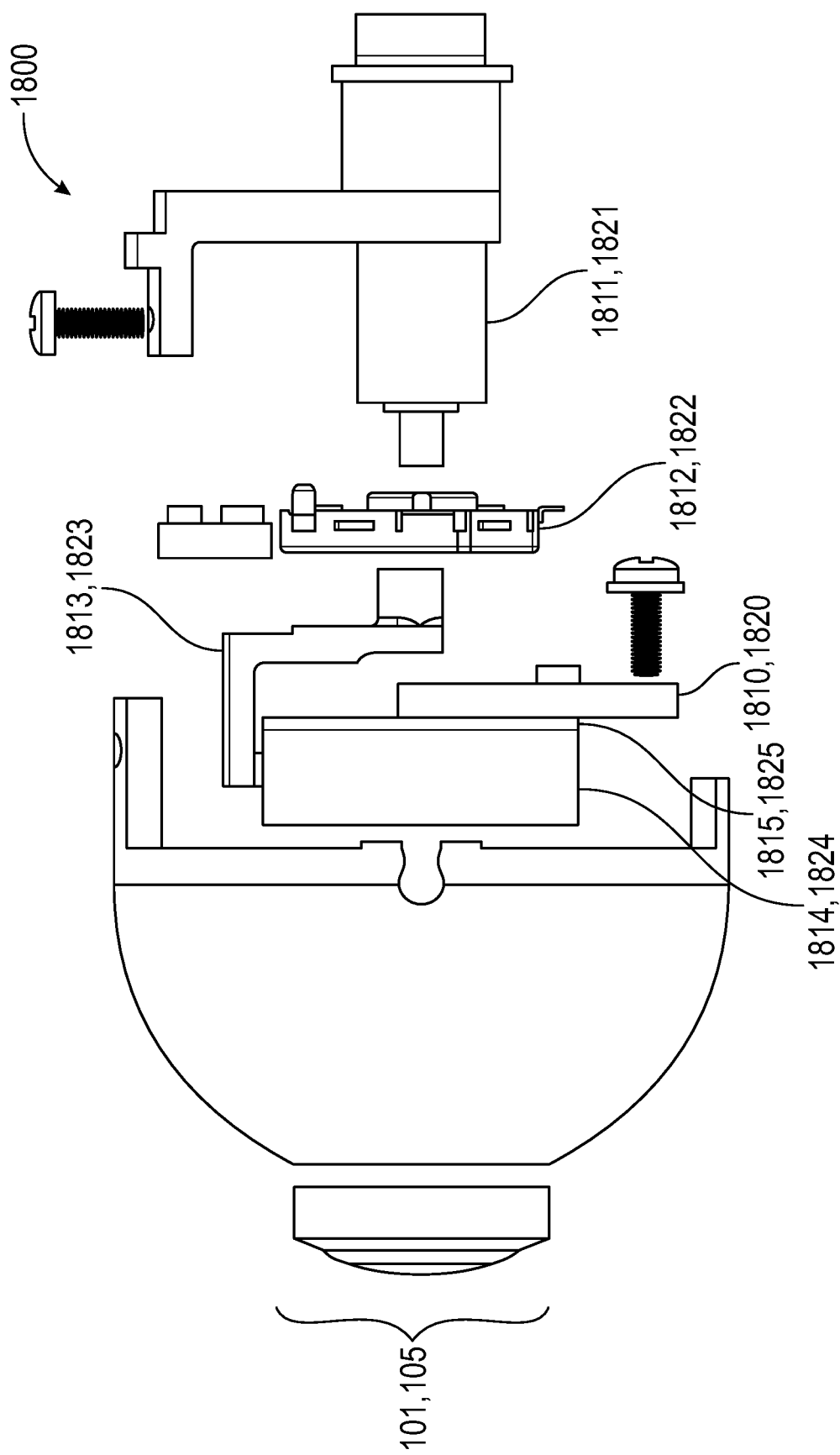
FIG. 9 illustrates an electro-mechanical block diagram 1800 of the simulator according to various embodiments of the present disclosure.

FIG. 9 illustrates an electro-mechanical block diagram 1800 of the simulator according to various embodiments of the present disclosure. The simulator (see FIGS. 2 and 6) may be a manikin in the form of a human face, and may include the eye assembly discussed above. The eye assembly may include the right eye 101 of the simulator, the left eye 105 of the simulator, and associated circuitry to control functions to be performed by the right and left eyes 101, 105. For pupillary change functions, the simulator may include the microcontroller 110 electrically connected to a right light sensor 1810, a right iris motor 1811, a left light sensor 1820, and a left iris motor 1821 to actuate constriction or dilation. The right and left iris motors 1811, 1821 are respectively connected to right and left iris size sensors 1812, 1822 via right and left rotating arms 1813, 1823. The right and left rotating arms 1813, 1823 are respectively connected to right and left circular apertures 1814, 1824, which represent the right and left irises in the right and left eyes 101, 105. The right and left apertures 1814, 1824 are adjacently placed next to right and left pupil backgrounds 1815, 1825, respectively. In various embodiments, the electro-mechanical components to effect pupillary changes are coupled to each other coaxially.

Figure 10:
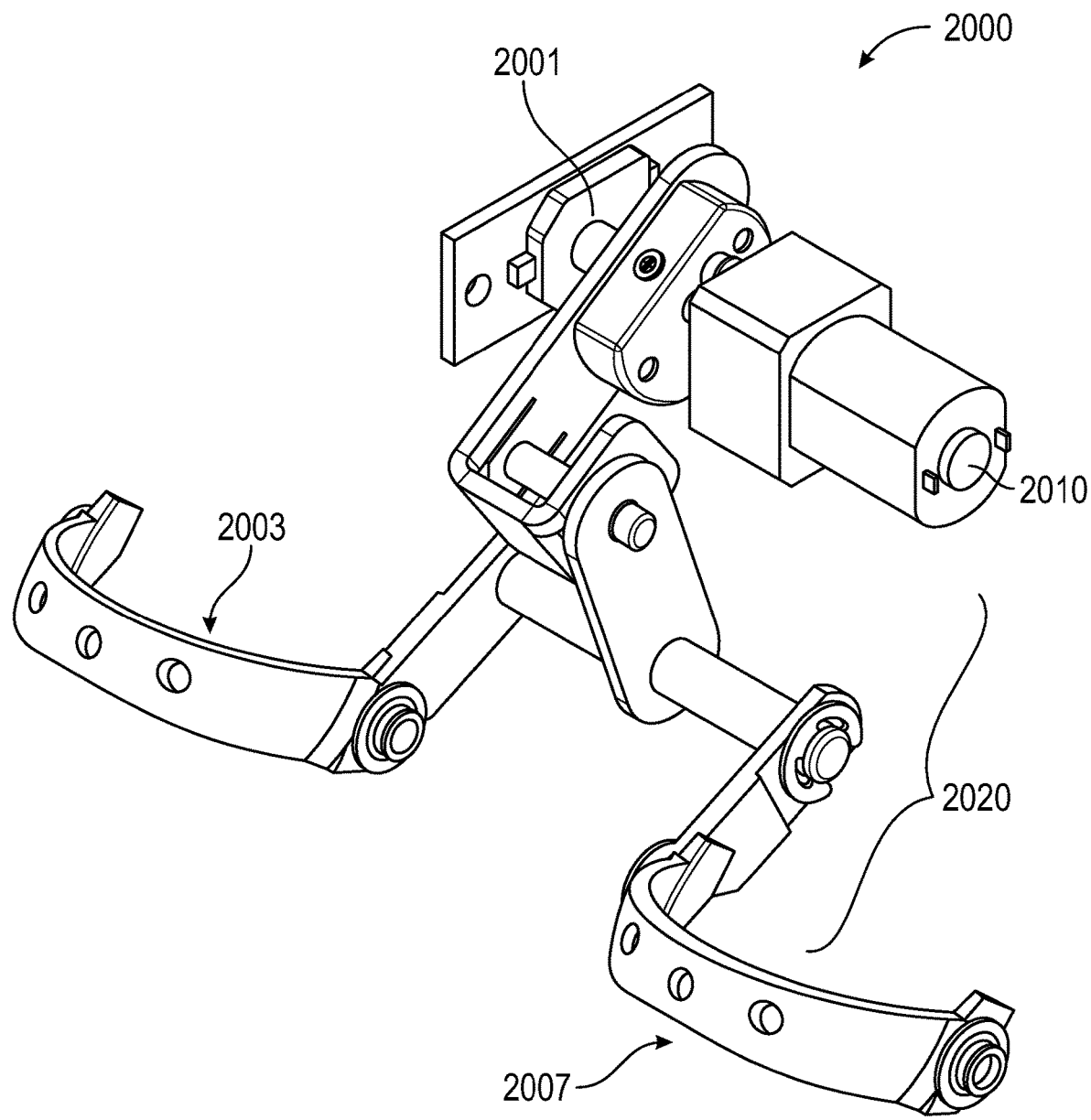
FIG. 10 illustrates an electro-mechanical block diagram 2000 of the simulator according to various embodiments of the present disclosure.

FIG. 10 illustrates an electro-mechanical block diagram 2000 of the simulator according to various embodiments of the present disclosure. As previously discussed, the eye assembly may include the right eye 101 having the right eyelid 103, the left eye 105 having the left eyelid 107, and associated circuitry to control functions to be performed by the right and left eyes 101, 105. In various embodiments, the right and left eyelids 103, 107 may be moved together or independently to simulate various types of blepharospasm and ptosis. In some embodiments, separate motors may be provided to control the right eyelid 103 and the left eyelid 107. As discussed above, ptosis simulations may involve the use of various motors to lower the eyelids 103, 107 and blepharospasm simulations may involve the use of various motors to effect oscillations of the eyelids 103, 107.

The electro-mechanical block diagram 2000 of the simulator shown in FIG. 10 may also be used to provide blinking motions. Blinking may be described as a physiological response which involves the closing and opening of an eyelid of an eye. Blinking is a normal reflex and protects the eyes from dryness, and also regulates tears to nourish and cleanse the surface of the eye. The blinking rate, which is the rate at which an eyelid closes and opens per unit of time, is an important medical indicator for healthy eyes. For example, healthy eyes exhibit a low rate of blinking of about 5-10 blinks per minute. On the other hand, an excessive blinking rate of about 30 blinks per minute and higher indicates unhealthy conditions such as dry eyes, nervousness, eye irritation, or psychiatric conditions. In various embodiments, the presently disclosed simulator realistically replicates the blinking of a human eye in a way that is useful for medical educational and diagnostic purposes.

In various embodiments, the simulator is configured to simulate blinking of human eyes. For example, the eyelids 103, 107 are operated to open and close to simulate blinking. In various embodiments, the rate, pattern, and speed of blinking are controlled by the control system illustrated in FIG. 10. In some instances the rate of blinking ranges from 5 blinks per minute to 30 blinks per minute. However, ranges outside of this are used in some embodiments. Further, the eyes can be maintained in an open position or a closed position. The speed of the blinks can be controlled as well. In some instances, the speed of each blink from an open position to a closed position and back to the open position is approximately 200 ms. However, the speed of the blinks can be increased or decreased as desired.

In various embodiments, the right and left eyelids 103, 107 are moved together to simulate blinking. For blinking functions, the simulator may include the microcontroller 110 electrically connected to an eyelid position sensor 2001 and a blink motor 2010 to actuate the right and left eyelids 103, 107 to simulate blinking. In various embodiments, the blinking of the right and left eyelids 103, 107 may be controlled independently, and each eyelids may have a dedicated blink motor to actuate the independently simulate blinking. The blinking may involve the right and left eyelids 103, 107 moving between an open position and a closed position, with the open position being the default position of the eyelids 103, 107. The blink motor 2010 may be attached to a four bar linkage 2020 capable of relaying the torque of the blink motor 2010 to two rotatable curved parts 2003, 2007. The rotatable curved parts 2003, 2007 may be covered by silicone material serving as the eyelids 103, 107. As such, when the microcontroller 110 operates the blink motor 2010 to rotate, the four bar linkage 2020 relays the torque to the two rotatable curved parts 2003, 2007 (i.e., the eyelids 103, 107) to simulate human blinking motion. In some embodiments, the blink motors 2010 are used to effect various motions in the eyelids 103, 107 relating to blepharospasm and ptosis simulations. For example, the microcontroller 110 may control the blink motor 2010 to cause rapid vertical oscillations in the right and left eyelids 103, 107 in an exemplary blepharospasm simulation.

The microcontroller 110 may instruct the eyelid position sensor 2001 to report the current position of the two rotatable curved parts 2003, 2007 (i.e., the eyelids 103, 107). Further, the microcontroller 110 may continuously receive electrical signals from the eyelid position sensor 2001 to continuously monitor positions of the eyelids 103, 107. In various embodiments, the microcontroller 110 may continuously monitor the position of the eyelids 103, 107 when the blinking is actuated between the open and closed positions. During the monitoring, when the microcontroller 110 determines that the eyelids 103, 107 have reached the closed position, the microcontroller 110 may transmit electrical signals to reverse the rotation of the blink motor 1410 so that the eyelids 103, 107 are rotated to the open position.

In various embodiments, the sensors 140, 160, 240, 260, 1812, 1822, 2001 discussed above with respect to sensing positions of the pupils, size of the pupils, and positions of the eyelids may be rotary potentiometers. The rotary potentiometers may be electro-mechanically connected to the microcontroller 110 and to shafts of the various motors discussed above. The rotary potentiometers may be used as both the dividers to obtain adjustable output voltages. As a motor shaft rotates, the wiper (i.e., the sliding contact) of the corresponding rotary potentiometer slides along the resistive body between the terminals of the potentiometer. The sliding of the wiper provides a reading of the adjustable output voltage.

The microcontroller 110 monitors the adjustable output voltage, and refers to respective predetermined associations between output voltages and positions of the pupils, size of the pupils, or the positions of the eyelids to determine the respective current positions. For example, the microcontroller 110 may monitor the adjustable output voltage output by the right pupil position sensor 140, and refer to a predetermined association between the output voltage of the right pupil position sensor 140 and position of the right pupil 102 to determine a current position of the right pupil 102. Similarly, the microcontroller 110 may monitor the adjustable output voltage output by the eyelid position sensor 1801, and refer to a predetermined association between the output voltages of the eyelid position sensor 1801 and positions of the right and left eyelids 103, 107 to determine current positions of the right and left eyelids 103, 107. Finally, the microcontroller 110 may monitor the adjustable output voltage output by the left iris size sensor 1822, and refer to a predetermined association between the output voltages of the left iris size sensor 1822 and sizes of the left iris 1824 to determine a current size of the iris 1824. In addition to determining current positions and sizes, as discussed above, the microcontroller 110 may also use the monitored adjustable output voltages to confirm that the effected changes in the positions of the pupils and/or the eyelids and in the sizes of the irises have been accurately effected.

Mechanisms: As discussed previously, the microcontroller 110 may effect changes in the positions of the right and left pupils 102, 106 to simulate horizontal movements, vertical movements, and/or combination of horizontal and vertical movements. These movements of the right and left pupils 102, 106 in the various directions may be achieved by using a two axis gimbal, which is mounted to another rotating gimbal so that both the gimbals may rotate simultaneously to orient the pupils in any combination of horizontal and vertical rotation. This exemplary configuration of the gimbals also allows the vertical movement of the pupils 102, 106 to be independent from the horizontal movement of the pupils 102, 106. In various embodiments, the simulators according to the present disclosure may include two mechanisms to effect displacement of the right and left pupils 102, 106 in the various directions. For example, simulators may include a right mechanism to effect displacement of the right pupil 102 and a left mechanism to effect displacement of the left pupil 106. These motions may be used independently or together in nystagmus simulations as described above. For example, a simulation of pendular nystagmus may include using the gimbals to effect a 2 degree oscillation in a horizontal motion and a 5 degree oscillation in a vertical motion. In some embodiments, separate motors are provided for each type of motion as described in FIG. 13.

Figure 11:
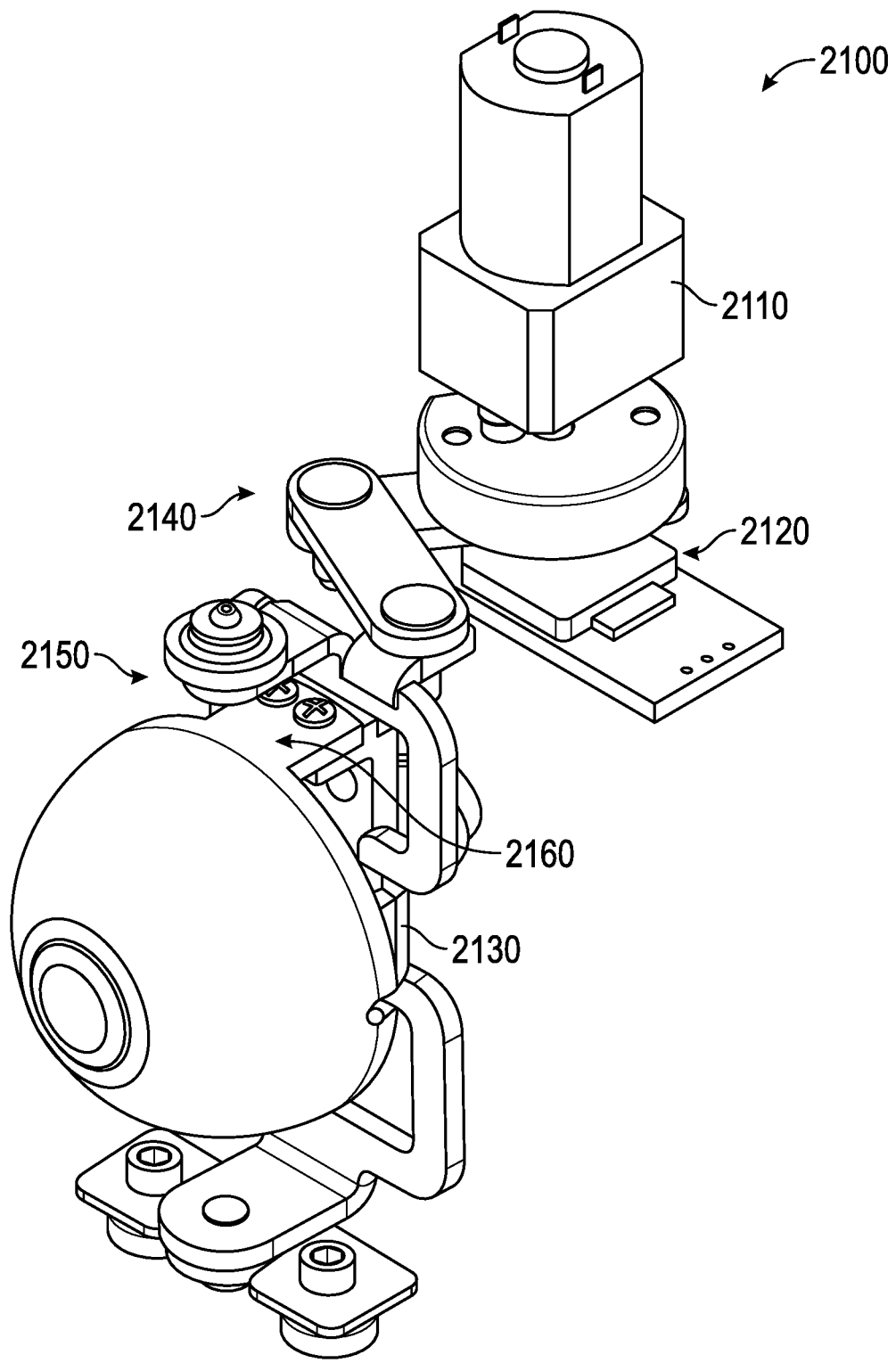
FIG. 11 illustrates an exemplary mechanism 2100 used for horizontal movement of a pupil (right or left) according to various embodiments of the present disclosure.

FIG. 11 illustrates an exemplary mechanism 2100 used for horizontal movement of a given pupil (right or left) according to various embodiments of the present disclosure. In various embodiments, the mechanism 2100 effects movement of a given pupil (right or left) in the horizontal direction. Each mechanism 2100 may include a pupil position motor 2110 (150 or 170), a pupil position sensor 2120 (140 or 160), a gimbal 2130, a lever 2140, and bearings 2150 for fixedly attaching the gimbal 2130 to a frame 2160 connected to the backend of a given pupil 102, 106. The motor assembly 2110 is electronically connected to the microcontroller 110. As discussed previously, the microcontroller 110 may instruct the pupil position motor 2110 to change the horizontal position of the right or left pupil. Once instructed, the pupil position motor 2110 rotates to effect movement of the lever 2140 that is attached to the gimbal 2130. As the lever 2140 moves, the gimbal 2130 rotates horizontally about an axis passing through the bearings 2150. As the gimbal 2130 rotates, the fixedly attached frame 2160 and, therefore, the pupil 102, 106 rotates within the exemplary range of horizontal movement for the right and left pupils 102, 106 illustrated in FIG. 3A. The right and left pupils 102, 106 may be controlled together. Alternatively, the right and left pupils 102, 106 may be controlled independently to allow simulation of eyes converging towards the nose or to exhibit diplopia or strabismus.

Figure 12:
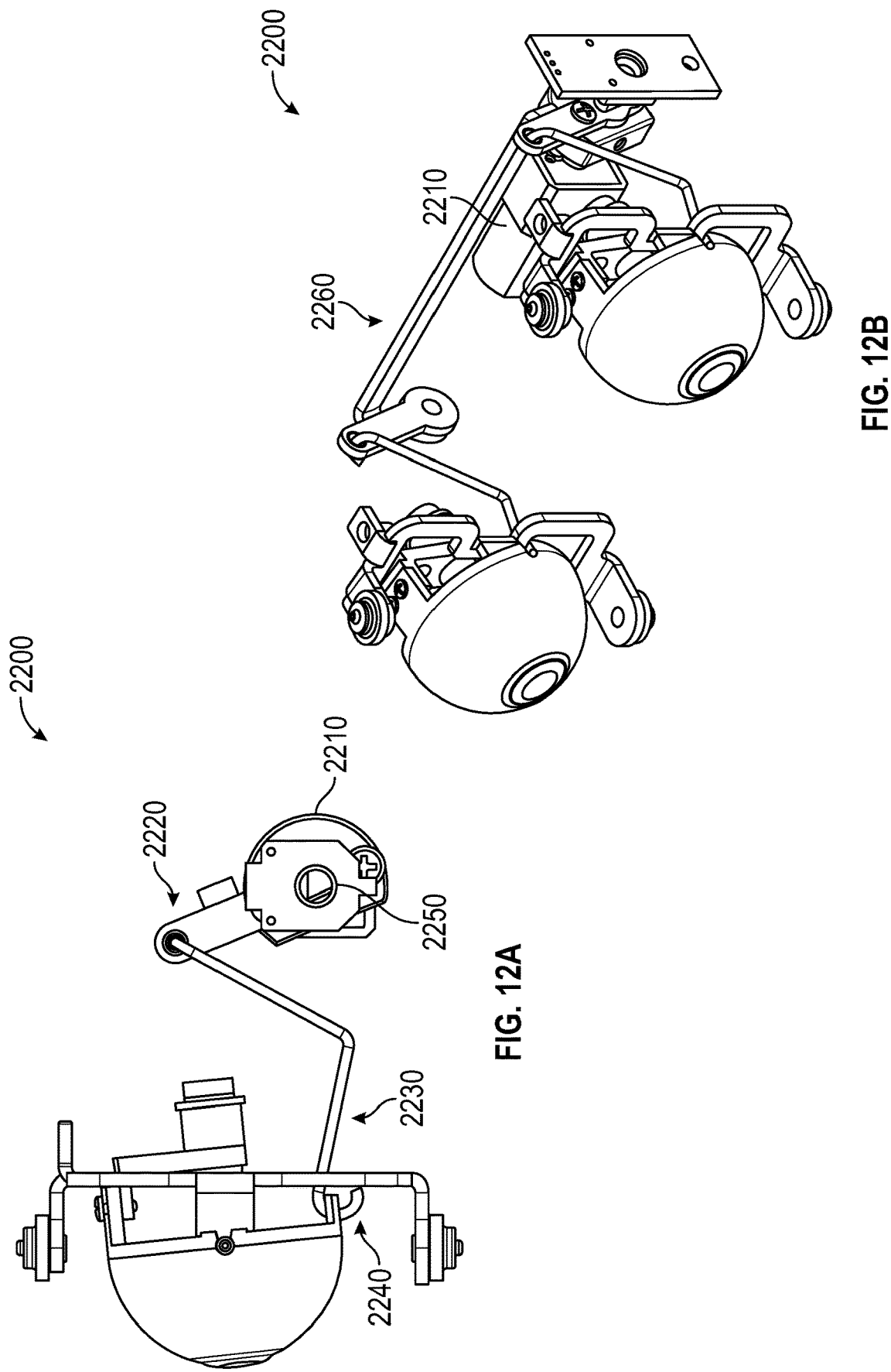
FIGS. 12A-B illustrate exemplary mechanisms 2200 used for vertical movement of a pupil (right or left) according to various embodiments of the present disclosure.

FIGS. 12A-B illustrate exemplary mechanisms 2200 used for vertical movement of a given pupil (right or left) according to various embodiments of the present disclosure. In various embodiments, the mechanism 2200 effects movement of a given pupil (right or left) in the vertical direction. Each mechanism 2200 may include a pupil position motor 2210 (250 or 270), a pupil position sensor 2250 (240 or 260), a gimbal assembly 2220, a lever 2230, a frame loop 2240 of the frame 2160 connected to the backend of a given pupil 102, 106. As discussed previously, the microcontroller 110 may instruct the pupil position motor 2210 to change the vertical position of the right or left pupil. Once instructed, the pupil position motor 2210 rotates to effect movement of the gimbal assembly 2220 that is attached to the lever 2230. As the lever 2230 moves, the crank arm 2230 is moved. As seen in FIGS. 12A-B, the crank arm 2230 is curved at the end proximal to the pupil 102, 106 and is attached to the frame loop 2240. The frame loop 2240 is either part of the frame 2160 is fixedly attached to the frame 2160. The movements of the crank arm 2230 attached to the frame loop 2240 rotate the pupil 102, 106 within the exemplary range of vertical movement for the right and left pupils 102, 106.

A center at the back of the frame 2160 may be connected to a center of the gimbal 2230, the connection serving as a fulcrum for the vertical rotation of the pupil 102, 106. As shown in FIG. 12B, the right and left pupils 102, 106 may be controlled together by using a hooked rod 2260 connecting the mechanisms for both the pupils 102, 106. Alternatively, the right and left pupils 102, 106 may be controlled independently to allow simulation of previously discussed pupil movements. In order to make the vertical rotation of the pupil 102, 106 independent from the horizontal rotation of the pupil 102, 106, the movement of the vertical gimbal 2220 should be unaffected by the horizontal rotation of the gimbal 2230. This may be achieved by using the crank arm 2230 that does not interfere with the horizontal rotation of the gimbal 2130. The mechanism 2200 also includes mechanical hard stops at both ends to ensure safe limits to the vertical rotation of the pupils 102, 106.

In human eyes, the right and left eyelids 103, 107 generally move upward and downward along with the upward and downward movement of the right and left pupils 102, 106. This is called eyelid following. Likewise, medical simulators may test and diagnose this phenomenon. The present simulator mimics the lifelike motion of the eyelids during eyelid following.

In some embodiments, the motion of the right and left eyelids 103, 107 relates to the vertical motion of the right and left pupils 102, 106. For example, as the right and left pupils 102, 106 move upward or downward, the right and left eyelids 103, 107 follow the right and left pupils 102, 106 to maintain a constant distance between the pupils and the eyelids. Furthermore, when the right pupil 102 moves downward, the right eyelid 103 follows the right pupil to maintain a constant distance between the right pupil 102 and the right eyelid 103. In this case, the right eyelid 103 moves downward towards its closed position but remains open enough to maintain the constant distance. Similarly, when the left pupil 106 moves upward, the left eyelid 107 follows the left pupil 106 to maintain a constant distance between the left pupil 106 and the left eyelid 107. In this case, the left eyelid 107 moves upwards past its open position to maintain the constant distance. When the right and left pupils 102, 106 are looking substantially straight, the right and left eyelids are positioned in their nominal open positions. The simulator may employ the same mechanisms as employed for the eyelid blinking and vertical motion of the pupils discussed above. The right and left pupils 102, 106 act as the master since the right and left eyelids 103, 107 react to the movement of the right and left pupils 102, 106. In some simulations, such as blepharospasm (as discussed in relation to FIGS. 17-19), the eyelids 103, 107 may be moved independently of the pupils 102, 106, or the eyelids 103, 107 may be moved along with the pupils 102, 106, as discussed above.

In addition to the above discussed preprogrammed routines, the simulator is configured to allow direct, real-time control of the positioning of the right and left pupils 102, 106 by using computer input devices, such as, the keyboard, mouse, or joystick connected through the input/output interface 190. The user may move the right and left pupils 102, 106 to any position that is a normal human lifelike position. In various embodiments, a graphical display may be presented to the user on the display connected through the input/output interface 190. The graphical display may depict an eye with a pupil and an iris. In various embodiments, a user may control the positioning of the right and left pupils 102, 106 on the simulator by controlling the position of the pupil of the graphical eye. The user may control the pupil of the graphical eye by moving the mouse cursor or the joystick to change the position of the pupil of the graphical eye, and thereby allow the microcontroller 110 to effect movement of the right pupil 102, the left pupil 106, or both. The user may also use a finger or stylus on a touch screen display and control the pupil of the graphical eye to change the position of the right pupil 102, the left pupil 106, or both.

As the cursor/joystick/finger moves, the microcontroller 110 receives the electrical signals associated with these movements through the input/output interface 190, and effects corresponding movements of the right and left pupils 102, 106. For example, a computer or processor connected to the cursor/joystick/finger provides the location of the cursor/joystick/finger in reference to the pupil of the graphical eye, and the microcontroller 110 converts the location of the pupil to the corresponding simulator positions of the right and left pupils 102, 106. The microcontroller may employ a pre-stored map having locations on the display screen depicting the graphical eye plotted to corresponding locations of the right and left pupils 102, 106 on the simulator. In various embodiments, when the cursor/joystick/finger is moved outside the graphical eye, the right and left pupils 102, 106 may be positioned in their default positions. The microcontroller 110 is configured to effect movements of the right and left pupils 102, 106 in real-time in any direction (e.g., vertical, horizontal, or both) either independently or together with respect to each other.

The system may also include pre-programmed patterns for the eye assemblies (including combinations of movement and blinking) to simulate various patient scenarios. The system may also be configured to allow combinations of real-time control via cursor, joystick or other input with the pre-programmed patterns. For example, the pre-programmed pattern may continue until a control input for a real-time control is received. Similarly, the system may also be configured to allow combinations object tracking with the pre-programmed patterns. For example, the pre-programmed pattern may continue until a tracking object is detected by one of the sensors and/or an input for an object tracking is received from a user. The tracking, real time movement, and preprogrammed movement can be combined among themselves. For example, the tracking can control the horizontal movement while the joystick can be used to control the vertical movement of a pupil.

Figure 13:
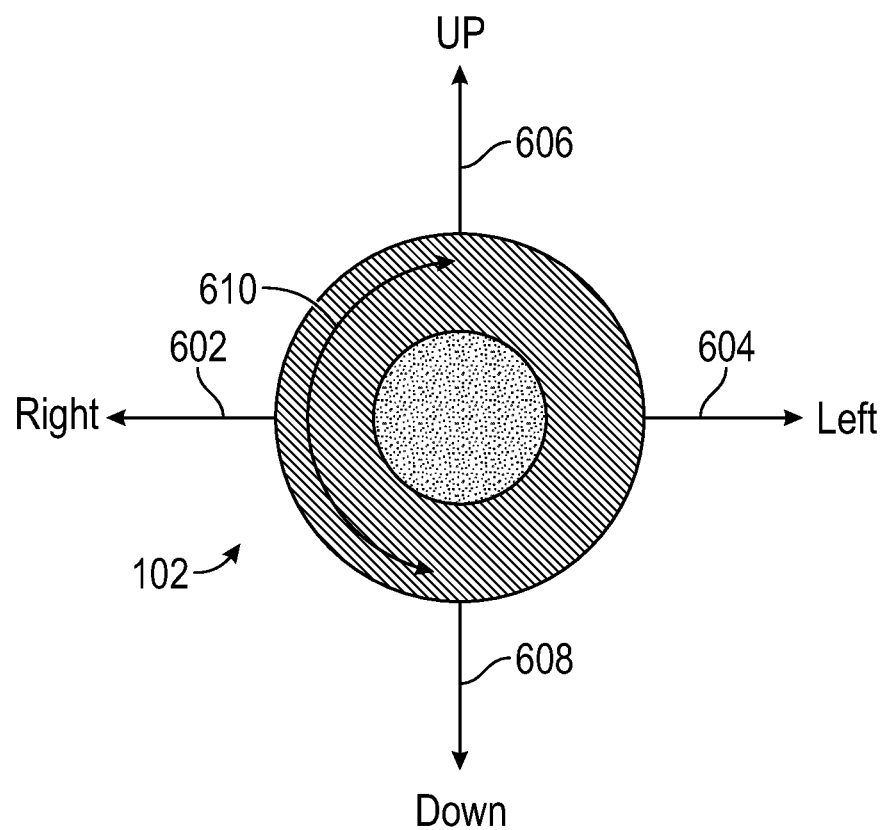
FIG. 13 illustrates possible motions of features of a simulator according to various embodiments of the present disclosure.

FIG. 13 illustrates various motions that may be effected in the pupils 102, 106 and eyelids 103, 107 by microcontroller 110. In some embodiments, these motions may be used in simulations of diseases such as nystagmus, blepharospasm, and ptosis. The term "healthy position" may be used in reference to a position of the pupil or eyelid that is determined by the healthy condition. In some embodiments, the healthy position may exemplify a base or normal position of the pupils (e.g., 30 degree position in FIG. 3A) or eyelid. Healthy positions may include a position prompted by the IR tracking, the joystick, or the preprogrammed routines. In some embodiments, the healthy position may be represented with both the right and left pupils 102, 106 oriented forward without motion in any direction. In some embodiments, the disease to be simulated, such as nystagmus, blepharospasm, or ptosis, will cause movement from or oscillation about this healthy position. For example, the right pupil 102 may be moved in a right direction 602, a left direction 604, an up direction 606, a down direction 608, and a rotational direction 610 from the healthy position to simulate different forms of nystagmus. In some embodiments, the simulations of nystagmus may involve repetitive motions in various directions. The left pupil 106 may be moved in similar directions to the right pupil 102, or alternatively, may be moved independently of the right pupil 102.

In some embodiments, the parameters or aspects of various motions of the pupils 102, 106 and eyelids 103, 107 may be adjusted by the present disclosure. For example, the simulator 200 may be controlled by at least three independent functions that may control the various motions. The control of these parameters may be accessible via the main GUI of the simulator 200 that the user is able to interface with and control directly. These functions may also be included in pre-programmed simulation instructions provided to the simulator 200.

The first parameter is amplitude, which may control a distance of oscillation of the pupils or eyelids. Amplitude may apply to the oscillation of the pupils 102, 106 about the healthy position of pupils in nystagmus simulations and may apply the oscillation of the eyelids 103, 107 about the healthy position of eyelids in blepharospasm and ptosis simulations. Larger values of amplitude will cause each oscillation to cover larger distances. The healthy position (i.e. center position of the oscillation) may not be affected by the variation of amplitude. In some embodiments, the ability to vary amplitude may allow for the simulation of various severities of nystagmus. In some cases, the minimum value for amplitude applied to the oscillation of the pupils 102, 106 may be set at +/−2.5 degrees. In other cases, the minimum value may be set at +/−1.0 degrees or +/−0.5 degrees. Other appropriate amplitude values may also be used. The minimum value for amplitude may be determined in part by the precision of the right and left pupil position sensors 140, 160, 240, 260 (shown in FIG. 1). In some cases, the maximum value that can be set is +/−30 degrees, which may encompass the entire range of pupil motion. Some simulations of nystagmus may include an amplitude of around +/−5 degrees for pupil oscillations as that may approximate natural nystagmus conditions. In some embodiments, the maximum and minimum ranges for amplitude may apply to both the horizontal and vertical directions equally. In various embodiments, the amplitude for the right pupil may be the same or different with respect to the amplitude for the left pupil. For example, the right pupil may be oscillated at one amplitude (e.g., right-amplitude) and the left pupil may be oscillated at another amplitude (e.g., left-amplitude).

The second parameter is nystagmus frequency, which may control the time it takes to complete a single full oscillation (i.e. the time it takes to travel from a first point to a second point and back to the first point). Large values for frequency will cause the pupils 102, 106 to move back and forth more quickly and small values will cause the pupils 102, 106 to move back and forth more slowly. In some embodiments, the frequency may vary from approximately 1 Hz to 3 Hz. In other embodiments, the frequency may vary from 0.5 Hz to 5 Hz. Other appropriate frequency values may also be used. In various embodiments, the frequency for the right pupil may be the same or different with respect to the frequency for the left pupil. For example, the right pupil may be oscillated at one frequency (e.g., a right-frequency) and the left pupil may be oscillated at another frequency (e.g., left-frequency).

The third parameter is variable speed, which may control the speed of the oscillation of the pupils 102, 106 depending on the direction of travel. The distance traveled on either side of the healthy position may be approximately equal. The variable speed may be set at a default value of 1. In some embodiments, the variable speed may be set independently for the right pupil 102 and the left pupil 106. The variable speed may also be set to different values for each of the different directions 602, 604, 606, 608, 610, 612. For example, the frequency value may be set to 1 Hz, meaning that a single oscillation takes 1 second. With the variable speed set to a value of 1 for all directions 602, 604, 606, 608, 610, 612, 0.5 seconds will be spent traveling in the right direction 602 and 0.5 seconds traveling in the left direction 604. However, the variable speed may be changed to different values, causing the pupils 102, 106 to spend more time traveling in one direction than the other. For example, if the variable speed is set to 2 in the right direction 602 and 1 for the left direction 604, the pupils 102, 106 may travel in a right direction 602 for 0.25 seconds and in the left direction 604 for 0.5 seconds. Similarly, if the variable speed is set to 0.5 in the right direction 602 and 1 for the left direction 604, the pupils 102, 106 may travel in a right direction 602 for 1 second and in the left direction 604 for 0.5 seconds. In various embodiments, the speed for the right pupil may be the same or different with respect to the speed for the left pupil. For example, the right pupil may be oscillated at one speed (e.g., a right-speed) and the left pupil may be oscillated at another speed (e.g., left-speed).

Each of the three parameters may be varied by a user on an interface connected to the simulator 200. In some embodiments, the user can vary each parameter using a knob or slider on the interface. These parameters may be pre-selected or set dynamically in real-time during the simulations.

FIGS. 14-22 illustrate various methods and simulations that may be performed by the simulator 200. These simulations may approximate physical conditions for medical training and educational purposes. These physical conditions include nystagmus, blepharospasm, and ptosis. In some embodiments, the simulations may involve IR tracking, joystick movements, and/or performed by running pre-programmed routines. In various embodiments, the pre-programmed routines may be stored on memory 180 or on an external memory (not shown). An operator of the simulator 200 may use the input interface 190 to select a pre-programmed routine to be run by the microprocessor 110. Based on the inputs received at the input interface 190, the microprocessor 110 may retrieve and execute the selected pre-programmed routine from the memory 180 or the external memory. The input interface 190 may be directly connected to the microprocessor 110 or may be connected to the microprocessor 110 via another central processing unit. In some embodiments, the microprocessor 110 control specific oscillating movements of the pupils 102, 106 and eyelids 103, 107 to perform simulations of these physical conditions. In the following simulations, only one pupil may be moved, both pupils 102, 106 may be moved together, or each pupil may be moved independently.

Nystagmus: Nystagmus is a medical condition during which pupils in the eyes involuntarily oscillate horizontally, vertically, or in both directions. Nystagmus may be caused by nervous system disorders, congenital disorders, and/or drug use. There are seven major types of nystagmus: horizontal, right beat, left beat, vertical, up-beat, down-beat, and pendular nystagmus.

The present disclosure discloses simulation of each of the seven types of nystagmus by the simulator 200. In some embodiments, the simulation of the various types of nystagmus are performed by using the microcontroller 110 to operate motors 150, 170, 250, 270 to effect oscillations of the pupils 102, 106. The oscillations of the pupils 102, 106 may occur about a chosen position (e.g., the healthy position) or about a chosen range of positions of the pupils 102, 106. During simulation, the pupils 102, 106 may oscillate in any of the directions shown in FIG. 13. In particular, the pupils 102, 106 may oscillate in a right direction 602, a left direction 604, an up direction 606, a down direction 608, and/or a rotational direction 610. Determination of the type of nystagmus to be simulated may determine the type of motion that is imparted to the right and left pupils 102, 106. Variations of nystagmus may be simulated in the right eye, the left eye, or both of the eyes.

Figure 14:
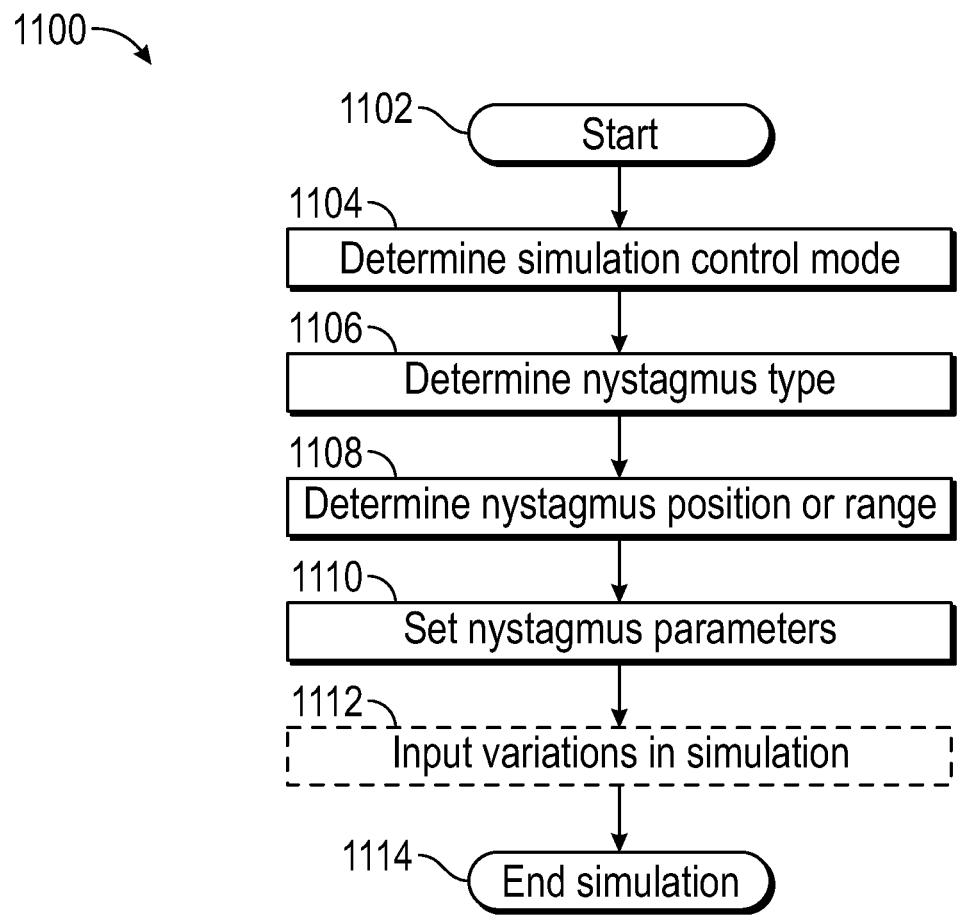
FIG. 14 illustrates an exemplary method 1100 for performing a nystagmus simulation according to various embodiments of the present disclosure.

FIG. 14 illustrates an exemplary method 1100 for performing simulations of nystagmus according to various embodiments of the present disclosure. In some embodiments, method 1100 may be performed with a simulator such as any of the simulators 200, 700 discussed above. Method 1100 may be used to simulate various forms of nystagmus shown in FIGS. 15A-G. In some embodiments, various control modes may be chosen to provide pre-programmed instructions to the simulator 200 as well as tracking functionality that allows a user to interact with the simulator 200. This may provide a user with a more life-like simulation of an actual patient exhibiting symptoms of nystagmus. In some embodiments, the control of the tracking motion of the pupils 102, 106 is independent from the control of the oscillating motion of the pupils 102, 106 as part of the nystagmus simulation. That is, the simulator 200 may be controlled to track an object moved across it with or without a nystagmus simulation being run on the simulator 200 (see FIGS. 4, 5, 7, and 8).

Figure 15A:
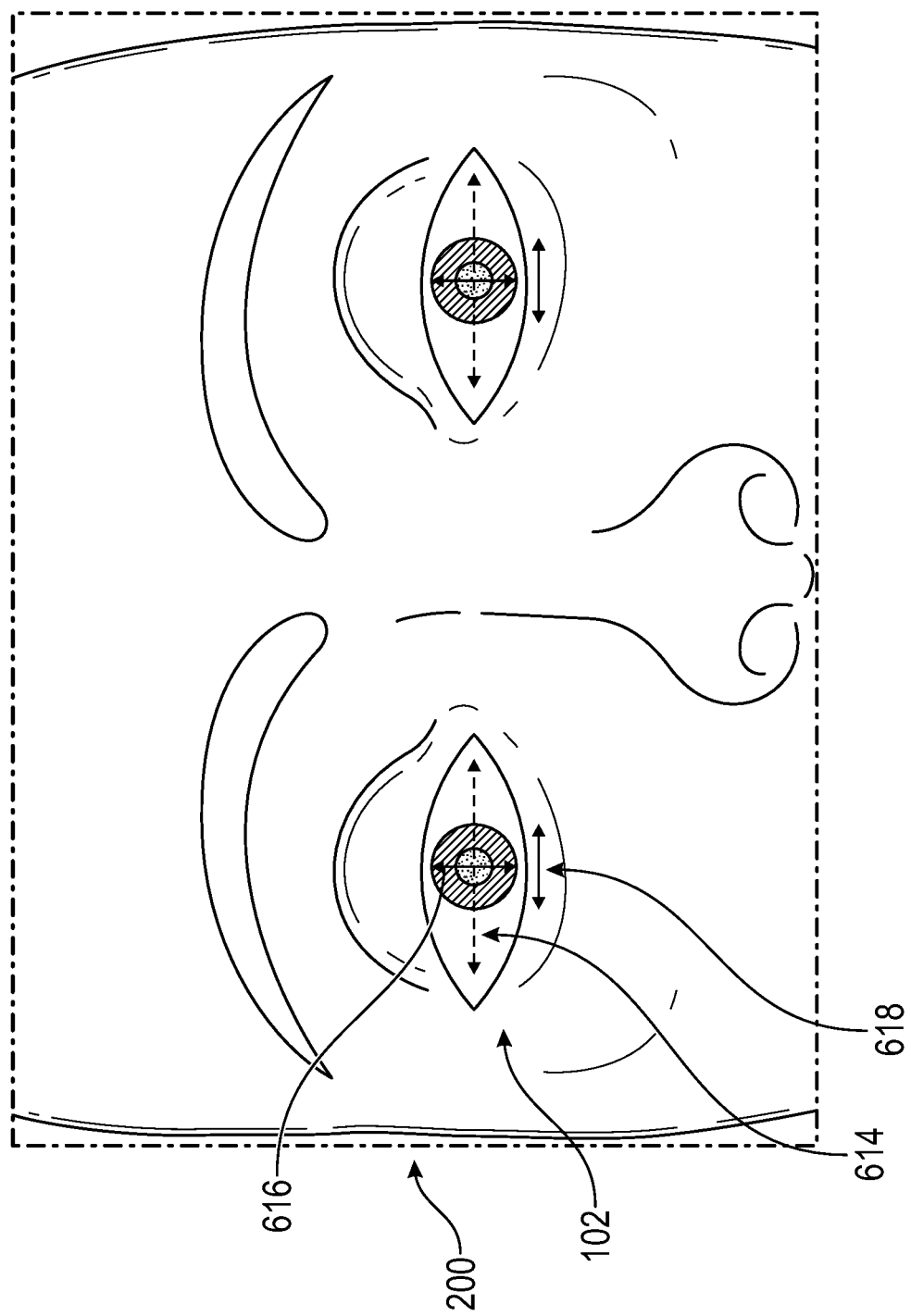
FIGS. 15A-G illustrate exemplary simulations of nystagmus according to various embodiments of the present disclosure.

Horizontal Nystagmus: Horizontal nystagmus is characterized by a rapid twitching or oscillation motion of the pupils in a horizontal direction. This oscillation may occur both when the pupils are at rest or moving. In some embodiments, the rapid oscillation motion of the pupils in horizontal nystagmus may be simulated by using the microprocessor 110 to oscillate the pupils 102, 106 horizontally by using the motors 150, 170, 250, 270. The simulation of horizontal nystagmus, as shown in FIG. 15A, begins at step 1102.

At step 1104, the microcontroller 110 determines a simulation control mode. The control mode may determine how simulation instructions are input for horizontal motion of the pupils 102, 106, and may include a joystick mode, an IR tracking mode, a pre-programed routine mode, or a combination of these modes as discussed previously. That is, the pupils 102, 106 may be moved in the horizontal directions 602, 604 within the full range of 0 degrees to 60 degrees (e.g., as shown in FIG. 3A) using the above modes. For example, when the IR tracking mode is selected, the simulator 200 may determine the location of an object in front of the IR sensors 120, 121, 122 and effect motion of either one or both pupils 102, 106 to follow the object accordingly. This mode may include the steps of methods 400 and 500 as shown in FIGS. 4 and 5, respectively.

At step 1106, horizontal nystagmus is selected as the type of nystagmus to be simulated. Simulation of horizontal nystagmus involves the microprocessor 110 effecting oscillations of the pupils 102, 106 horizontally by using the motors 150, 170, 250, 270. As discussed below, simulation of horizontal nystagmus involves selection of the nystagmus position or the nystagmus range within the exemplary full range of horizontal motion of 0 degrees to 60 degrees, as shown in FIG. 3A.

At step 1108, the microcontroller 110 determines a nystagmus position or a nystagmus range. The nystagmus position (e.g., the healthy position) is the chosen position about which the microcontroller 110 effects oscillations of the pupils 102, 106. For example, within the full range of 0 degrees and 60 degrees, when 30 degrees is determined as the nystagmus/chosen position, then the microcontroller 110 effects oscillations of pupils 102, 106 when the microcontroller 110 determines that the pupils are placed at the 30 degree position. Similarly, the nystagmus range is a range of positions about which the microcontroller 110 effects oscillations of the pupils 102, 106. For example, within the full range of 0 degrees and 60 degrees, when a range of 25 degrees to 35 degrees is determined as the nystagmus/chosen range, the microcontroller 110 effects oscillations of pupils 102, 106 when the microprocessor 110 determines that the pupils 102, 106 are placed at a position within the range of 25 degrees to 35 degrees. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 5 degrees, while the nystagmus position for the left pupil 106 may be set at 10 degrees. Also, the nystagmus range for the right pupil 102 may be between 0 degrees and 10 degrees, while the nystagmus range for the left pupil 106 may be between 5 degrees and 15 degrees.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the horizontal directions 602, 604. For example, when the amplitude of 5 degrees is set, the microprocessor 110 effects oscillations of the pupils 102, 106 such that the pupils 102, 106 oscillate +/−2.5 degrees about the nystagmus position or a position within the nystagmus range. When the frequency of 1 Hz is set, the microprocessor 110 effects oscillations of the pupils 102, 106 such that the pupils 102, 106 oscillate within 1 second about the nystagmus position or a position within the nystagmus range. Similarly, when the default speed of 1 is set, the microcontroller 110 will effect oscillations of the pupils 102, 106 such that the pupils 102, 106 oscillate to the right of the nystagmus position (or a position within the nystagmus range) at the same speed as the pupils 102, 106 oscillate to the left of the nystagmus position (or a position within the nystagmus range). In some embodiments, the parameters may be the same for both the right and left pupils 102, 106. In other embodiments, the parameters may be different for the right and left pupils 102, 106.

In some embodiments, the set parameters may be modified or adjusted based on the determination of the nystagmus position. The set amplitude of 10 degrees may be modified when a nystagmus position is determined to be near the limit of the full range of horizontal motion (0 degrees to 60 degrees) of the pupils. For example, when the nystagmus position is determined to be at 57 degrees for the right pupil 102, the right pupil 102 may oscillate 5 degrees to the fight of the nystagmus position, but only 3 degrees to the left of the nystagmus position. That is, the right pupil 102 may oscillate between 52 degrees and 60 degrees. Similarly, with the set amplitude of 10 degrees, when the nystagmus position is determined at 58 degrees, the right pupil 102 may oscillate between 53 degrees and 60 degrees. If the nystagmus position is determined at 60 degrees, the right pupil 102 may oscillate between 55 degrees and 60 degrees.

Alternatively, the chosen parameters may be constant and variations may occur in the determined nystagmus position. That is, the determined nystagmus position may be modified based on the set parameter. For example, the determined nystagmus position of 57 degrees may be modified when a set parameter requires oscillation of a pupil beyond full range of horizontal motion of a pupil. When the amplitude is set at 10 degrees for the right pupil 102, the right pupil 102 may oscillate 5 degrees to the right of the nystagmus position, and 5 degrees to the left of the nystagmus position. To accommodate the full 10 degree motion, the determined nystagmus position may be modified from being at 57 degrees to being at 55 degrees. In other words, for any nystagmus position between 55 degrees and 60 degrees or between 0 degrees and 5 degrees, the pupils will oscillate between 50 degrees and 60 degrees or between 0 degrees and 10 degrees, respectively.

At step 1112, the method 1100 may optionally include inputting variations in the simulation. For example, variations may be introduced into a simulation of horizontal nystagmus such that the amplitude parameter of the oscillation of the pupils 102, 106 is larger at the edges of the full range of horizontal motion (e.g., 0-15 degrees and 45-60 degrees) of the pupils in comparison to oscillation of the pupils 102, 106 at the center of the horizontal range of motion (e.g., 25-35 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In various embodiments, the oscillation of the pupils 102, 106 may vary throughout the simulation. For example, the microcontroller 110 may effect a constant horizontal oscillation of 2 degrees in the pupils 102, 106 as the simulation begins. A nystagmus position may then be determined at the 10-degree position. As an object moves in front of the simulator 200, the pupils 102, 106 may be controlled to follow the object until it reaches the 10-degree position (i.e., the determined nystagmus position). At this position, the microcontroller 110 may vary the amplitude of the horizontal oscillation of the pupils 102, 106 to 4 degrees or to 1 degree. As discussed above, the microcontroller 110 may effect variations in motion in any direction, including the motions discussed in relation to FIG. 13. These variations to the various simulations may provide a more life-like experience for the user.

In some embodiments, the method 1100 may repeat itself after steps 1110 or 1112, such as proceeding through steps 1104-1112 iteratively. The simulation may be completed and stop at step 1114.

Figure 15C:
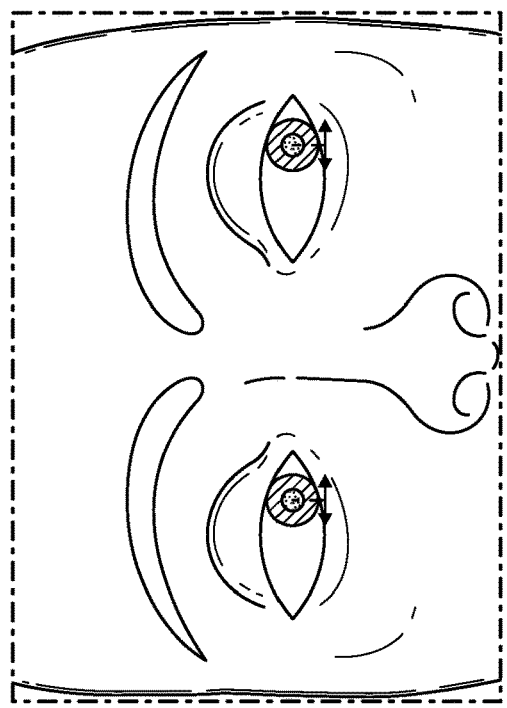
Figure 15B:
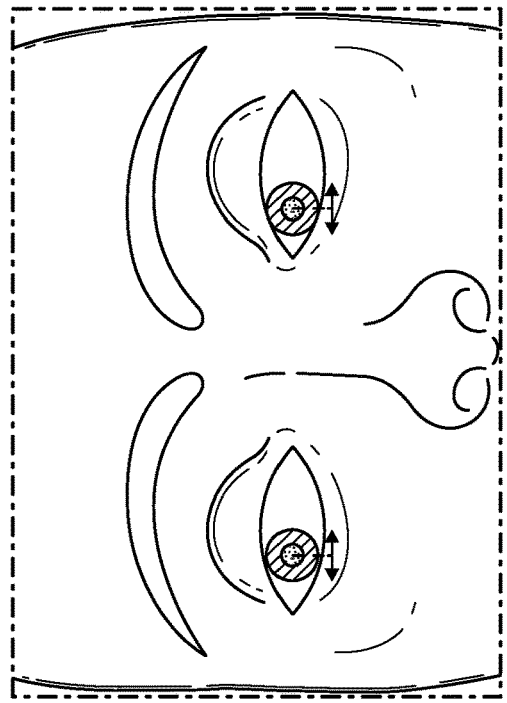

Right Beat Nystagmus: Right beat nystagmus is characterized by a rapid oscillation of the pupils in a horizontal motion when the pupils are moved to the right. This oscillation may occur both when the pupils are at rest or moving. In some embodiments, the rapid oscillation motion of the pupils in right beat nystagmus may be simulated by using the microprocessor 110 to oscillate the pupils 102, 106 horizontally by using the motors 150, 170, 250, 270 when the eyes are looking to the right. The simulation of right beat nystagmus, as shown in FIG. 15B, begins at step 1102.

At step 1104, the microcontroller 110 determines a simulation control mode. The control mode may determine how simulation instructions are input for horizontal motion of the pupils 102, 106, and may include a joystick mode, an IR tracking mode, a pre-programed routine mode, or a combination of these modes as discussed previously. That is, the pupils 102, 106 may be moved in the horizontal directions 602, 604 within the full range of 0 degrees to 60 degrees (e.g., as shown in FIG. 3A) using the above modes. For example, when the IR tracking mode is selected, the simulator 200 may determine the location of an object in front of the IR sensors 120, 121, 122 and effect motion of either one or both pupils 102, 106 to follow the object accordingly. This mode may include the steps of methods 400 and 500 as shown in FIGS. 4 and 5, respectively.

At step 1106, right beat nystagmus is selected as the type of nystagmus to be simulated. Simulation of right beat nystagmus involves the microprocessor 110 effecting oscillations of the pupils 102, 106 horizontally by using the motors 150, 170, 250, 270. As discussed below, simulation of right beat nystagmus involves selection of the nystagmus position or the nystagmus range within the exemplary range of 0 degrees to 30 degrees, as shown in FIG. 3A.

At step 1108, the microcontroller 110 determines the nystagmus position or the nystagmus range. As mentioned above, simulation of right beat nystagmus involves determination of a nystagmus position or range within an exemplary range of 0 degrees to 30 degrees, as shown in FIG. 3A. For example, within the range of 0 degrees to 30 degrees, when 15 degrees is determined as the nystagmus/chosen position, the microcontroller 110 effects oscillations of pupils 102, 106 when the microcontroller 110 determines that the pupils are placed at the 15-degree position. Similarly, within the range of 0 degrees and 30 degrees for right beat nystagmus, when a range of 10 degrees to 20 degrees is determined as the nystagmus range, the microcontroller 110 effects oscillations of pupils 102, 106 when the microprocessor 110 determines that the pupils 102, 106 are placed at a position within the range of 10 degrees to 20 degrees. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 5 degrees, while the nystagmus position for the left pupil 106 may be set at 10 degrees. Also, the nystagmus range for the right pupil 102 may be between 0 degrees and 10 degrees, while the nystagmus range for the left pupil 106 may be between 5 degrees and 15 degrees.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the horizontal directions 602, 604. For example, when the amplitude of 5 degrees is set, the microprocessor 110 effects oscillations of the pupils 102, 106 such that the pupils 102, 106 oscillate +/−2.5 degrees about the nystagmus position or a position within the nystagmus range. When the frequency of 1 Hz is set, the microprocessor 110 effects oscillations of the pupils 102, 106 such that the pupils 102, 106 oscillate within 1 second about the nystagmus position or a position within the nystagmus range. Similarly, when the default speed of 1 is set, the microcontroller 110 will effect oscillations of the pupils 102, 106 such that the pupils 102, 106 oscillate to the right of the nystagmus position (or a position within the nystagmus range) at the same speed as the pupils 102, 106 oscillate to the left of the nystagmus position (or a position within the nystagmus range). In some embodiments, the parameters may be the same for both the right and left pupils 102, 106. In other embodiments, the parameters may be different for the right and left pupils 102, 106.

As discussed previously with respect to horizontal nystagmus, the set parameters may be modified based on the determination of the nystagmus position/range. Alternatively, the chosen parameters may be constant and variations may occur in the determined nystagmus position/range.

At step 1112, the method 1100 may optionally include inputting variations in the simulation. For example, variations may be introduced into a simulation of right beat nystagmus such that the amplitude parameter of the oscillation of the pupils 102, 106 is larger at the edges of the full range of horizontal motion (e.g., 0-15 degrees) of the pupils in comparison to oscillation of the pupils 102, 106 at the center of the horizontal range of motion (e.g., 25 degrees to 30 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In various embodiments, the oscillation of the pupils 102, 106 may vary throughout the simulation. For example, the microcontroller 110 may effect a constant horizontal oscillation of 2 degrees in the pupils 102, 106 as the simulation begins. A nystagmus position may then be determined at the 10-degree position. As an object moves in front of the simulator 200, the pupils 102, 106 may be controlled to follow the object until it reaches the 10-degree position (i.e., the determined nystagmus position). At this position, the microcontroller 110 may vary the amplitude of the horizontal oscillation of the pupils 102, 106 to 4 degrees or to 1 degree. As discussed above, the microcontroller 110 may effect variations in motion in any direction, including the motions discussed in relation to FIG. 13. These variations to the simulation may provide a more life-like experience for the user.

In some embodiments, the method 1100 may repeal itself after steps 1110 or 1112, such as proceeding through steps 1104-1112 iteratively. The simulation may be completed and stop at step 1114.

Left Beat Nystagmus: Left beat nystagmus is characterized by a rapid oscillation of the pupils in a horizontal motion when the pupils are moved to the left. This oscillation may occur both when the pupils are at rest or moving. In some embodiments, the rapid oscillation motion of the pupils in left beat nystagmus may be simulated by using the microprocessor 110 to oscillate the pupils 102, 106 horizontally by using the motors 150, 170, 250, 270 when the eyes are looking to the left. The simulation of left beat nystagmus, as shown in FIG. 15C, begins at step 1102.

At step 1104, the microcontroller 110 determines a simulation control mode. The control mode may determine how simulation instructions are input for horizontal motion of the pupils 102, 106, and may include a joystick mode, an IR tracking mode, a pre-programed routine mode, or a combination of these modes as discussed previously. That is, the pupils 102, 106 may be moved in the horizontal directions 602, 604 within the full range of 0 degrees to 60 degrees (e.g., as shown in FIG. 3A) using the above modes. For example, when the IR tracking mode is selected, the simulator 200 may determine the location of an object in front of the IR sensors 120, 121, 122 and effect motion of either one or both pupils 102, 106 to follow the object accordingly. This mode may include the steps of methods 400 and 500 as shown in FIGS. 4 and 5, respectively.

At step 1106, left beat nystagmus is selected as the type of nystagmus to be simulated. Simulation of the left beat nystagmus involves the microprocessor 110 effecting oscillations of the pupils 102, 106 horizontally by using the motors 150, 170, 250, 270. As discussed below, simulation of left beat nystagmus involves selection of the nystagmus position or the nystagmus range within the exemplary range of 30 degrees to 60 degrees, as shown in FIG. 3A.

At step 1108, the microcontroller 110 determines the nystagmus position or the nystagmus range. As mentioned above, simulation of left beat nystagmus involves determination of a nystagmus position or range within an exemplary range of 30 degrees to 60 degrees, as shown in FIG. 3A. For example, within the range of 30 degrees and 60 degrees, when 45 degrees is determined as the nystagmus/chosen position, the microcontroller 110 effects oscillations of pupils 102, 106 when the microcontroller 110 determines that the pupils are placed at the 45-degree position. Similarly, within the range of 30 degrees to 60 degrees for left beat nystagmus, when a range of 40 degrees to 50 degrees is determined as the nystagmus range, the microcontroller 110 effects oscillations of pupils 102, 106 when the microprocessor 110 determines that the pupils 102, 106 are placed at a position within the range of 40 degrees to 50 degrees. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 50 degrees, while the nystagmus position for the left pupil 106 may be set at 55 degrees. Also, the nystagmus range for the right pupil 102 may be between 50 degrees and 60 degrees, while the nystagmus range for the left pupil 106 may be between 45 degrees and 55 degrees.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the horizontal directions 602, 604. For example, when the amplitude of 5 degrees is set, the microprocessor 110 effects oscillations of the pupils 102, 106 such that the pupils 102, 106 oscillate +/−2.5 degrees about the nystagmus position or a position within the nystagmus range. When the frequency of 1 Hz is set, the microprocessor 110 effects oscillations of the pupils 102, 106 such that the pupils 102, 106 oscillate within 1 second about the nystagmus position or a position within the nystagmus range. Similarly, when the default speed of 1 is set, the microcontroller 110 will effect oscillations of the pupils 102, 106 such that the pupils 102, 106 oscillate to the right of the nystagmus position (or a position within the nystagmus range) at the same speed as the pupils 102, 106 oscillate to the left of the nystagmus position (or a position within the nystagmus range). In some embodiments, the parameters may be the same for both the right and left pupils 102, 106. In other embodiments, the parameters may be different for the right and left pupils 102, 106.

As discussed previously with respect to horizontal nystagmus, the set parameters may be modified based on the determination of the nystagmus position/range. Alternatively, the chosen parameters may be constant and variations may occur in the determined nystagmus position/range.

At step 1112, the method 1100 may optionally include inputting variations in the simulation. For example, variations may be introduced into a simulation of left beat nystagmus such that the amplitude parameter of the oscillation of the pupils 102, 106 is larger at the edges of the full range of horizontal motion (e.g., 45 degrees to 60 degrees) of the pupils in comparison to oscillation of the pupils 102, 106 at the center of the horizontal range of motion (e.g., 30 degrees to 35 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In various embodiments, the oscillation of the pupils 102, 106 may vary throughout the simulation. For example, the microcontroller 110 may effect a constant horizontal oscillation of 2 degrees in the pupils 102, 106 as the simulation begins. A nystagmus position may then be determined at the 40-degree position. As an object moves in front of the simulator 200, the pupils 102, 106 may be controlled to follow the object until it reaches the 40-degree position (i.e., the determined nystagmus position). At this position, the microcontroller 110 may vary the amplitude of the horizontal oscillation of the pupils 102, 106 to 4 degrees or to 1 degree. As discussed above, the microcontroller 110 may effect variations in motion in any direction, including the motions discussed in relation to FIG. 13. These variations to the simulation may provide a more life-like experience for the user.

In some embodiments, the method 1100 may repeat itself after steps 1110 or 1112, such as proceeding through steps 1104-1112 iteratively. The simulation may be completed and stop at step 1114.

Figure 15E:
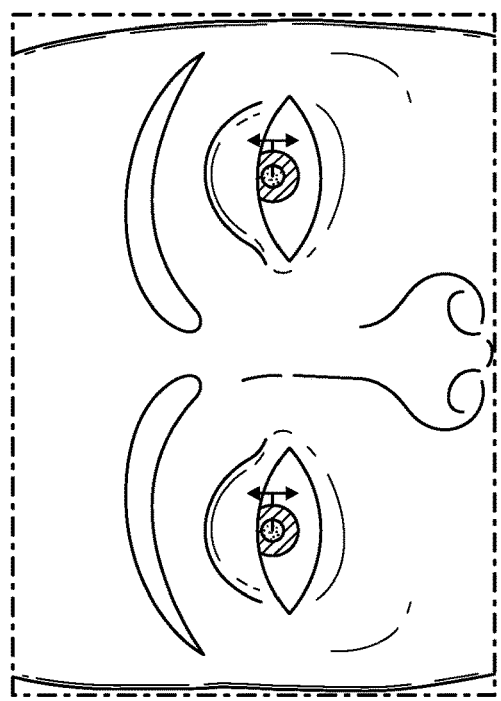
Figure 15D:
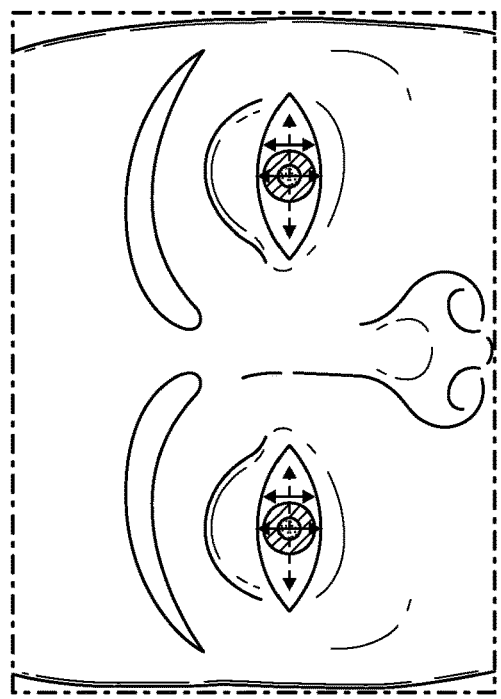

Vertical Nystagmus: FIG. 15D illustrates a vertical nystagmus simulation. Vertical nystagmus is characterized by a rapid oscillation of the pupils in a vertical direction. This oscillation may occur both when the pupils are at rest or moving. In some embodiments, vertical nystagmus may be simulated by using the microprocessor 110 to oscillate the pupils 102, 106 vertically by using the motors 150, 170, 250, 270. An exemplary vertical nystagmus simulation may include the steps of method 1100 shown in FIG. 14, beginning with step 1102.

At step 1104, the microcontroller 110 determines a simulation control mode. The control mode may determine how simulation instructions are input for vertical motion of the pupils 102, 106, and may include a joystick mode, an IR tracking mode, a pre-programed routine mode, or a combination of these modes as discussed previously. That is, the pupils 102, 106 may be moved in the vertical directions 606, 608 within the full range of 0 degrees to 60 degrees along the vertical direction using the above modes. For example, when the IR tracking mode is selected, the simulator 200 may determine the location of an object in front of the IR sensors 120, 121, 122, 123, 124 and effect motion of either one or both pupils 102, 106 to follow the object accordingly. This mode may include the steps of methods 900 and 1000 as shown in FIGS. 7 and 8, respectively.

At step 1106, vertical nystagmus is selected as the type of nystagmus to be simulated. Simulation of vertical nystagmus involves the microprocessor 110 effecting oscillations of the pupils 102, 106 vertically by using the motors 150, 170, 250, 270. As discussed below, simulation of vertical nystagmus involves selection of the nystagmus position or the nystagmus range within the exemplary full range of vertical motion of 0 degrees to 60 degrees.

At step 1108, the microcontroller 110 determines a nystagmus position or a nystagmus range. The nystagmus position (e.g., the healthy position) is the chosen position about which the microcontroller 110 effects oscillations of the pupils 102, 106. For example, within the full range of 0 degrees and 60 degrees along the vertical direction, when 40 degrees is determined as the nystagmus/chosen position, then the microcontroller 110 effects oscillations of pupils 102, 106 when the microcontroller 110 determines that the pupils are placed at the 40 degree position. Similarly, the nystagmus range is a range of positions about which the microcontroller 110 effects oscillations of the pupils 102, 106. For example, within the full range of 0 degrees and 60 degrees along the vertical direction, when a range of 30 degrees to 40 degrees is determined as the nystagmus/chosen range, then the microcontroller 110 effects oscillations of pupils 102, 106 when the microprocessor 110 determines that the pupils 102, 106 are placed at a position within the range of 30 degrees to 40 degrees. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 5 degrees, while the nystagmus position for the left pupil 106 may be set at 10 degrees. Also, the nystagmus range for the right pupil 102 may be between 0 degrees and 10 degrees, while the nystagmus range for the left pupil 106 may be between 5 degrees and 15 degrees.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the vertical directions 606, 608. For example, when the amplitude of 5 degrees is set, the microprocessor 110 effects oscillations of the pupils 102, 106 such that the pupils 102, 106 oscillate +/−2.5 degrees about the nystagmus position or a position within the nystagmus range. When the frequency of 1 Hz is set, the microprocessor 110 effects oscillations of pupils 102, 106 such that the pupils 102, 106 oscillate within 1 second about the nystagmus position or a position within the nystagmus range. Similarly, when the default speed of 1 is set, the microcontroller 110 will effect oscillations of the pupils 102, 106 such that the pupils 102, 106 oscillate above the nystagmus position (or a position within the nystagmus range) at the same speed as the pupils 102, 106 oscillate below the nystagmus position (or position within the nystagmus range). In some embodiments, the parameters may be the same for both the tight and left pupils 102, 106. In other embodiments, the parameters may be different for the right and left pupils 102, 106.

In some embodiments, the set parameters may be modified based on the determination of the nystagmus position. For example, the set amplitude of 10 degrees may be modified when a nystagmus position is determined to be near the limit of the full range of vertical motion of the pupils. For example, when the nystagmus position is determined to be at 57 degrees along the vertical direction for the right pupil 102, the right pupil 102 may oscillate 5 degrees below the nystagmus position, but only 3 degrees above the nystagmus position. Similarly, with the set amplitude of 10 degrees, when the nystagmus position is determined at 58 degrees along the vertical direction, the right pupil 102 may oscillate between 53 degrees and 60 degrees along the vertical direction. If the nystagmus position is determined at 60 degrees, the right pupil 102 may oscillate between 55 degrees and 60 degrees along the vertical direction.

Alternatively, the chosen amplitude may be constant and variations may occur in the determined nystagmus position. That is, the determined nystagmus position may be modified based on the set parameter. For example, the determined nystagmus position of 57 degrees may be modified when a set parameter requires oscillation of a pupil beyond full range of vertical motion of a pupil. In particular, when the amplitude is set at 10 degrees for the right pupil 102, the right pupil 102 may oscillate 5 degrees above the nystagmus position, and 5 degrees below the nystagmus position. To accommodate the full 10 degree motion, the determined nystagmus position may be modified from being at 57 degrees to being at 55 degrees. In other words, for any nystagmus position between 55 degrees and 60 degrees or between 0 degrees and 5 degrees, the pupils will oscillate between 50 degrees and 60 degrees or between 0 degrees and 10 degrees, respectively.

At step 1112, the method 1100 may optionally include inputting variations in the simulation. For example, variations may be introduced into a simulation of vertical nystagmus such that the amplitude parameter of the oscillation of the pupils 102, 106 is larger at the edges of the full range of vertical motion (e.g., 0-15 degrees and 45-60 degrees) of the pupils in comparison to oscillation of the pupils 102, 106 at the center of the vertical range of motion (e.g., 25-35 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In various embodiments, the oscillation of the pupils 102, 106 may vary throughout the simulation. For example, the microcontroller 110 may effect a constant vertical oscillation of 2 degrees in the pupils 102, 106 as the simulation begins. A nystagmus position may be chosen for 20 degrees along the vertical direction. As an object moves in front of the simulator 200, the pupils 102, 106 may be controlled to follow the object until it reaches the chosen 20-degree position (i.e., the determined nystagmus position). At this position, the microcontroller 110 may vary the amplitude of the vertical oscillation of the pupils 102, 106 to 4 degrees or to 1 degree. As discussed above, the microcontroller 110 may effect variations in motion in any direction, including the motions discussed in relation to FIG. 13. These variations to the various simulations may provide a more life-like experience for the user.

In some embodiments, the method 1100 may repeat itself after steps 1110 or 1112, such as proceeding through steps 1104-1112 iteratively. The simulation may be completed and stop at step 1114.

Up-beat Nystagmus: Up-beat nystagmus is characterized by a rapid oscillation of the pupils in a vertical motion when the pupils are moved upwards. This oscillation may occur both when the pupils are at rest or moving. In some embodiments, the rapid oscillation motion of the pupils in up-beat nystagmus may be simulated by using the microprocessor 110 to oscillate the pupils 102, 106 vertically by using the motors 150, 170, 250, 270 when the eyes are looking upwards. The simulation of up-beat nystagmus, as shown in FIG. 15E, begins at step 1102.

At step 1104, the microcontroller 110 determines a simulation control mode. The control mode may determine how simulation instructions are input for vertical motion of the pupils 102, 106, and may include a joystick mode, an IR tracking mode, a pre-programed routine mode, or a combination of these modes as discussed previously. That is, the pupils 102, 106 may be moved in the vertical directions 606, 608 within the full range of 0 degrees to 60 degrees along the vertical direction using the above modes. For example, when the IR tracking mode is selected, the simulator 200 may determine the location of an object in front of the IR sensors 120, 121, 122, 123, 124 and effect motion of either one or both pupils 102, 106 to follow the object accordingly. This mode may include the steps of methods 900 and 1000 as shown in FIGS. 7 and 8, respectively.

At step 1106, up-beat nystagmus is selected as the type of nystagmus to be simulated. Simulation of up-beat nystagmus involves the microprocessor 110 effecting oscillations of the pupils 102, 106 vertically by using the motors 150, 170, 250, 270. As discussed below, simulation of vertical nystagmus involves selection of the nystagmus position or the nystagmus range within the exemplary full range of vertical motion of 0 degrees to 30 degrees.

At step 1108, the microcontroller 110 determines a nystagmus position or a nystagmus range. The nystagmus position (e.g., the healthy position) is the chosen position about which the microcontroller 110 effects oscillations of the pupils 102, 106. For example, within the full range of 0 degrees and 60 degrees along the vertical direction, when 10 degrees is determined as the nystagmus/chosen position, then the microcontroller 110 effects oscillations of pupils 102, 106 when the microcontroller 110 determines that the pupils are placed at the 10-degree position. Similarly, the nystagmus range is a range of positions about which the microcontroller 110 effects oscillations of the pupils 102, 106. For example, within the full range of 0 degrees and 60 degrees along the vertical direction, when a range of 10 degrees to 20 degrees is determined as the nystagmus/chosen range, then the microcontroller 110 effects oscillations of pupils 102, 106 when the microprocessor 110 determines that the pupils 102, 106 are placed at a position within the range of 10 degrees to 20 degrees. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 5 degrees, while the nystagmus position for the left pupil 106 may be set at 10 degrees. Also, the nystagmus range for the right pupil 102 may be between 0 degrees and 10 degrees, while the nystagmus range for the left pupil 106 may be between 5 degrees and 15 degrees.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the vertical directions 606, 608. For example, when the amplitude of 5 degrees is set, the microprocessor 110 effects oscillations of the pupils 102, 106 such that the pupils 102, 106 oscillate +/−2.5 degrees about the nystagmus position or a position within the nystagmus range. When the frequency of 1 Hz is set, the microprocessor 110 effects oscillations of the pupils 102, 106 such that the pupils 102, 106 oscillate within 1 second about the nystagmus position or a position within the nystagmus range. Similarly, when the default speed of 1 is set, the microcontroller 110 will effect oscillations of the pupils 102, 106 such that the pupils 102, 106 oscillate above the nystagmus position (or a position within the nystagmus range) at the same speed as the pupils 102, 106 oscillate below the nystagmus position (or position within the nystagmus range). In some embodiments, the parameters may be the same for both the right and left pupils 102, 106. In other embodiments, the parameters may be different for the right and left pupils 102, 106.

As discussed previously with respect to vertical nystagmus, the set parameters may be modified based on the determination of the nystagmus position/range. Alternatively, the chosen parameters may be constant and variations may occur in the determined nystagmus position/range.

At step 1112, the method 1100 may optionally include inputting variations in the simulation. For example, variations may be introduced into a simulation of up-beat nystagmus such that the amplitude parameter of the oscillation of the pupils 102, 106 is larger at the edges of the full range of vertical motion (e.g., 0 degrees to 15 degrees) of the pupils in comparison to oscillation of the pupils 102, 106 at the center of the vertical range of motion (e.g., 25 degrees to 30 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In some embodiments, the method 1100 may repeat itself after steps 1110 or 1112, such as proceeding through steps 1104-1112 iteratively. The simulation may be completed and stop at step 1114.

Figure 15G:
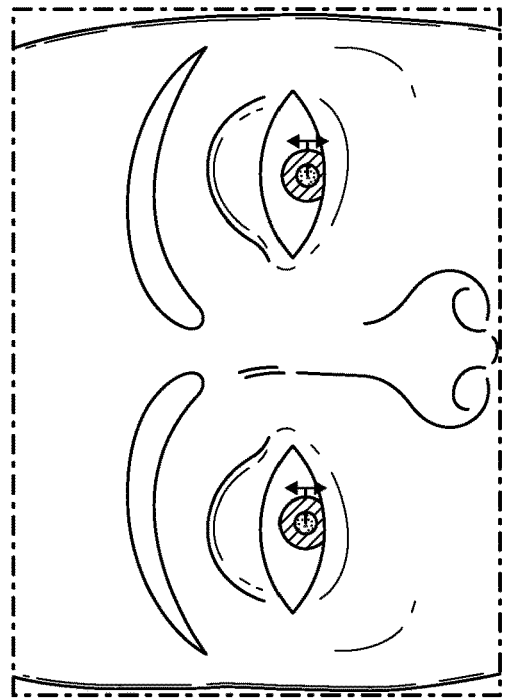
Figure 15F:
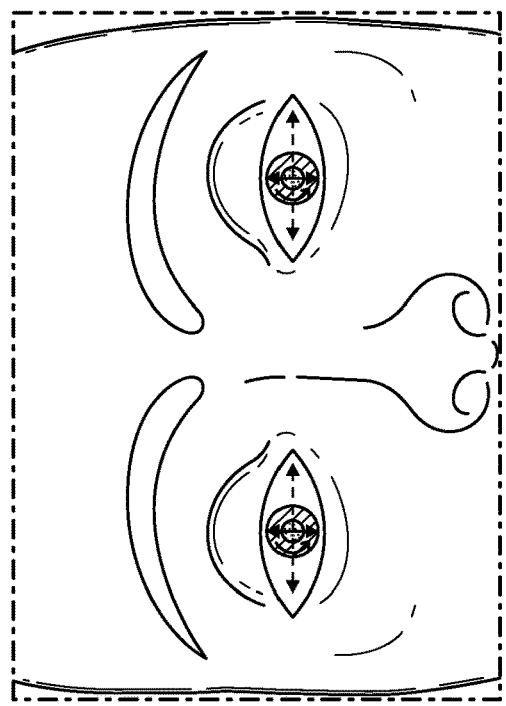

Down-beat Nystagmus: Down-beat nystagmus is characterized by a rapid oscillation of the pupils in a vertical motion when the pupils are moved downwards. This oscillation may occur both when the pupils are at rest or moving. In some embodiments, the rapid oscillation motion of the pupils in down-beat nystagmus may be simulated by using the microprocessor 110 to oscillate the pupils 102, 106 vertically by using the motors 150, 170, 250, 270 when the eyes are looking downwards. The simulation of down-beat nystagmus, as shown in FIG. 15F, begins at step 1102.

At step 1104, the microcontroller 110 determines a simulation control mode. The control mode may determine how simulation instructions are input for vertical motion of the pupils 102, 106, and may include a joystick mode, an IR tracking mode, a pre-programed routine mode, or a combination of these modes as discussed previously. That is, the pupils 102, 106 may be moved in the vertical directions 606, 608 within the full range of 0 degrees to 60 degrees along the vertical direction using the above modes. For example, when the IR tracking mode is selected, the simulator 200 may determine the location of an object in front of the IR sensors 120, 121, 122, 123, 124 and effect motion of either one or both pupils 102, 106 to follow the object accordingly. This mode may include the steps of methods 900 and 1000 as shown in FIGS. 7 and 8, respectively.

At step 1106, down-beat nystagmus is selected as the type of nystagmus to be simulated. Simulation of down nystagmus involves the microprocessor 110 effecting oscillations of the pupils 102, 106 vertically by using the motors 150, 170, 250, 270. As discussed below, simulation of vertical nystagmus involves selection of the nystagmus position or the nystagmus range within the exemplary full range of vertical motion of 30 degrees to 60 degrees.

At step 1108, the microcontroller 110 determines a nystagmus position or a nystagmus range. The nystagmus position (e.g., the healthy position) is the chosen position about which the microcontroller 110 effects oscillations of the pupils 102, 106. For example, within the full range of 0 degrees and 60 degrees along the vertical direction, when 0 degrees is determined as the nystagmus/chosen position, then the microcontroller 110 effects oscillations of pupils 102, 106 when the microcontroller 110 determines that the pupils are placed at the 40-degree position. Similarly, the nystagmus range is a range of positions about which the microcontroller 110 effects oscillations of the pupils 102, 106. For example, within the full range of 0 degrees and 60 degrees along the vertical direction, when a range of 40 degrees to 50 degrees is determined as the nystagmus/chosen range, then the microcontroller 110 effects oscillations of pupils 102, 106 when the microprocessor 110 determines that the pupils 102, 106 are placed at a position within the range of 40 degrees to 50 degrees. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 45 degrees, while the nystagmus position for the left pupil 106 may be set at 50 degrees. Also, the nystagmus range for the right pupil 102 may be between 50 degrees and 60 degrees, while the nystagmus range for the left pupil 106 may be between 45 degrees and 55 degrees.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the vertical directions 606, 608. For example, when the amplitude of 5 degrees is set, the microprocessor 110 effects oscillations of the pupils 102, 106 such that the pupils 102, 106 oscillate +/−2.5 degrees about the nystagmus position or a position within the nystagmus range. When the frequency of 1 Hz is set, the microprocessor 110 effects oscillations of the pupils 102, 106 such that the pupils 102, 106 oscillate within 1 second about the nystagmus position or a position within the nystagmus range. Similarly, when the default speed of 1 is set, the microcontroller 110 will effect oscillations of the pupils 102, 106 such that the pupils 102, 106 oscillate above the nystagmus position (or a position within the nystagmus range) at the same speed as the pupils 102, 106 oscillate below the nystagmus position (or position within the nystagmus range). In some embodiments, the parameters may be the same for both the right and left pupils 102, 106. In other embodiments, the parameters may be different for the right and left pupils 102, 106.

As discussed previously with respect to vertical nystagmus, the set parameters may be modified based on the determination of the nystagmus position/range. Alternatively, the chosen parameters may be constant and variations may occur in the determined nystagmus position/range.

At step 1112, the method 1100 may optionally include inputting variations in the simulation. For example, variations may be introduced into a simulation of down-beat nystagmus such that the amplitude parameter of the oscillation of the pupils 102, 106 is larger at the edges of the full range of vertical motion (e.g., 45 degrees to 60 degrees) of the pupils in comparison to oscillation of the pupils 102, 106 at the center of the vertical range of motion (e.g., 30 degrees to 40 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In some embodiments, the method 1100 may repeat itself after steps 1110 or 1112, such as proceeding through steps 1104-1112 iteratively. The simulation may be completed and stop at step 1114.

Pendular Nystagmus: Pendular nystagmus is characterized by a rapid oscillation of the pupils in both horizontal and vertical motions. This oscillation may occur both when the pupils are at rest or moving. The combination of these motions may result in the pupils appearing to rotate about a given position. In some embodiments, the rapid oscillation motion of the pupils in pendular nystagmus may be simulated by using the microprocessor 110 to oscillate the pupils 102, 106 horizontally and vertically by using the motors 150, 170, 250, 270. Alternatively, other motors may be used to provide rotational motion in pendular nystagmus simulations. The simulation of pendular nystagmus, as shown in FIG. 15G, begins at step 1102.

At step 1104, the microcontroller 110 determines a simulation control mode. The control mode may determine how simulation instructions are input for horizontal and vertical motion of the pupils 102, 106, and may include a joystick mode, an IR tracking mode, a pre-programed routine mode, or a combination of these modes as discussed previously. That is, the pupils 102, 106 may be moved in the horizontal and vertical directions 602, 604, 606, 608 within the full range of horizontal and vertical motions shown in FIG. 13 using the above modes. For example, when the IR tracking mode is selected, the simulator 200 may determine the location of an object in front of the IR sensors 120, 121, 122, 123, 124 and effect motion of either one or both pupils 102, 106 to follow the object accordingly. This mode may include the steps of methods 400, 500, 900, and 1000 as shown in FIGS. 4, 5, 7, and 8 respectively.

At step 1106, pendular nystagmus is selected as the type of nystagmus to be simulated. Simulation of pendular nystagmus involves the microprocessor 110 effecting oscillations of the pupils 102, 106 horizontally and vertically by using the motors 150, 170, 250, 270. As discussed below, simulation of pendular nystagmus involves selection of the nystagmus position or the nystagmus range within the exemplary full ranges of horizontal and vertical motions of 0 degrees to 60 degrees and 0 degrees to 60 degrees, respectively.

At step 1108, the microcontroller 110 determines a nystagmus position or a nystagmus range. The nystagmus position (e.g., the healthy position) is the chosen position about which the microcontroller 110 effects horizontal and vertical oscillations of the pupils 102, 106. For example, within the full range of 0 degrees and 60 degrees along the horizontal direction and within the full range of 0 degrees and 60 degrees along the vertical direction, when a position defined by 20 degrees along the horizontal direction and 40 degrees along the vertical direction is determined as the nystagmus/chosen position, the microcontroller 110 effects horizontal and vertical oscillations of pupils 102, 106 when the microcontroller 110 determines that the pupils are placed at this defined position. Similarly, the nystagmus range is a range of positions about which the microcontroller 110 effects horizontal and vertical oscillations of the pupils 102, 106. For example, within the full range of 0 degrees and 60 degrees in the horizontal direction and within the full range of 0 degrees and 60 degrees along the vertical direction, when a range of 10 to 20° along the horizontal direction and 30 degrees to 40 degrees along the vertical direction is determined as the nystagmus/chosen range, then the microcontroller 110 effects oscillations of pupils 102, 106 when the microprocessor 110 determines that the pupils 102, 106 are placed at a position within this defined range. In some embodiments, the nystagmus position or the nystagmus range may be the same for both the right and left pupils 102, 106. In other embodiments, the nystagmus position or the nystagmus range may be different for the right and left pupils 102, 106. For instance, the nystagmus position for the right pupil 102 may be set at 10 degrees along the horizontal direction and 5 degrees along the vertical direction, while the nystagmus position for the left pupil 106 may be set at 15 degrees along the horizontal direction and 10 degrees along the vertical direction. Also, the nystagmus range for the right pupil 102 may be between 10 degrees and 20 degrees along the horizontal direction and 15 degrees and 25 degrees along the vertical direction, while the nystagmus range for the left pupil 106 may be between 15 degrees and 25 degrees along the horizontal direction and 5 degrees and 15 degrees along the vertical direction.

At step 1110, parameters associated with oscillations of the pupils 102, 106 are selected. As discussed previously, these parameters include amplitude, frequency, and/or variable speed. The microcontroller 110 uses the motors 150, 170, 250, 270 to effect oscillations of the pupils in accordance with these parameters independently in the horizontal and vertical directions 602, 604, 606, 608. For example, when the amplitude of 5 degrees is set, the microprocessor 110 effects horizontal and vertical oscillations of the pupils 102, 106 such that the pupils 102, 106 oscillate (in the horizontal and vertical directions)+/−2.5 degrees about the nystagmus position or a position within the nystagmus range. When the frequency of 1 Hz is set, the microprocessor 110 effects horizontal and vertical oscillations of the pupils 102, 106 such that the pupils 102, 106 oscillate (and the horizontal and vertical directions) within 1 second about the nystagmus position or a position within the nystagmus range. Similarly, when the default speed of 1 is set, the microcontroller 110 will effect horizontal and vertical oscillations of the pupils 102, 106 such that the pupils 102, 106 oscillate above the nystagmus position (or a position within the nystagmus range) at the same speed as the pupils 102, 106 oscillate below the nystagmus position (or position within the nystagmus range). In some embodiments, the parameters may be the same for both the right and left pupils 102, 106. In other embodiments, the parameters may be different for the right and left pupils 102, 106.

As discussed previously with respect to horizontal nystagmus and vertical nystagmus, the set parameters may be modified based on the determination of the nystagmus position/range. Alternatively, the chosen parameters may be constant and variations may occur in the determined nystagmus position/range.

At step 1112, the method 1100 may optionally include inputting variations in the simulation. For example, variations may be introduced into a simulation of pendular nystagmus such that the amplitude parameter of the oscillation of the pupils 102, 106 is larger at the edges of the full range of horizontal and vertical motion (e.g., 0 degrees to 15 degrees or 45 degrees to 60 degrees) of the pupils in comparison to oscillation of the pupils 102, 106 at the center of the horizontal and vertical ranges of motion (e.g., 25 degrees to 35 degrees). These variations may be introduced dynamically in real-time during the simulation, and may include changing various aspects (e.g., parameters) of the simulation. The oscillations may also be varied in response to eyelid blinking motions and other instructions entered into the simulator 200.

In some embodiments, the method 1100 may repeat itself after steps 1110 or 1112, such as proceeding through steps 1104-1112 iteratively. The simulation may be completed and stop at step 1114.

Figure 16:
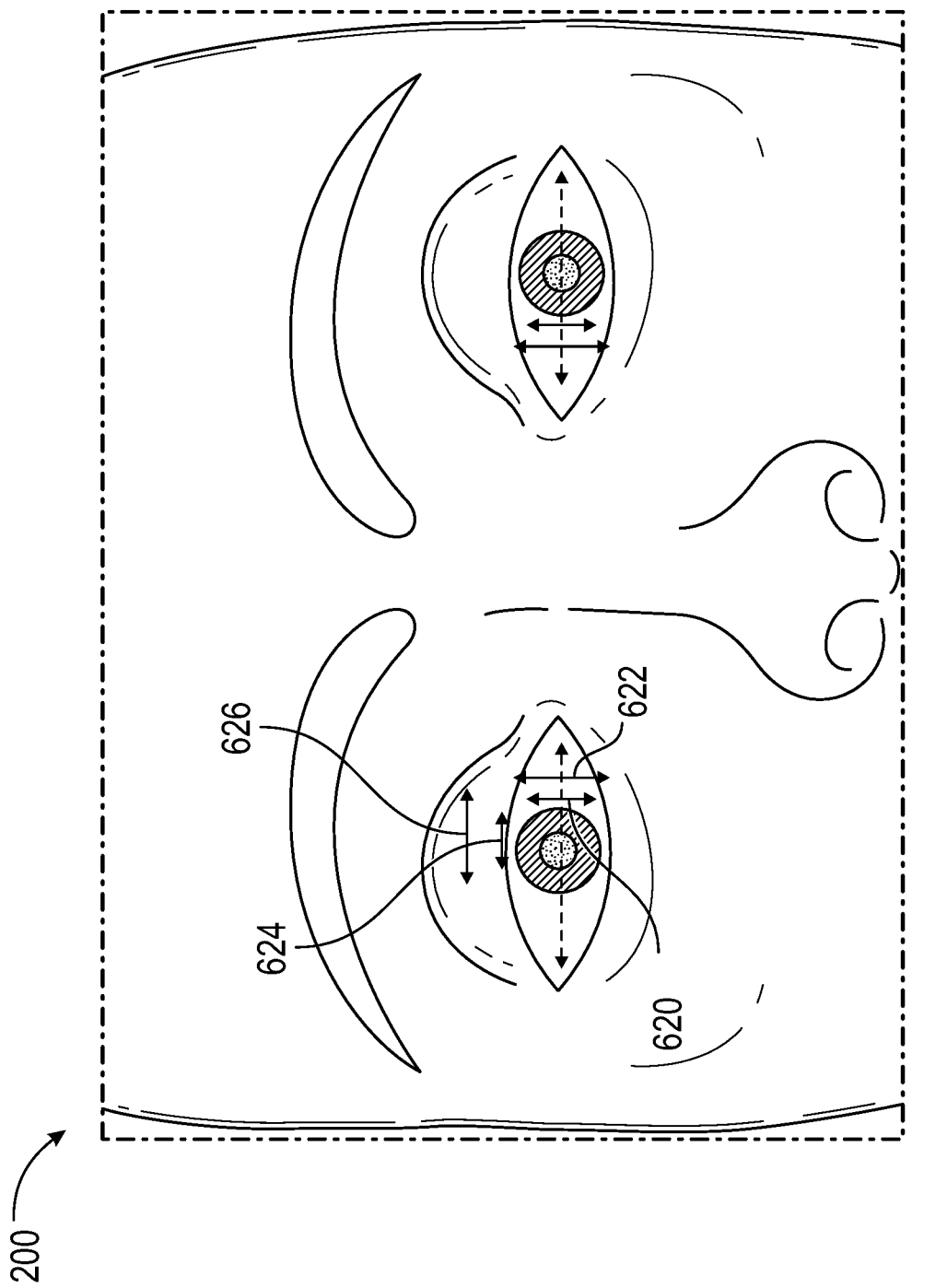
FIG. 16 illustrates the ability of the simulator 200 to vary amplitude.

FIG. 16 illustrates the ability of the simulator 200 to vary amplitude during a simulation. In some embodiments, the amplitude of various motions may be varied, for example by using the user-interface, throughout any of the simulations shown in FIGS. 15A-G. In some embodiments, the horizontal and/or vertical oscillation of the right and left pupils 102, 106 about the nystagmus position or a position within the nystagmus range may be varied. For example, the amplitude of the horizontal oscillation may be varied from oscillating at a first amplitude 624 to oscillating at a second amplitude 626. Similarly, the amplitude of the vertical oscillation may be varied from oscillating at a first amplitude 620 to oscillating at a second amplitude 622. In some embodiments, the second amplitudes 626, 622 may be larger than the first amplitudes 624, 620, while in other embodiments, the first amplitudes 624, 620 may be larger than the second amplitudes 626, 622. The variation of amplitude in the simulator 200 may be controlled via the user interface automatically using various simulation programs or manually by the user.

Blepharospasm: Blepharospasm is an abnormal, involuntary blinking or spasm of the eyelids. Blepharospasm is associated with an abnormal function of the part of the brain responsible for controlling the muscles. When the brain fails to control muscles in the upper eyelids, the eyes exhibit blepharospasm. Most people develop blepharospasm without any warning symptoms. It may begin with a gradual increase in blinking or eye irritation. In rare cases, heredity may play a role in the development of blepharospasm. To date, there is no successful cure for blepharospasm, although several treatment options can reduce its severity.

Figure 17:
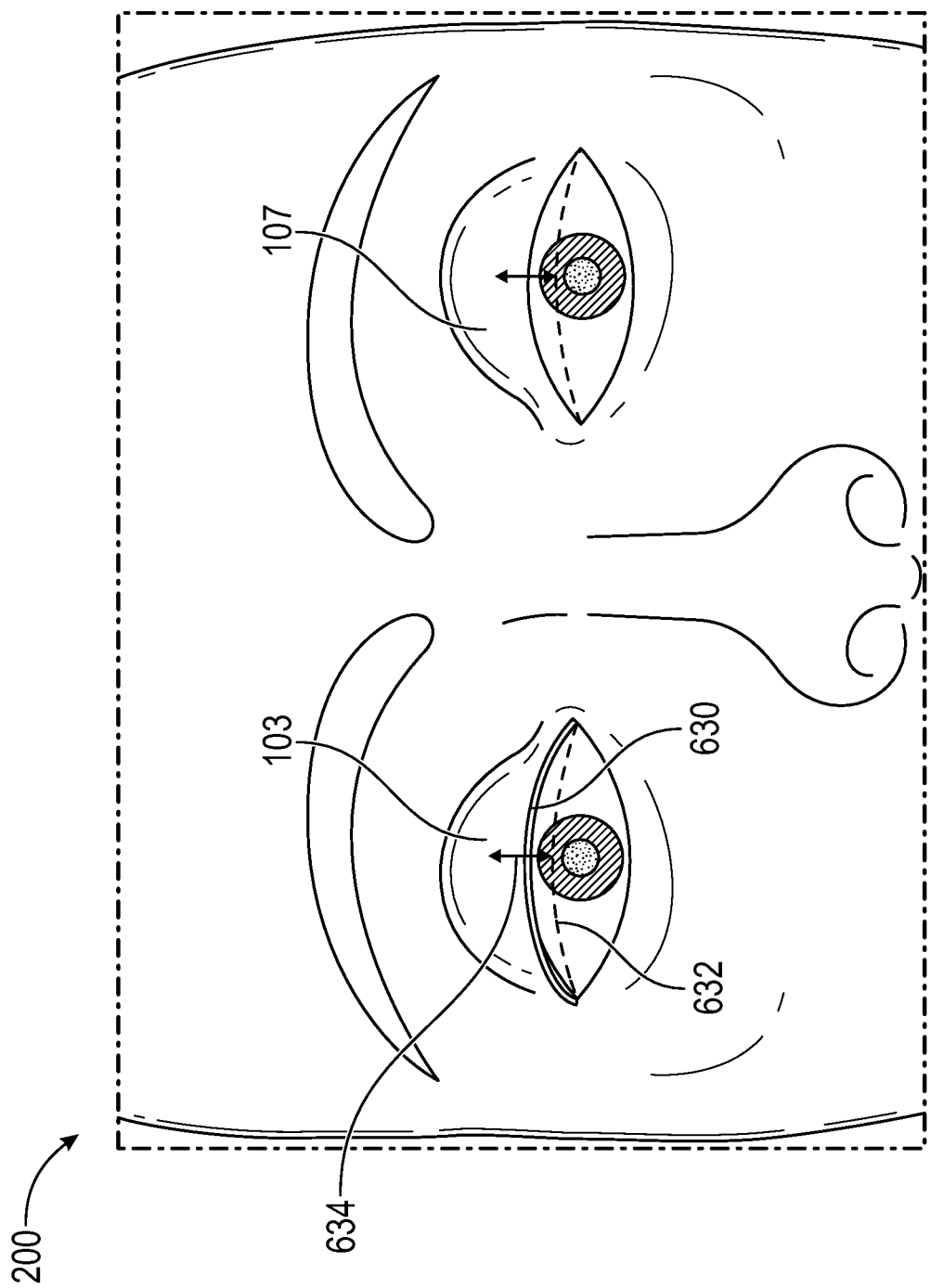
FIG. 17 illustrates an exemplary simulation of blepharospasm according to various embodiments of the present disclosure.
Figure 18:
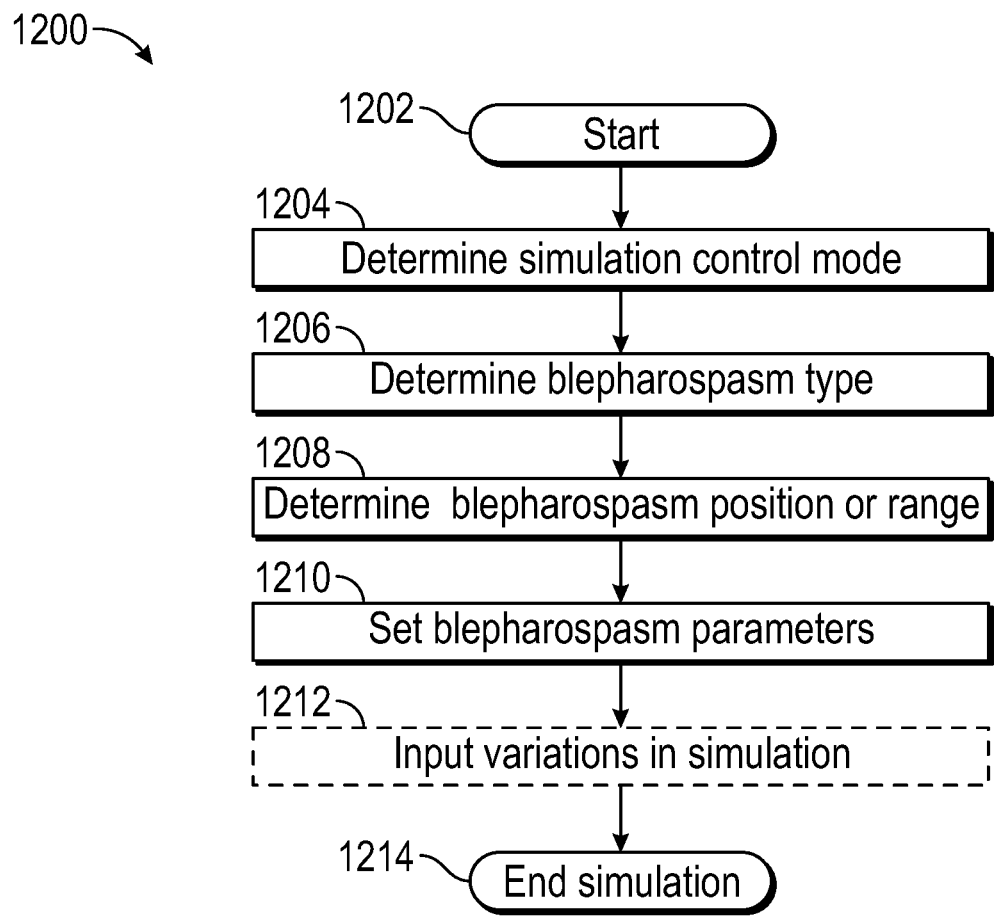
FIG. 18 illustrates an exemplary method 1200 for performing a blepharospasm simulation according to various embodiments of the present disclosure.
Figure 19:
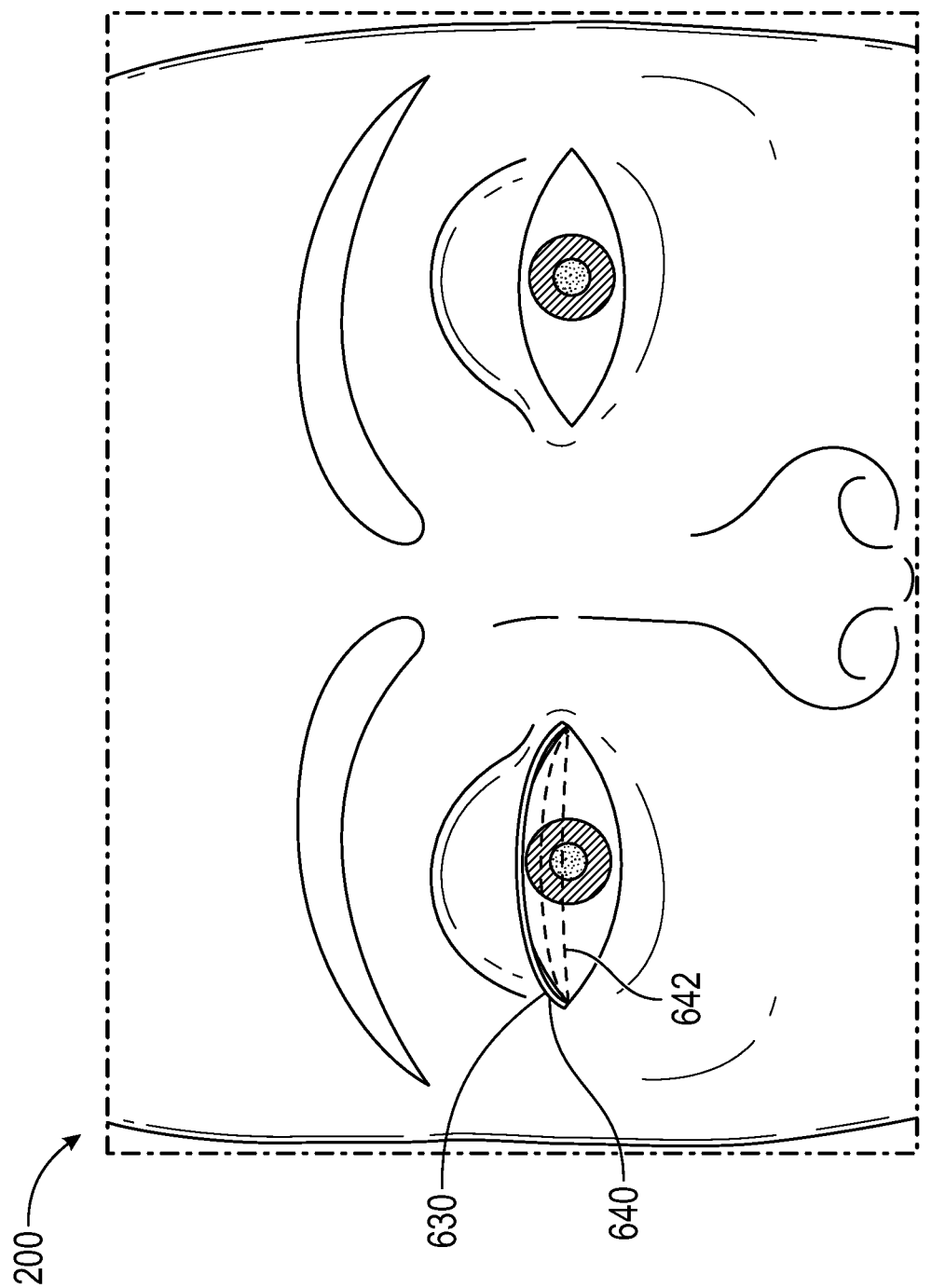
FIG. 19 illustrate exemplary simulations of high and low blepharospasm according to various embodiments of the present disclosure.

FIGS. 17-19 discuss various simulations of blepharospasm. The simulator 200 simulates the abnormal, involuntary blinking through motion of one or both eyelids 103, 107. Blepharospasm may occur with any amplitude among the full range of motion of the right and left eyelids. In various embodiments, blepharospasm may occur as high amplitude blepharospasm or as low amplitude blepharospasm, as shown in FIG. 19. High amplitude blepharospasm may be characterized by a vertical oscillation of the eyelids with a larger amplitude in comparison to the vertical oscillation of the eyelids with a lower amplitude in low amplitude blepharospasm. Although exemplary ranges for oscillations have been mentioned in the discussion below, the microprocessor may determine any amplitude within the full range of eyelid motion to simulate blepharospasm.

FIG. 17 shows that blepharospasm may be simulated by oscillating the eyelids 103, 107. For example, simulations of blepharospasm may include vertical oscillation of the eyelids 103, 107 about a chosen position 630. The microprocessor 110 may effect movement of the eyelids 103, 107 a certain distance from this chosen position 630 to a second position 632 to simulate various types and degrees of blepharospasm. This oscillating of the eyelids 103, 107 may occur when the eyelids are at rest or moving. The parameters of oscillation include amplitude, frequency, and speed, and may be controlled through pre-programmed routines, IR tracking, or joystick manipulation. In simulating blepharospasm, the microprocessor 110 may effect movement of one or both the eyelids 103, 107 together or independently. The above discussion regarding the parameters for nystagmus also applies appropriately to blepharospasm.

High Amplitude Blepharospasm: FIG. 19 illustrates a simulation of high amplitude blepharospasm. High amplitude blepharospasm may be characterized by a vertical oscillation of the eyelids with a larger amplitude in comparison to a vertical oscillation of the eyelids with a lower amplitude in low amplitude blepharospasm. In some embodiments, blepharospasm may be simulated by using the microprocessor 110 using one or more blink motors 2010 to oscillate the eyelids 103, 107 vertically. An exemplary high amplitude blepharospasm simulation may include the steps of method 1200 as shown in FIG. 18, beginning with step 1202.

At step 1204, the microcontroller 110 determines a simulation control mode. The control mode may determine how simulation instructions are input for vertical motion of the eyelids 103, 107, and may include a joystick mode, an IR tracking mode, a pre-programed routine mode, or a combination of these modes as discussed previously. That is, the eyelids 103, 107 may be moved in the vertical directions 606, 608 within the full range of motion of the eyelids 103, 107 being completely open and being completely closed. Since the height of an average eyelids is about 10 mm, the eyelids 103, 107 of the simulator may be moved between completely open (0 mm) and completely closed (10 mm) using the above modes. For example, when the IR tracking mode is selected, the simulator 200 may determine the location of an object in front of the IR sensors 120, 121, 122, 123, 124 and effect motion of either one or both pupils 102, 106 and one or both eyelids 103, 107 to follow the object accordingly. This mode may include the steps of methods 900 and 1000 as shown in FIGS. 7 and 8, respectively.

At step 1206, high amplitude blepharospasm is selected as the type of blepharospasm to be simulated. Simulation of high amplitude blepharospasm involves the microprocessor 110 effecting oscillations of the eyelids 103, 107 vertically by using one or more motors 2010. As discussed below, simulation of high amplitude blepharospasm involves selection of the blepharospasm position or the blepharospasm range within the exemplary full range of vertical motion of 0 mm to 10 mm.

At step 1208, the microcontroller 110 determines a blepharospasm position or a blepharospasm range. The blepharospasm position (e.g., the healthy position) is the chosen position about which the microcontroller 110 effects oscillations of the eyelids 103, 107. For example, within the full range of 0 mm and 10 mm, when 4 mm is determined as the blepharospasm/chosen position, then the microcontroller 110 effects oscillations of eyelids 103, 107 when the microcontroller 110 determines that the eyelids 103, 107 are placed at the 4 mm position. Similarly, the blepharospasm range is a range of positions about which the microcontroller 110 effects oscillations of the eyelids 103, 107. For example, within the full range of 0 mm and 10 mm, when a range of 4 mm to 6 mm is determined as the blepharospasm/chosen range, the microcontroller 110 effects oscillations of eyelids 103, 107 when the microprocessor 110 determines that the eyelids 103, 107 are placed at a position within the range of 4 mm to 6 mm. In some embodiments, the blepharospasm position or the blepharospasm range may be the same for both the right and left eyelids 103, 107. In other embodiments, the blepharospasm position or the blepharospasm range may be different for the right and left eyelids 103, 107. For instance, the blepharospasm position for the right pupil 102 may be set at 3.5 mm, while the blepharospasm position for the left pupil 106 may be set at 4 mm. Also, the blepharospasm range for the right pupil 102 may be between 3 mm to 4 mm, while the blepharospasm range for the left pupil 106 may be between 3.5 mm to 4.5 mm.

At step 1210, parameters associated with oscillations of the eyelids 103, 107 are selected. As discussed previously, these parameters include amplitude, frequency, and/or variable speed. The microcontroller 110 uses one or more motors 2010 to effect oscillations of the eyelids 103, 107 in accordance with these parameters independently in the vertical directions 606, 608. For example, when the amplitude of 4 mm is set, the microprocessor 110 effects oscillations of the eyelids 103, 107 such that the eyelids 103, 107 oscillate +/−2 mm degrees about the blepharospasm position or a position within the blepharospasm range. When the frequency of 1 Hz is set, the microprocessor 110 effects oscillations of the eyelids 103, 107 such that the eyelids 103, 107 oscillate within 1 second about the blepharospasm position or a position within the blepharospasm range. Similarly, when the default speed of 1 is set, the microcontroller 110 will effect oscillations of the eyelids 103, 107 such that the eyelids 103, 107 oscillate above the blepharospasm position (or a position within the blepharospasm range) at the same speed as the eyelids 103, 107 oscillate below the blepharospasm position (or position within the blepharospasm range). In some embodiments, the parameters may be the same for both the right and left eyelids 103, 107. In other embodiments, the parameters may be different for the right and left eyelids 103, 107.

In some embodiments, the set parameters may be modified based on the determination of the blepharospasm position. For example, the set amplitude of 4 mm may be modified when a blepharospasm position is determined to be near the limit of the full range of vertical motion of the eyelids. In particular, when the blepharospasm position is determined to be at 9 mm, the right eyelid 103 may oscillate 2 mm above the blepharospasm position, but only 1 mm below the blepharospasm position. Similarly, if the blepharospasm position is determined at 10 mm, the right eyelid 103 may oscillate between 8 mm and 10 mm.

Alternatively, the chosen amplitude may remain constant and variations may occur in the determined blepharospasm position. That is, the determined blepharospasm position may be modified based on the set parameter. For example, the determined blepharospasm position of 9 mm may be modified when a set parameter requires oscillation of an eyelid 103, 107 beyond full range of vertical motion of an eyelid 103, 107. When the amplitude is set at 4 mm for the right eyelid 103, the right eyelid 103 may oscillate 2 mm above the blepharospasm position, and 2 mm below the blepharospasm position. To accommodate the full 4 mm oscillation, the determined blepharospasm position may be modified from being at 9 mm to being at 8 mm. In other words, for any blepharospasm position between 8 mm and 10 mm or between 0 mm and 2 mm, the pupils will oscillate between 6 mm and 10 mm or between 0 mm and 4 mm, respectively.

At step 1212, the method 1200 may optionally include inputting variations in the simulation. For example, variations may be introduced into a simulation of high amplitude blepharospasm such that the amplitude of the oscillation of the eyelids 103, 107 is larger at the edges of the full range of vertical motion (e.g., 0 mm to 1 mm or 9 mm to 10 mm) of the eyelids in comparison to oscillation of the eyelids 103, 107 at the center of the full range of vertical motion (e.g., 4 mm to 6 mm). Blepharospasm oscillations may also be varied in response to blinking motions and other instructions entered into the simulator 200.

In various embodiments, the oscillation of the eyelids 103, 107 may vary throughout the simulation. For example, the microcontroller 110 may effect a constant vertical oscillation of 2 mm in the eyelids 103, 107 as the simulation begins. A blepharospasm position may be chosen at 3 mm along the vertical direction. The eyelids 103, 107 may be controlled to reach the chosen 3 mm position (i.e., the determined blepharospasm position). At this position, the microcontroller 110 may vary the amplitude of the oscillation of the eyelids 103, 107 to 3 mm or 1 mm. As discussed above, the microcontroller 110 may effect variations in the up direction 606 and the down direction 608. These variations to the various simulations may provide a more life-like experience for the user.

In some embodiments, the method 1200 may repeat itself after steps 1210 or 1212, such as proceeding through steps 1204-1212 iteratively. The simulation may be completed and stop at step 1214.

Low Amplitude Blepharospasm: FIG. 19 also illustrates a simulation of low amplitude blepharospasm. Low amplitude blepharospasm may be characterized by a vertical oscillation of the eyelids with a smaller amplitude in comparison to the larger amplitude in high amplitude blepharospasm. In some embodiments, low amplitude blepharospasm may be simulated using the similar steps as high amplitude blepharospasm by using the microprocessor 110 to oscillate the eyelids 103, 107 vertically by using one or more blink motors 2010.

In various embodiments, any type of blepharospasm may be simulated along with any type of nystagmus using a combination of the steps of methods 1100 and 1200. Additionally, blinking motion, as discussed with respect to FIG. 10, may be simulated with nystagmus, blepharospasm, and/or ptosis (discussed below).

Ptosis: Ptosis is a drooping of the upper eyelid. The eyelids may droop only slightly, or it may cover the pupil entirely. In some cases, ptosis can restrict and even block normal vision. It can be present in children as well as adults and may be treated with surgery.

Figure 20:
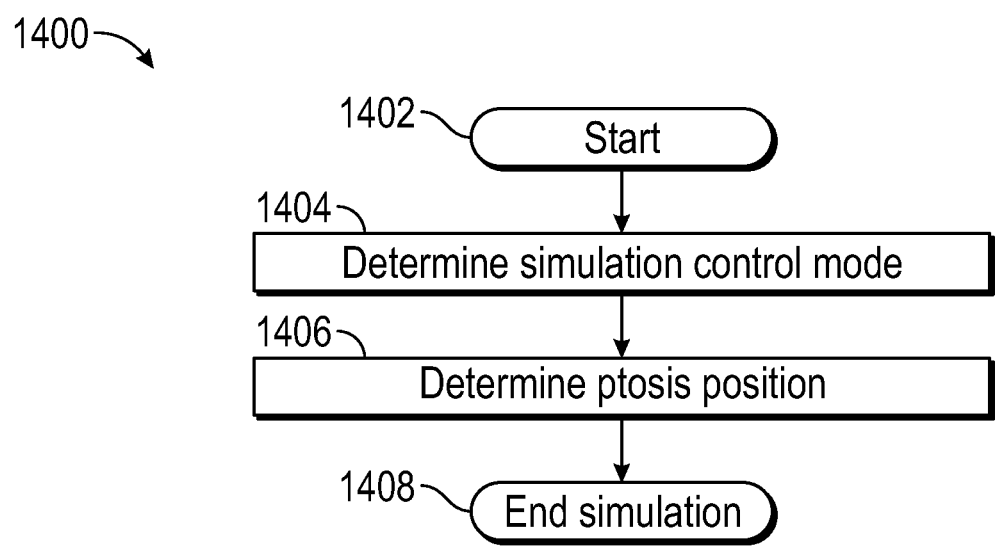
FIG. 20 illustrates an exemplary method 1400 for performing a ptosis simulation according to various embodiments of the present disclosure.
Figure 21:
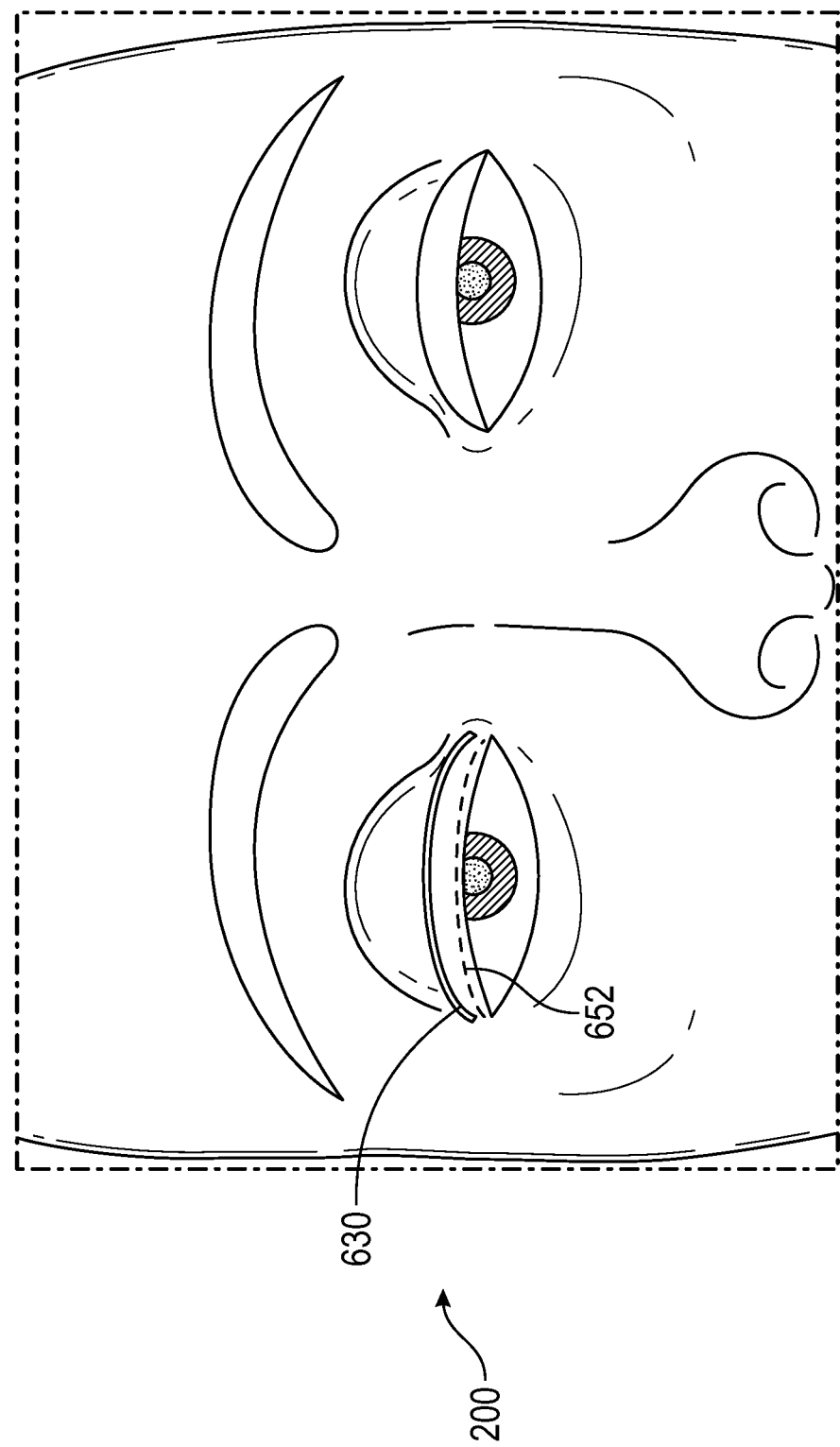
FIG. 21 illustrates exemplary simulations of ptosis according to various embodiments of the present disclosure.

FIGS. 20-22 illustrate various simulations of ptosis. Ptosis is a condition in which one or both eyelids droop. Ptosis may be cause by weakening of the muscles that hold up the eyelids. Ptosis may be simulated through the microprocessor 110 lowering the eyelids 103, 107, as shown in FIG. 21, via use of one or more blink motors 2010. Simulations of ptosis may include a healthy position 630 for the eyelids 103, 107. The eyelids 103, 107 may be lowered a certain distance from the healthy position 630 to a chosen position 632 to simulate various degrees of ptosis. The distance by which one or both eyelids 103, 107 are lowered may be controlled, for example, through pre-programmed routines, IR tracking, joystick, or other user interface. Ptosis simulations may involve the microprocessor 110 effecting movement of the eyelids 103, 107 together or separately.

FIG. 20 illustrates an exemplary method 1400 for performing simulations of ptosis according to various embodiments of the present disclosure. The method starts at step 1402.

At step 1404, the microcontroller 110 determines a simulation control mode. The control mode may determine how simulation instructions are input for vertical motion of the eyelids 103, 107, and may include a joystick mode, an IR tracking mode, a pre-programed routine mode, or a combination of these modes as discussed previously. That is, the eyelids 103, 107 may be moved in the down direction 608 within the full range of motion of the eyelids 103, 107 being completely closed. Since the height of an average eyelids is about 10 mm, the eyelids 103, 107 of the simulator may be moved between completely open (0 mm) and completely closed (10 mm) using the above modes. For example, when the IR tracking mode is selected, the simulator 200 may determine the location of an object in front of the IR sensors 120, 121, 122, 123, 124 and effect motion of either one or both pupils 102, 106 and one or both eyelids 103, 107 to follow the object accordingly. This mode may include the steps of methods 900 and 1000 as shown in FIGS. 7 and 8, respectively. In a ptosis simulation, a tracking mode and a ptosis simulation may be run independently.

At step 1406, the microcontroller 110 determines a ptosis position. The ptosis position may be determined within the full range of eyelid motion of 0 mm and 10 mm. For example, the ptosis position may be set at 7 mm. In this case, the microprocessor 110 effects motion of one or more of the eyelids 103, 107 from the completely open position (at 0 mm) or a healthy position to the determined position of 7 mm. In some embodiments, the ptosis position may be the same for both the right and left eyelids 103, 107. In other embodiments, the ptosis position may be different for the right and left eyelids 103, 107. For instance, the ptosis position for the right pupil 102 may be set at 3.5 mm, while the ptosis position for the left pupil 106 may be set at 4 mm. After the ptosis position is determined, the microprocessor 110 may effect upward or downward motion of the eyelids 103, 107 to the determined ptosis position. The simulation may end at step 1408.

In some embodiments, ptosis simulations may be combined with nystagmus simulations and/or blepharospasm simulations using the steps of methods 1100, 1200, and 1400. For example, a ptosis simulation and a blepharospasm simulation may be performed simultaneously where the eyelids 103, 107 are lowered to the ptosis position and are oscillated about the blepharospasm position or a position within the blepharospasm range. Additionally, normal blinking motion, as discussed with respect to FIG. 10, may be simulated with nystagmus, blepharospasm, and/or ptosis.

Figure 22A:
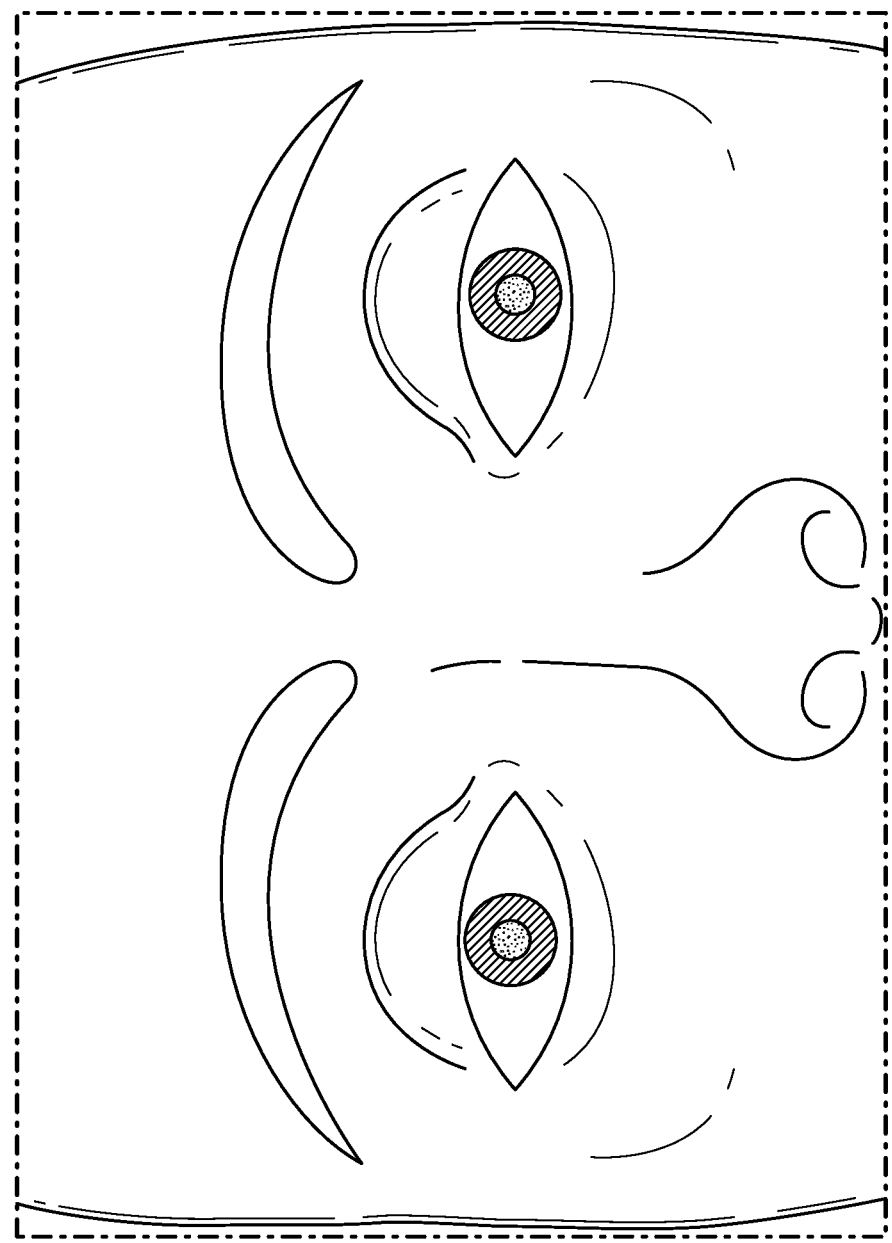
FIGS. 22A-C illustrate exemplary simulations of eye-idling according to various embodiments of the present disclosure.
Figure 22B:
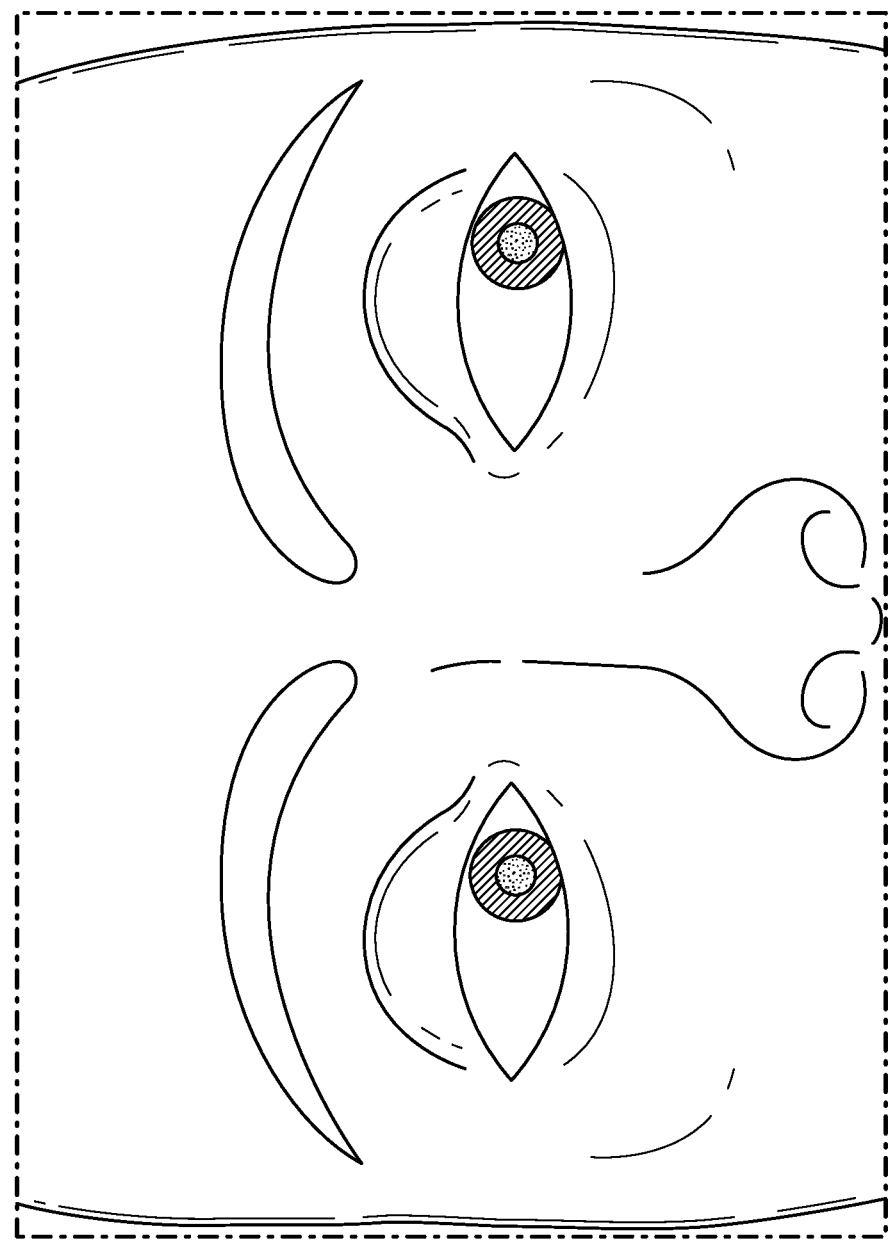
Figure 22C:
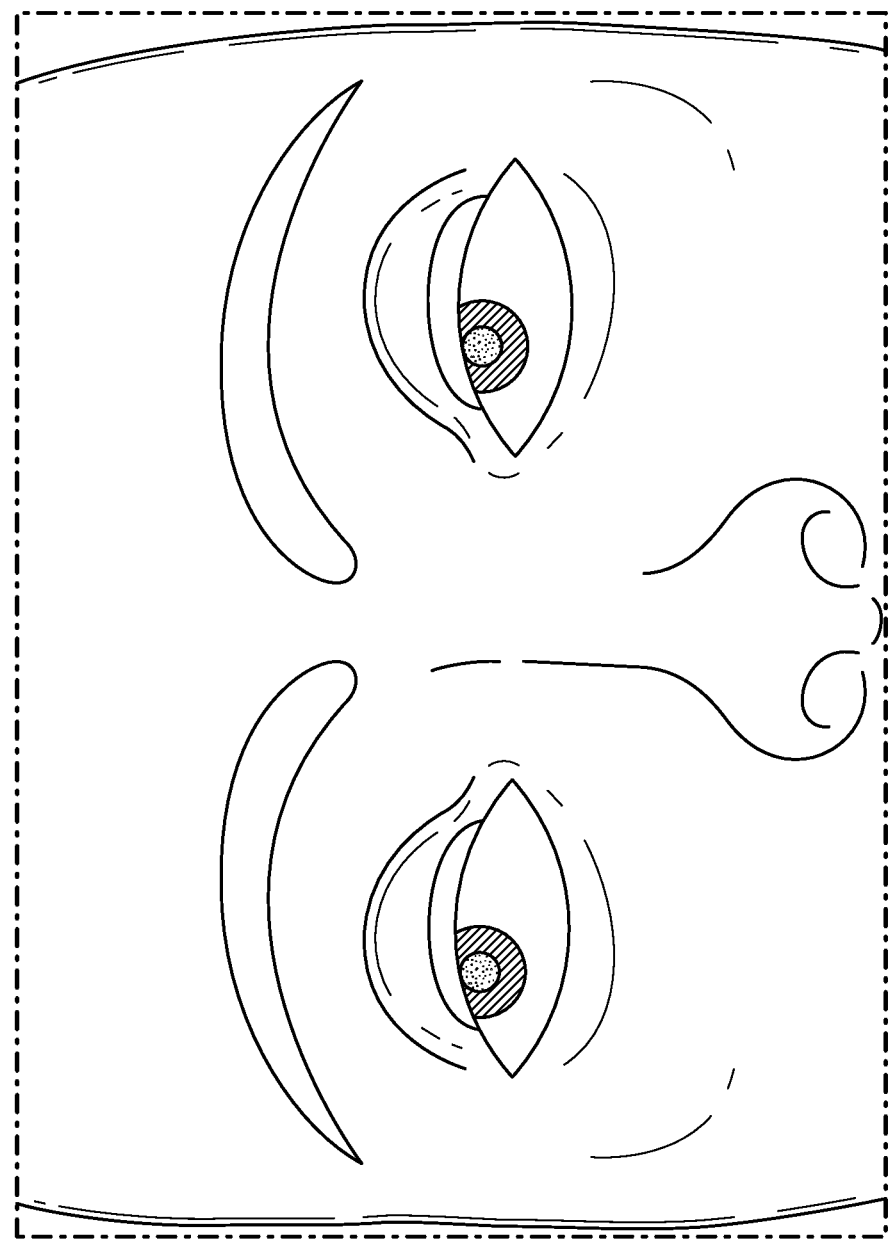

Idling: FIGS. 22A-C illustrate exemplary simulations of idle eyes (idling) according to various embodiments of the present disclosure. Idling is described as the real and random movement of the pupils 102, 106 when a person is sitting idly without focusing on any object. The real and random motion of the pupils can have different severities, exhibiting different stages of medical conditions such as hyper-vigilance (e.g., anxiousness) in the person. For example, the real and random movement of the pupils may have a low severity and move normally to exhibit that the person is not hyper-vigilant. Alternatively, the real and random movement of the pupils may have a moderate severity and move with moderate speed to exhibit that the person is a little hyper-vigilant. Finally, the real and random movement of the pupils may have a high severity and move rapidly to exhibit that the person is hyper-vigilant.

In some embodiments, the real and random motion of the pupils in idling may be simulated by using the simulator 200. The microprocessor 110 may randomly move the pupils 102, 106 horizontally and vertically by using the motors 150, 170, 250, 270. For example, the microprocessor 110 may effect settings to allow the pupils 102, 106 to move with normal severity, moderate severity, or high/rapid severity to exhibit the different stages of hyper-vigilance. Each setting varies increases or decreases) the rate of the random movements.

Figure 23:
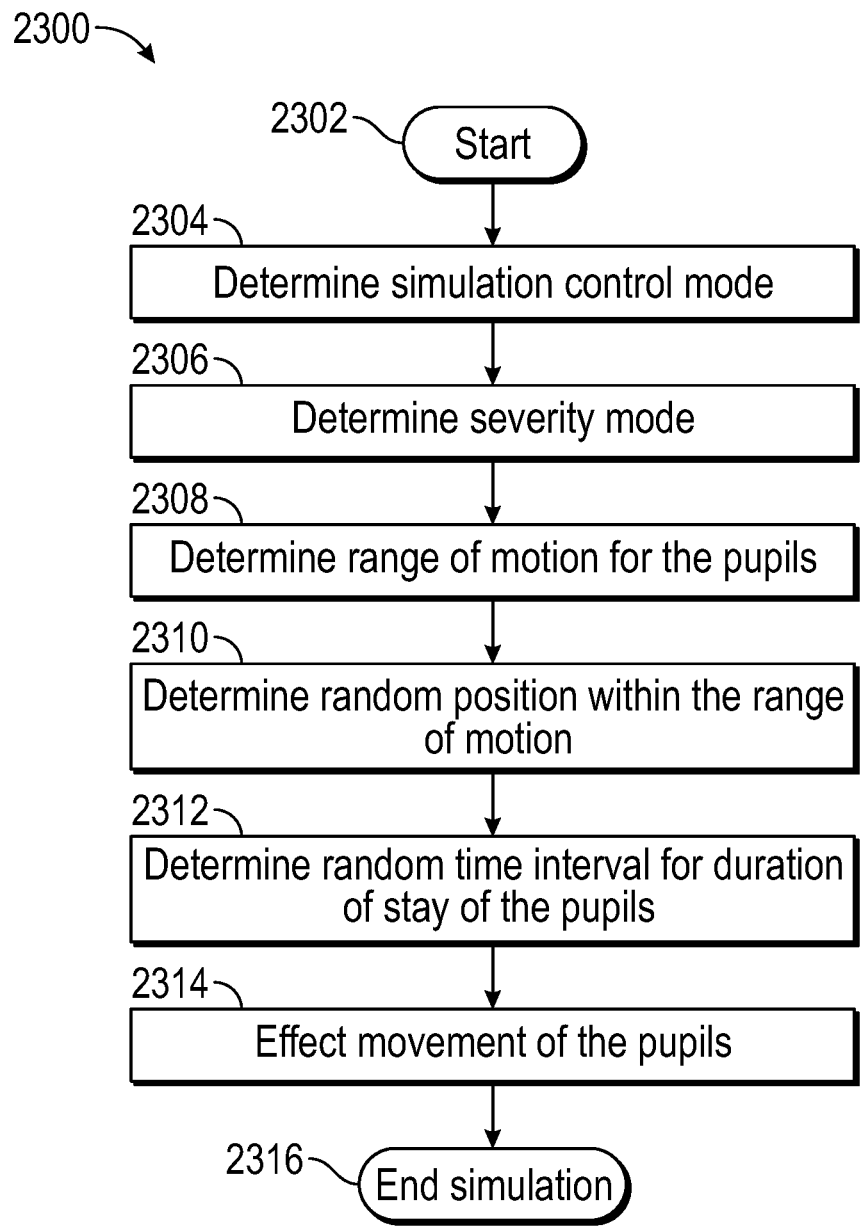
FIG. 23 illustrates a method for simulating idling according to various embodiments of the present disclosure.

FIG. 23 illustrates a method for simulating idling according to various embodiments of the present disclosure. The method starts at step 2302, when it is assumed that the pupils 102, 106 are in their default (e.g., 30-degree position) position looking forward (see FIG. 22A).

At step 2304, the microcontroller 110 determines a simulation control mode. The control mode may determine how simulation instructions are input for horizontal and vertical motion of the pupils 102, 106. That is, the pupils 102, 106 may be moved in the horizontal and vertical directions 602, 604, 606, 608 within the full range of horizontal and vertical motions shown in FIG. 13. For example, when the pre-programmed routine mode is selected, the microprocessor 110 may effect motion of the pupils 102, 106 in accordance with the programmed instructions.

At step 2306, the microprocessor 110 determines a severity mode for the movement of the pupils 102, 106. For example, the microprocessor 110 may determine a normal mode, a moderate mode, or a rapid mode.

At step 2308, the microprocessor 110 determines a range of motion for the pupils 102, 106. The range of motion may include determination of a range of horizontal motion of the pupils 102, 106, and a range of vertical motion of the pupils 102, 106. That is, the range of motion may be an area defined by the determined range of horizontal and vertical motions of the pupils 102, 106. For example, the area may be defined by horizontal motion within the range of 20 degrees to 40 degrees and vertical motion within the range of 25 degrees to 45 degrees. In various embodiments, the horizontal and vertical ranges for the right pupil 102 may be the same as or different from the horizontal and vertical ranges for the left pupil 106.

At step 2310, the microprocessor 110 determines a random position within the area defined by the range of motion discussed in step 2308 (see FIG. 22B). The random position may be determined by randomly determining a horizontal position and randomly determining a vertical position of the pupils 102, 106. For example, the microprocessor 110 may randomly determine the horizontal position within the previously determined horizontal range of 20 degrees to 40 degrees, and the vertical position within the previously determined vertical range of 25 degrees to 45 degrees.

At step 2312, the microprocessor 110 determines a random time interval for the duration of stay of the pupils 102, 106 at a the position determined in step 2310. That is, the microprocessor 110 determines the duration of time for which the pupils 102, 106 remain at the position determined in step 2310 during the simulation. In various embodiments, the duration of the random time interval may be based on the severity mode selected in step 2306. For example, in the normal mode, the random time interval may be between 1000 and 4000 milliseconds. In the moderate mode, the random time interval may be between 1000 and 2000 milliseconds. In the rapid mode, the random time interval may be between 500 and 1000 milliseconds.

At step 2314, the microprocessor 110 effects movement of the pupils 102, 106 from their default position to the position determined in step 2310. Further, at step 2314, upon positioning of the pupils 102, 106 at the position determined in step 2310, the microprocessor 110 monitors a tinier that expires at the end of the duration of the random time interval determined in step 2312. That is, the microprocessor 110 determines, through the timer, whether the random time interval determined at step 2312 has elapsed.

Upon expiration of the timer, the method moves back to step 2310. At this stage, the microprocessor 110 determines another random position (see FIG. 22C) within the area defined by the range of motion discussed in step 2308. Again, at step 2312, the microprocessor 110 determines another random time interval for the duration of stay of the pupils 102, 106 at the determined another random position. At step 2314, again the microprocessor 110 effects movements of the pupils 102, 106 from the random position to the another random position, and monitors the timer to determine whether the another random time interval has expired. Upon expiration of the timer, the method again moves back to step 2310. In this way, the method iteratively performs steps 2310 to 2314 until the simulation is stopped at step 2316.

For all of the steps of method 2300, the settings, positions, and time intervals for the right pupil 102 may be determined to be the same as or different from those for the left pupil 106. For example, the microprocessor may move the right pupil 102 to exhibit idling, while moves the left pupil 106 to exhibit any other medical condition such as, for example, strabismus.

A patient simulator can include a right eye assembly comprising a right pupil; a right eyelid assembly; a left eye assembly comprising a left pupil; a left eyelid assembly; a user interface configured to receive simulation instructions for simulating an ocular disease; a transmitter configured to transmit a signal toward an object placed in front of the patient simulator; a sensor configured to receive a signal reflected off the object; and a microprocessor configured to receive the simulation instructions from the user interface, the microprocessor configured to determine a location of the object based on the sensing of signal by the sensor, and to effect movement in the right eye assembly, the tight eyelid assembly, the left eye assembly, or the left eyelid assembly based on the simulation instructions and the determined location of the object.

The transmitter can be an infrared (IR) transmitter configured to transmit IR radiation. The IR transmitter can be configured to transmit the IR radiation in a burst of frequency modulated pulses. The sensor(s) can be an IR sensor. The sensor(s) can be configured to record a value corresponding to an intensity of the IR response signal. The microprocessor can be configured to compare a current position of the right pupil and/or the left pupil with the determined location of the object in effecting movement of the right pupil and/or the left pupil. The microprocessor can be configured to effect movement of the right pupil jointly with respect to the movement of the left pupil and/or independently with respect to the movement of the left pupil. Each of the right pupil and the left pupil can be configured to move in a horizontal direction, a vertical direction, and/or combinations thereof.

The simulated ocular disease can include one or more of nystagmus, blepharospasm, and ptosis. One or more aspects of the movement, such as an amplitude of movement, a frequency of movement, and/or a speed of movement, can be implemented based on the simulated ocular disease. When the ocular disease is a form of nystagmus, the nystagmus can include horizontal nystagmus, right beat nystagmus, left beat nystagmus, vertical nystagmus, up-beat nystagmus, down-beat nystagmus, pendular nystagmus, and/or combinations thereof. The simulation instructions can include oscillating the right eye and the left eye around a center position.

The simulation instructions can include simulating blepharospasm at any amplitude within a full range of motion of the right and left eyelids, including high amplitude blepharospasm or low amplitude blepharospasm. The simulation instructions can include oscillating the right and left eyelid assemblies around a starting position. The simulation instructions can include simulating one or more aspects of ptosis. The simulation instructions can include lowering the right and left eyelid assemblies from a starting position.

The patient simulator can further include at least one blink motor mechanically coupled to the right eyelid assembly and/or to the left eyelid assembly. The microprocessor can be configured to electrically actuate the at least one blink motor to rotate. The rotation of the at least one blink motor can cause motion of the right eyelid assembly and/or the left eyelid assembly to simulate blinking.

The patient simulator can further include a right eyelid position sensor electrically coupled to the microprocessor and configured to report a current position of the right eyelid. The patient simulator can further include a left eyelid position sensor electrically coupled to the microprocessor and configured to report a current position of the left eyelid. The right and/or left eyelid position sensors can be rotary potentiometers. The motion of the right eyelid can be independent from the motion of the left eyelid. The microprocessor can be configured to control a speed of motion of the right eyelid and/or the left eyelid.

A patient simulation system can include a right eye assembly comprising a right pupil; a right eyelid assembly; a left eye assembly comprising a left pupil; a left eyelid assembly; a control interface configured to receive simulation instructions from a user; a data input device configured to receive one or more simulation instructions; and at least one infrared (IR) transmitter configured to transmit IR radiation towards an object placed in front of the simulator; at least one IR sensor configured to receive an IR response signal reflected off the object; and a microprocessor configured to determine a location of the object based on the sensing of the IR response signal by the at least one IR sensor, and to effect movement of the right pupil and/or the left pupil based on the determined location of the object and the simulation instructions.

Each of the right pupil and the left pupil can be configured to move in a horizontal direction, a vertical direction, and/or a combination thereof. The IR transmitter can be configured to transmit the IR radiation in a burst of frequency modulated pulses. The at least one IR sensor can be configured to record a value corresponding to an intensity of the IR response signal. The microprocessor can be configured to compare a current position of the right pupil and/or the left pupil with the determined location of the object in effecting movement of the right pupil and/or the left pupil. The microprocessor can be configured to effect movement of the right pupil jointly with respect to the movement of the left pupil and/or independently with respect to the movement of the left pupil.

The right eye assembly can include a right iris and the left eye assembly can include a left iris. The patient simulator can further include a right optical sensor configured to sense a light condition associated with the right eye and to provide a right electrical signal based on the sensed light condition. The right optical sensor can be placed within the right eye. The patient simulator can further include a left optical sensor configured to sense a light condition associated with the left eye and to provide a left electrical signal based on the sensed light conditions. The left optical sensor can be placed within the left eye. The microprocessor can be electrically connected to the right optical sensor and/or to the left optical sensor and configured to receive the right electrical signal and/or the left electrical signal. The microprocessor can be configured to change a size of the right iris based on the right electrical signal. The microprocessor can be configured to change a size of the left iris based on the left electrical signal.

The microprocessor can be configured to change the size of the right iris by increasing or decreasing a circular size of the tight iris, and/or to change the size of the left iris by increasing or decreasing a circular size of the left iris. The microprocessor can be configured to increase or decrease the circular size of the right iris and/or the left iris within a diametric range of 1 mm to 8 mm. The patient simulator can further include a right size motor electrically coupled to the microprocessor and mechanically coupled to the right iris. The patient simulator can further include a left size motor electrically coupled to the microprocessor and mechanically coupled to the left iris. The microprocessor can be configured to change a circular size of the right iris by electrically actuating the right size motor and/or to change a circular size of the left iris by electrically actuating the left size motor.

The right eye assembly can include a right eyelid and the left eye assembly can include a left eyelid. The patient simulator can further include at least one blink motor mechanically coupled to the right eyelid and/or to the left eyelid. The microprocessor can be configured to electrically actuate the at least one blink motor. Actuation of the at least one blink motor can cause motion of the right eyelid and/or the left eyelid to simulate blinking. The patient simulator can further include a tight eyelid position sensor electrically coupled to the microprocessor and configured to report a current position of the right eyelid. The patient simulator can further include a left eyelid position sensor electrically coupled to the microprocessor and configured to report a current position of the left eyelid. The right and/or left eyelid position sensors can be rotary potentiometers. The motion of the right eyelid can be independent from the motion of the left eyelid. The microprocessor can be configured to control a speed of motion of the fight eyelid and/or the left eyelid. The simulation instructions can include one or more aspects of an ocular disease, such as nystagmus, blepharospasm, and/or ptosis. The one or more aspects of the ocular disease can include an amplitude of movement, a frequency of movement, and/or a speed of movement.

A method of simulating an ocular disease can include receiving, with a data input device, first instructions for simulating an ocular disease; transmitting the first instructions to a microcontroller in communication with the data input device; and controlling, with a microcontroller, an aspect of a patient simulator comprising one or more of a right eye pupil, a left eye pupil, a right eyelid, and a left eyelid based on the first instructions to simulate the ocular disease, wherein the controlling comprises effecting movement in one or more of the right eye pupil, the left eye pupil, the right eyelid, and the left eyelid based on the first instructions. The ocular disease can include one or more of nystagmus, blepharospasm, and/or ptosis. The method can further include transmitting second instructions for simulating an ocular disease, the second instructions comprising one or more of an amplitude of movement, a frequency of movement, and a speed of movement to be applied to the effected movements. The first instructions can include causing one or more of the right eye pupil, the left eye pupil, the right eyelid, and/or the left eyelid, to oscillate around a base position to simulate the ocular disease.

A method of performing a simulation can include receiving, at a user interface, simulation instructions for simulating one or more aspects of an ocular disease; transmitting, through a transmitter, a signal toward an object placed in front of a patient simulator; receiving, at a sensor, a signal reflected off the object; receiving, at a microprocessor, the simulation instructions from the user interface; determining, by the microprocessor, a location of the object based on the sensing of signal by the sensor; and effecting movement in a right eye assembly, a right eyelid assembly, a left eye assembly, or a left eyelid assembly based on the received simulation instructions and the determined location of the object.

A patient simulator can include a right eye assembly including a right pupil; a left eye assembly including a left pupil; and a microprocessor configured to: determine a right-position for the right pupil within the right eye assembly and/or a left-position for the left pupil within the left eye assembly; monitor movement of the right pupil within the right eye assembly and/or movement of the left pupil within the left eye assembly; and effect oscillation of the right pupil when the microprocessor determines that the right pupil is placed at the right-position within the right eye assembly, and/or of the left pupil when the microprocessor determines that the left pupil is placed at the left-position within the left eye assembly.

A patient simulator can include a right eye assembly including a right pupil; a left eye assembly including a left pupil; and a microprocessor configured to: determine a right-range for the right pupil within the right eye assembly and/or a left-range for the left pupil within the left eye assembly; monitor movement of the right pupil within the right eye assembly and/or movement of the left pupil within the left eye assembly; and effect oscillation of the right pupil when the microprocessor determines that the right pupil is placed within the right-range, and/or of the left pupil when the microprocessor determines that the left pupil is placed within the left-range.

The right pupil and/or the left pupil can be configured to oscillate in a horizontal direction, a vertical direction, or a combination of the horizontal direction and the vertical direction. The microprocessor can be configured to effect oscillation of the right pupil jointly with respect to the oscillation of the left pupil and/or independently with respect to the oscillation of the left pupil. The microprocessor can be configured to effect oscillation of the right pupil and/or the left pupil according to one or more parameters including amplitude, frequency, and speed. The microprocessor can be configured to effect oscillation of the right pupil and/or the left pupil according to the amplitude by effecting equal oscillation of the right pupil about the right-position or a position within the right-range and/or of the left pupil about the left-position or a position within the left-range. The microprocessor can be configured to effect oscillation of the right pupil and/or the left pupil according to the frequency by effecting oscillation of the right pupil about the right-position or a position within the right-range within a period of time associated with a right-frequency, and of the left pupil about the left-position or a position within the left-range within a period of time associated with the left-frequency. The microprocessor can be configured to effect oscillation of the right pupil and/or the left pupil according to the speed by effecting oscillation of the right pupil about the right-position or a position within the right-range at a right-speed, and of the left pupil about the left-position or a position within the left-range at a left-speed. The one or more parameters may be modified based on the right-position or the left-position, and/or the right-range or the left-range. The right-position or the left-position, or the right-range or the left-range may be modified based on the one or more parameters.

A patient simulator can include a right eye assembly including a right eyelid; a left eye assembly including a left eyelid; and a microprocessor configured to: determine a right-position for the right eyelid within the right eye assembly and/or a left-position for the left eyelid within the left eye assembly; monitor movement of the right eyelid within the right eye assembly and/or movement of the left eyelid within the left eye assembly; and effect oscillation of the right eyelid when the microprocessor determines that the right eyelid is placed at the right-position within the right eye assembly, and/or of the left eyelid when the microprocessor determines that the left eyelid is placed at the left-position within the left eye assembly.

A patient simulator can include a right eye assembly including a right eyelid; a left eye assembly including a left eyelid; and a microprocessor configured to: determine a right-range for the right eyelid within the right eye assembly and/or a left-range for the left eyelid within the left eye assembly; monitor movement of the right eyelid within the right eye assembly and/or movement of the left eyelid within the left eye assembly; and effect oscillation of the right eyelid when the microprocessor determines that the right eyelid is placed within the right-range, and/or of the left eyelid when the microprocessor determines that the left eyelid is placed within the left-range.

A patient simulator can include a right eye assembly including a right eyelid; a left eye assembly including a left eyelid; and a microprocessor configured to: determine a right-position for the right eyelid within the right eye assembly, and/or a left-position for the left eyelid within the left eye assembly; and effect movement of the right eyelid from a current position of the right eyelid to the right-position, and/or of the left eyelid from a current position of the left eyelid to the left-position.

A patient simulator can include a right eye assembly including a right pupil; a left eye assembly including a left pupil; and a microprocessor configured to: determine a right-range for the right pupil within the right eye assembly and/or a left-range for the left pupil within the left eye assembly; determine a right random position for the right pupil within the right-range, and a left random position for the left pupil within the left-range; determine a right random time interval for the right pupil, and a left random time interval for the left pupil; effect movement of the right pupil from its current position to the right random position, and of the left pupil from its current position to the left random position; and effect movement of the right pupil from the right random position to another random position upon expiration of the right random time interval, and of the left pupil from the left random position to another random position upon expiration of the left random time interval.

The right-range can be associated with horizontal and/or vertical movement of the right pupil, and the left-range can be associated with horizontal and/or vertical movement of the left pupil. The microprocessor can be configured to: determine the right random position based on random horizontal movement and/or random vertical movement of the right pupil, and determine the left random position based on random horizontal movement and/or random vertical movement of the left pupil. The patient simulator can be configured to simulate an ocular disease. The microprocessor can be configured to determine the right random time interval and/or the left random time interval based on a severity of the ocular disease.

Although illustrative embodiments have been shown and described, a wide range of modification, change, and substitution is contemplated in the foregoing disclosure and in some instances, some features of the present disclosure may be employed without a corresponding use of the other features. It is understood that such variations may be made in the foregoing without departing from the scope of the embodiment. Accordingly, it is appropriate that the appended claims be construed broadly and in a manner consistent with the scope of the present disclosure.

What is claimed is:

1. A patient simulator, comprising:
    a right eye assembly including a right pupil;
    a right eyelid assembly including a right eyelid;
    a left eye assembly including a left pupil;
    a left eyelid assembly including a left eyelid;
    a pupil position sensor configured to sense a position of the right pupil, the left pupil, or both, and to provide a first electrical signal based on the sensed position;
    a pupil position motor mechanically coupled to the right eye assembly, the left eye assembly, or both, and configured to change the position of the right pupil, the left pupil, or both, based on a second electrical signal;
    an eyelid position sensor configured to sense a position of the right eyelid, the left eyelid, or both, and to provide a third electrical signal based on the sensed position;
    an eyelid position motor mechanically coupled to the right eyelid assembly, the left eyelid assembly, or both, and configured to change the position of the right eyelid, the left eyelid, or both, based on a fourth electrical signal;
    a transmitter configured to transmit a signal toward an object placed in front of the patient simulator;
    a sensor configured to sense a signal reflected off the object; and
    a microprocessor configured to:
        determine a location of the object based on the sensed signal; and
        effect movement of one or more of the right pupil, the right eyelid, the left pupil, or the left eyelid based on the determined location of the object;
    wherein, to effect the movement of the one or more of the right pupil, the right eyelid, the left pupil, or the left eyelid, the microprocessor is further configured to:
        generate the second electrical signal based on the first electrical signal provided by the pupil position sensor; and
        generate the fourth electrical signal based on the third electrical signal provided by the eyelid position sensor;
    wherein the microprocessor is further configured to compare a current position of the right pupil and/or the left pupil with the determined location of the object to effect movement of the right pupil and/or the left pupil; and
    wherein the microprocessor is further configured to effect movement of the right pupil independently with respect to movement of the left pupil.

2. The patient simulator of claim 1, wherein the microprocessor is further configured to effect movement of the right pupil and/or the left pupil by effecting nystagmic oscillations of the right pupil and/or the left pupil.

3. The patient simulator of claim 2, wherein the microprocessor is further configured to:
    effect equal nystagmic oscillations of the right or loft pupil about a given position of the right pupil; and/or
    effect equal nystagmic oscillations of the left pupil about a given position of the left pupil.

4. The patient simulator of claim 2, wherein the microprocessor is further configured to effect the nystagmic oscillations of the right pupil and/or the left pupil in a horizontal direction, a vertical direction, or in a combination of the horizontal and vertical directions.

5. The patient simulator of claim 2, wherein the microprocessor is further configured to vary an amplitude of the nystagmic oscillations of the right pupil and/or the left pupil.

6. The patient simulator of claim 2, wherein the microprocessor is further configured to vary a frequency of the nystagmic oscillations of the right pupil and/or the left pupil.

7. The patient simulator of claim 2, wherein the microprocessor is further configured to vary a speed of the nystagmic oscillations of the right pupil and/or the left pupil.

8. The patient simulator of claim 1, wherein the microprocessor is further configured to effect movement of the right eyelid and/or the left eyelid by effecting oscillations of the right eyelid and/or the left eyelid to simulate blepharospasm or ptosis.

9. A patient simulator, comprising:
    a right eye assembly including a right pupil;
    a left eye assembly including a left pupil;
    a pupil position sensor configured to sense a position of the right pupil, the left pupil, or both, and to provide a first electrical signal based on the sensed position;
    a pupil position motor mechanically coupled to the right eye assembly, the left eye assembly, or both, and configured to change the position of the right pupil, the left pupil, or both, based on a second electrical signal; and
    a microprocessor configured to:
        determine a right-position and/or a right-range for the right pupil within the right eye assembly and a left-position and/or a left-range for the left pupil within the left eye assembly;
        monitor, via the first electrical signal provided by the pupil position sensor, movement of the right pupil within the right eye assembly and/or movement of the left pupil within the left eye assembly; and
        effect oscillations of the right pupil when the microprocessor determines that the right pupil is placed at the right-position and/or within the right-range, and/or of the left pupil when the microprocessor determines that the left pupil is placed at the left-position and/or within the left-range;
    wherein, to effect the oscillations of the right pupil and/or the left pupil, the microprocessor is further configured to:
        generate the second electrical signal based on the first electrical signal provided by the pupil position sensor;
    wherein the microprocessor is configured to effect oscillations of the right pupil and the left pupil; and
    wherein the microprocessor is further configured to effect the oscillations of the right pupil independently with respect to the oscillations of the left pupil.

10. The patient simulator of claim 9, wherein the microprocessor is further configured to effect the oscillations of the right pupil and/or the left pupil in a horizontal direction, a vertical direction, or in a combination of the horizontal and vertical directions.

11. The patient simulator of claim 9, wherein the microprocessor is further configured to effect the oscillations of the right pupil and/or the left pupil according to one or more parameters including amplitude, frequency, and/or speed.

12. The patient simulator of claim 11, wherein the one or more parameters include amplitude; and
    wherein the microprocessor is further configured to effect the oscillations of the right pupil and/or the left pupil according to amplitude by effecting the oscillations of the right pupil about the right-position at a right-amplitude and of the left pupil about the left-position at a left-amplitude, which left-amplitude is the same as, or different from, the right-amplitude.

13. The patient simulator of claim 11, wherein the one or more parameters include frequency; and
wherein the microprocessor is further configured to effect the oscillations of the right pupil and/or the left pupil according to frequency by effecting the oscillations of the right pupil about the right-position a right-frequency and of the left pupil about the left-position at a left-frequency, which left-frequency is the same as, or different from, the right-frequency.

14. The patient simulator of claim 11, wherein the one or more parameters include speed; and
wherein the microprocessor is configured to effect the oscillations of the right pupil and/or the left pupil according to speed by effecting the oscillations of the right pupil about the right-position at a right-speed and of the left pupil about the left-position at a left-speed, which left-speed is the same as, or different from, the right-speed.

15. The patient simulator of claim 11, wherein the microprocessor is further configured to modify the one or more parameters based on the right-position and/or the left-position.

16. The patient simulator of claim 11, wherein the microprocessor is further configured to modify the right-position and/or the left-position based on the one or more parameters.

17. The patient simulator of claim 11, wherein the microprocessor is further configured to modify the one or more parameters based on the right-range and/or the left-range.

* * * * *